US012794230B2

(12) United States Patent
Wright et al.

(10) Patent No.: US 12,794,230 B2
(45) Date of Patent: Nov. 10, 2026

(54) PREDICTIVE ENERGY PROVISIONING

(71) Applicant: Moixa Technology Limited, London (GB)

(72) Inventors: Christopher Verity Wright, Haslemere (GB); Jesús Prieto Colomina, Haslemere (GB); Manuel Alejandro Valenzuela Acosta, London (GB); Adrian Ayastuy Rodriguez, Edinburgh (GB); Christopher James Ablitt, Bristol (GB); Jaime Cabot Campins, Calviá (ES); Samuel George Wevers, London (GB)

(73) Assignee: Moixa Technology Limited, London (GB)

( * ) Notice: Subject to any disclaimer, the term of this patent is extended or adjusted under 35 U.S.C. 154(b) by 620 days.

(21) Appl. No.: 18/087,455

(22) Filed: Dec. 22, 2022

(65) Prior Publication Data

US 2024/0154414 A1 May 9, 2024

Related U.S. Application Data

(60) Provisional application No. 63/423,222, filed on Nov. 7, 2022.

(51) Int. Cl.
*H02J 3/00* (2026.01)
*G06Q 50/06* (2024.01)
(Continued)

(52) U.S. Cl.
CPC .............. *H02J 3/003* (2020.01); *G06Q 50/06* (2013.01); *H02J 3/004* (2020.01); *H02J 3/32* (2013.01);
(Continued)

(58) Field of Classification Search
CPC .... H02J 3/003; H02J 3/004; H02J 3/32; H02J 3/381; H02J 2203/20; H02J 2300/22; G06Q 50/06
See application file for complete search history.

(56) References Cited

U.S. PATENT DOCUMENTS 4,990,099 A 2/1991 Marin
7,108,560 B1 9/2006 Chou
(Continued)

FOREIGN PATENT DOCUMENTS

EP 0409226 1/1991
EP 1198056 4/2002
(Continued)

OTHER PUBLICATIONS

Aveklouris et al., "A Stochastic Resource-Sharing Network for Electric Vehicle Charging," 2017 (13 pages).
(Continued)

*Primary Examiner* — Mohammad Ali
*Assistant Examiner* — Dhruvkumar Patel
(74) *Attorney, Agent, or Firm* — Van Pelt, Yi & James LLP

(57) ABSTRACT

Visualizing a future state of an energy system includes receiving, via a user interface, a user selection of a future time. It further includes, based on a forecasted energy production curve and a forecasted energy consumption curve, determining a future state of an energy system at the future time. It further includes presenting a visual representation of the future state of the energy system.

16 Claims, 35 Drawing Sheets

(51) Int. Cl.
*H02J 3/32* (2026.01)
*H02J 3/38* (2026.01)
*H02J 101/22* (2026.01)
*H02J 103/30* (2026.01)

(52) U.S. Cl.
CPC .......... *H02J 3/381* (2013.01); *H02J 2101/22* (2026.01); *H02J 2103/30* (2026.01)

(56) References Cited

U.S. PATENT DOCUMENTS

| | | | | |
|---|---|---|---|---|
| 7,877,338 | B2 | 1/2011 | Tani | |
| 8,774,007 | B2 | 7/2014 | Hussain | |
| 9,225,173 | B2 | 12/2015 | Darden, II | |
| 9,379,545 | B2 | 6/2016 | Daniel | |
| 9,442,548 | B1 * | 9/2016 | Johansson | G06F 1/3212 |
| 10,069,300 | B2 | 9/2018 | Lenox | |
| 10,218,177 | B2 | 2/2019 | Kern | |
| 10,418,815 | B2 | 9/2019 | Kern | |
| 10,530,157 | B2 | 1/2020 | Kern | |
| 10,996,735 | B2 | 5/2021 | Scalf | |
| 11,050,256 | B2 | 6/2021 | Kern | |
| 11,460,490 | B2 | 10/2022 | Lu | |
| 11,476,665 | B2 | 10/2022 | Lewin | |
| 11,532,943 | B1 * | 12/2022 | Zauli | H02J 3/004 |
| 11,855,482 | B2 | 12/2023 | Narla | |
| 2002/0163931 | A1 | 11/2002 | Lee | |
| 2003/0126060 | A1 | 7/2003 | Lof | |
| 2003/0142985 | A1 | 7/2003 | Sampath | |
| 2004/0117330 | A1 | 6/2004 | Ehlers | |
| 2007/0248877 | A1 | 10/2007 | Qahoug | |
| 2008/0039979 | A1 | 2/2008 | Bridges | |
| 2008/0039980 | A1 | 2/2008 | Pollack | |
| 2008/0058996 | A1 | 3/2008 | Sachdev | |
| 2008/0140565 | A1 | 6/2008 | Debenedetti | |
| 2008/0143290 | A1 | 6/2008 | Chavakula | |
| 2008/0167756 | A1 | 7/2008 | Golden | |
| 2008/0185451 | A1 | 8/2008 | Simon | |
| 2009/0062967 | A1 | 3/2009 | Kressner | |
| 2009/0066287 | A1 | 3/2009 | Pollack | |
| 2009/0189451 | A1 | 7/2009 | Roepke | |
| 2009/0192655 | A1 | 7/2009 | Ichikawa | |
| 2009/0195349 | A1 | 8/2009 | Frader-Thompson | |
| 2010/0026739 | A1 | 2/2010 | Hirashima | |
| 2010/0076615 | A1 | 3/2010 | Daniel | |
| 2010/0076825 | A1 | 3/2010 | Sato | |
| 2011/0016063 | A1 | 1/2011 | Pollack | |
| 2011/0276194 | A1 | 11/2011 | Emalfarb | |
| 2012/0005126 | A1 | 1/2012 | Oh | |
| 2012/0059527 | A1 | 3/2012 | Beaston | |
| 2012/0158327 | A1 | 6/2012 | Hurri | |
| 2012/0253531 | A1 | 10/2012 | Tyagi | |
| 2014/0159485 | A1 | 6/2014 | Daniel | |
| 2014/0176079 | A1 | 6/2014 | Akira | |
| 2014/0336837 | A1 * | 11/2014 | Kiuchi | H02J 13/14 700/295 |
| 2015/0177933 | A1 * | 6/2015 | Cueto | G06F 3/0485 715/776 |
| 2016/0082856 | A1 | 3/2016 | Baxter | |
| 2016/0280092 | A1 | 9/2016 | Jefferies | |
| 2016/0347195 | A1 | 12/2016 | Bridges | |
| 2016/0358070 | A1 | 12/2016 | Brothers | |
| 2017/0005474 | A1 | 1/2017 | Sanders | |
| 2017/0017213 | A1 | 1/2017 | Miftakhov | |
| 2017/0373509 | A1 | 12/2017 | Betzin | |
| 2018/0086222 | A1 | 3/2018 | Juang | |
| 2018/0285696 | A1 | 10/2018 | Eigen | |
| 2019/0222045 | A1 | 7/2019 | Dhanapal | |
| 2019/0372345 | A1 * | 12/2019 | Bain | H02J 3/008 |
| 2019/0392524 | A1 * | 12/2019 | Køber | G06Q 50/06 |
| 2021/0221247 | A1 | 7/2021 | Daniel | |
| 2023/0305587 | A1 * | 9/2023 | Thirumurthy | B60L 53/11 |

FOREIGN PATENT DOCUMENTS

| | | | | |
|---|---|---|---|---|
| EP | 1263108 | | | 12/2002 |
| EP | 2453512 | | | 5/2012 |
| EP | 2592686 | | | 10/2015 |
| GB | 2408592 | | | 11/2005 |
| GB | 2486016 | | | 6/2012 |
| JP | 2005224009 | | | 8/2005 |
| JP | 2020154429 | A | * | 9/2020 |
| KR | 101491553 | | | 2/2015 |
| KR | 101935684 | | | 1/2019 |
| WO | 0106612 | | | 1/2001 |
| WO | 0221659 | | | 3/2002 |
| WO | 2008071995 | | | 6/2008 |
| WO | 2008073453 | | | 6/2008 |
| WO | 2013123988 | | | 8/2013 |
| WO | 2014019607 | | | 2/2014 |
| WO | 2017066431 | | | 4/2017 |
| WO | 2018046105 | | | 3/2018 |

OTHER PUBLICATIONS

Carvalho et al., "Critical behaviour in charging electric vehicles," New Journal of Physics, 2015 (12 pages).
Crisostomi et al., "Electric and Plug-in Hybrid Vehicle Networks: Optimization and Control," Boca Raton: CRC Press, Taylor & Francis Group, 2018 (264 pages).
International Patent Application No. PCT/EP19/66382 International Search Report and Written Opinion dated Oct. 11, 2019 (20 pages).
United Kingdom Patent Application No. GB1810314.3 Combined Search and Examination Report dated Dec. 12, 2019 (6 pages).

* cited by examiner

PREDICTIVE ENERGY PROVISIONING

CROSS REFERENCE TO OTHER APPLICATIONS

This application claims priority to U.S. Provisional Patent Application No. 63/423,222 entitled PREDICTIVE ENERGY PROVISIONING filed Nov. 7, 2022 which is incorporated herein by reference for all purposes.

BACKGROUND OF THE INVENTION

Energy systems that include distributed energy resources such as solar panels, stationary battery storage, electric vehicle (EV) chargers, EV batteries, HVAC (heating, ventilation, and air conditioning), etc. are becoming increasingly prevalent in residential sites. The state of an installed energy system, such as the amount of solar being generated, when an EV may be plugged in, the amount of charge available in a battery storage, the amount of household consumption that is occurring, etc. is dependent on a variety of factors that themselves may vary. Thus, it can be challenging to determine how to best utilize self-generated energy and variable cost grid-provided energy within a home containing distributed energy resources in a way that matches the needs and goals of homeowners, as well as the utility power grid.

BRIEF DESCRIPTION OF THE DRAWINGS

Various embodiments of the invention are disclosed in the following detailed description and the accompanying drawings.

DETAILED DESCRIPTION

Figure 1A:
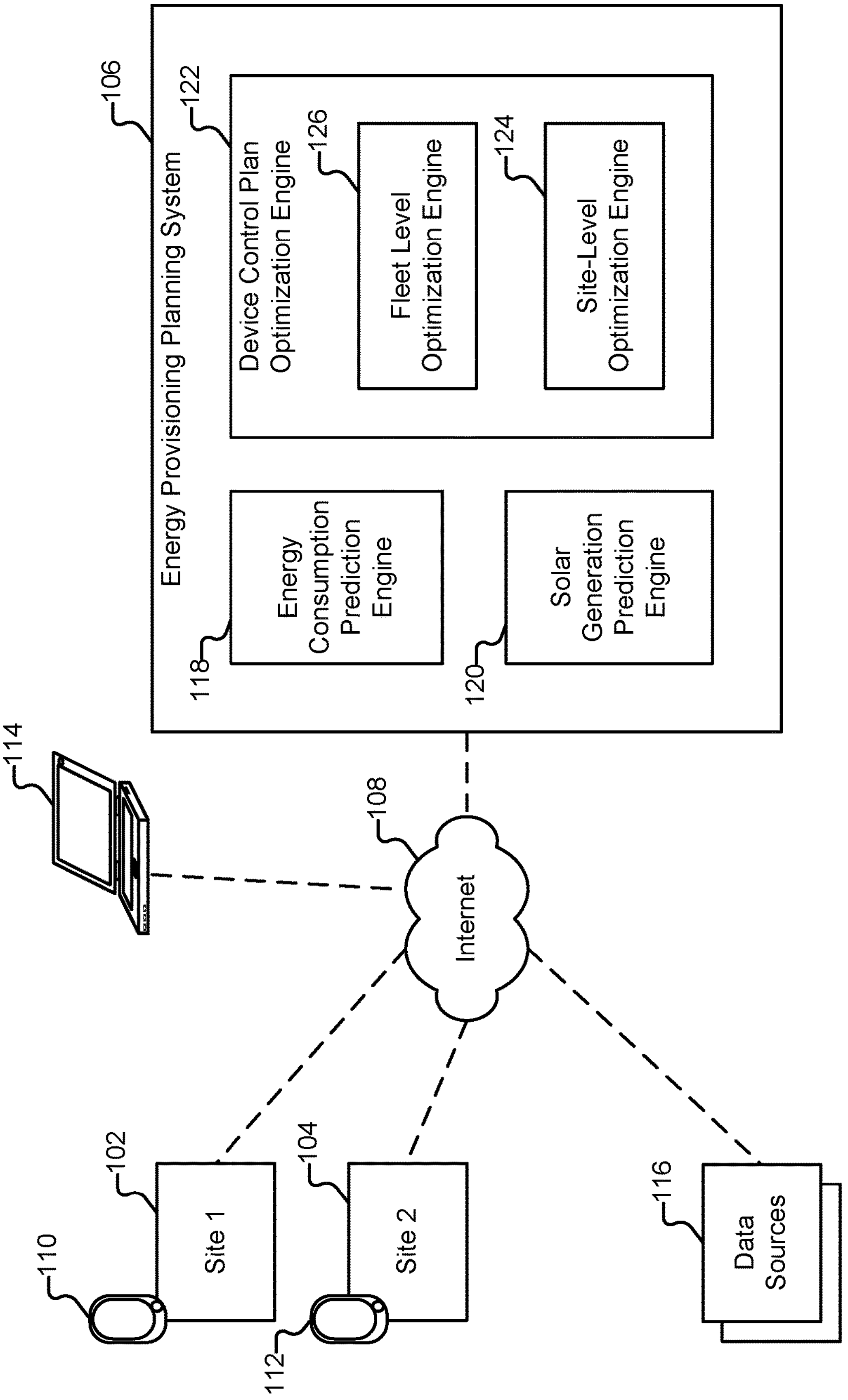
FIG. 1A illustrates an embodiment of an environment in which predictive energy provisioning is performed.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Described herein are embodiments of predictive energy provisioning. In various embodiments, predictive energy provisioning includes generating, on a per-site basis, predictions of solar power generation, predictions of energy consumption (including, for example, predictions of when an EV may be plugged in or out). Using such predictions, control of distributed energy resources (such as a battery, EV charger, or HVAC) at the site is facilitated (e.g., parameters for charging/discharging the device, or shifting its energy usage temporally are determined). Further, in various embodiments, the predictions are used to power or support interfaces that a user may interact with to understand the state of their home energy system, where, in addition to being provided insight into historical information about their site's power system, they are also able to view forecasted information about the future behavior or state of their home energy system.

While embodiments involving predictive power provisioning at residential sites (e.g., households) are described herein for illustrative purposes, the predictive provisioning techniques described herein may be variously adapted to any other type of site, as appropriate.

Figure 1B:
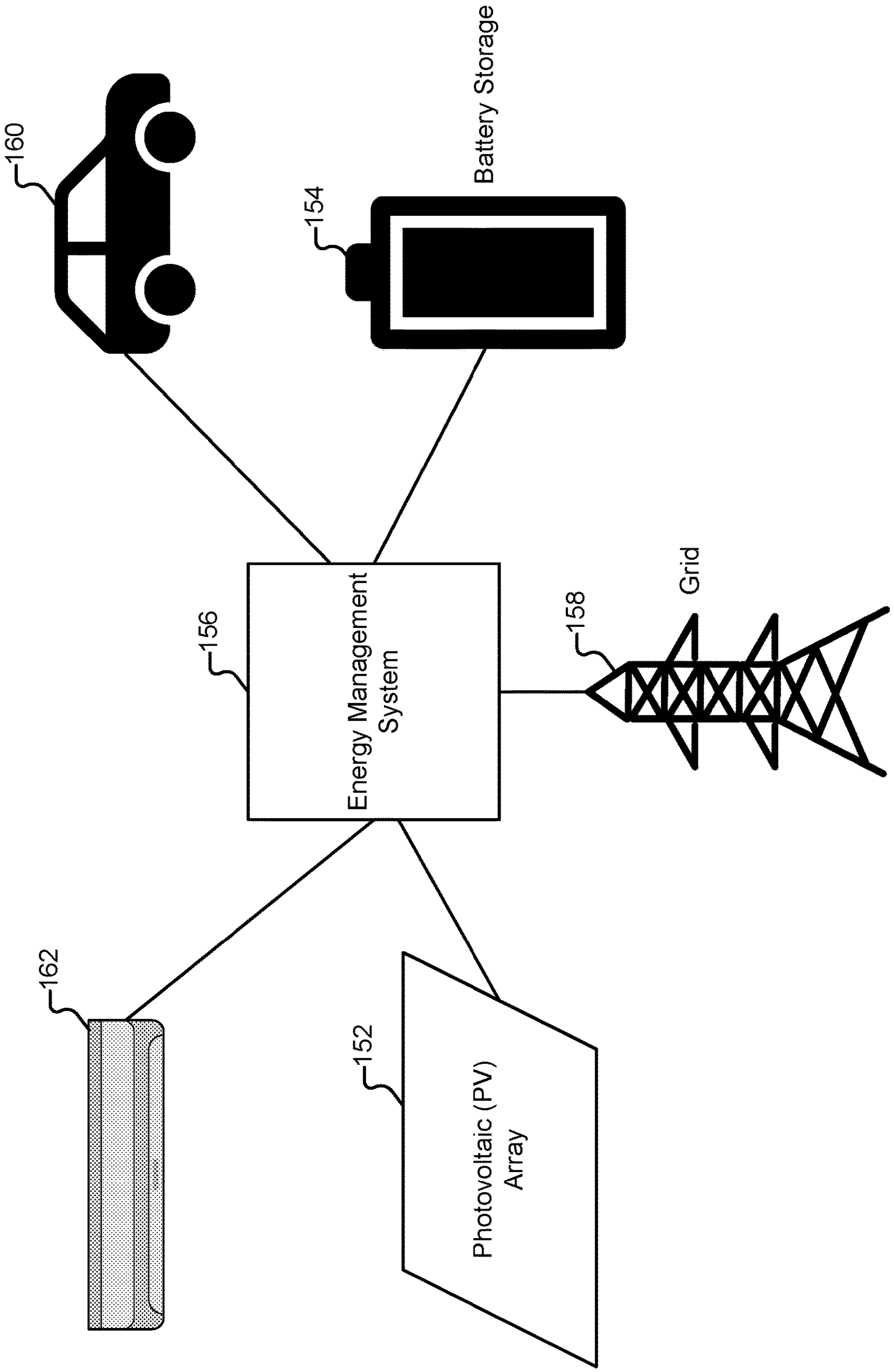
FIG. 1B illustrates an embodiment of a home energy system.

FIG. 1A illustrates an embodiment of an environment in which predictive energy provisioning is performed. In this example, sites 102 and 104 are residential sites that include home energy systems. FIG. 1B illustrates an embodiment of a home energy system. In this example, the home energy system includes a local power generation system (e.g., an array of photovoltaic (PV) panels 152) and an energy storage device 154. In this example, the energy storage device includes batteries. The techniques described herein may be variously adapted to accommodate any other type of energy storage (e.g., fuel cells), as appropriate. Each site also has a home energy management system 156 that manages the distribution of power from the PV array 152, battery storage 154, and the grid 158 to meet the power demands of the home. In this example, the home energy management system also controls energy usage of controllable loads of the home, such as electric vehicles (e.g., EV 160) and HVAC units (e.g., air conditioner 162, heaters, etc.). Such control includes, for example, temporally shifting energy usage of such loads, or otherwise controlling when a particular device consumes energy. For example, in some embodiments, the loads are connected to controllable circuits or switches that are under the management of the home energy management system. In some embodiments, the home energy management system is configured to selectively control power delivered to such loads by opening or closing or otherwise modulating the switches (which are, for example, smart switches that are under the control of the home energy management system). This effectively results in control of when the loads/devices are connected to, or disconnected from, power (and whether they are drawing power or consuming energy). In other embodiments, the loads include smart devices that are in communication with the energy management system (e.g., over wireless protocols such as WiFi), where such smart devices are directly under the control of the energy management system (where they may be directly commanded to turn on or off).

As shown in the example of FIG. 1A, energy provisioning planning system 106 is configured to determine, for each site, site-specific forecasts of solar power generation and energy consumption. The energy provisioning planning system is also configured to, using the forecasted predictions of solar power generation and energy consumption, determine an energy storage device control plan for optimally controlling the battery storage (e.g., controlling when and how the battery storage is cycled) at a residential site. In some embodiments, energy provisioning planning system 106 communicates with each of the home energy systems at the various sites via a network such as the Internet 108. In this example, the customers at each of the residential sites (e.g., homeowners of the sites) are able to view information regarding their home energy systems, such as via mobile applications installed on their phones (e.g., mobile devices 110 and 112), which are in communication with the energy provisioning planning system. Customers or users are also able to view the information about their home energy systems via browser-based web interfaces (e.g., when using devices such as laptop 114) using information provided by the energy provisioning planning system.

In one embodiment, the energy provisioning planning system is implemented on a scalable platform to allow determination of forecasts and device control plans using operations that are performed on data from a large volume of devices (e.g., site information such as grid meter information, solar panel power measurements, historical battery storage system information, etc.) and data sources (e.g., data sources 116, such as weather service information). As one example, the energy provisioning planning system is implemented on a cloud architecture such as Amazon AWS or Google Cloud.

In this example, energy provisioning planning system 106 includes energy consumption prediction engine 118 and solar generation prediction engine 120, which are configured to, respectively, generate machine learning predictions, on a per-site (e.g., per residential site or household) basis, of that site's projected energy consumption and power generation (e.g., solar generation) for a given time period (e.g., given day). As will be described in further detail below, the generation of the energy consumption and solar production\predictions is based on ingestion and analysis of various types of information. In various embodiments, machine learning techniques are used to generate the predictions described herein. For example, supervised machine learning regressions algorithms such as support vector regression (SVR) are used.

In some embodiments, the output of the machine learning models is not a specific number of kilowatts of solar production or energy consumption at a particular future time. Rather, the output is statistical, such as a probability distribution that reflects the stochastic and real-world nature of the data used to make the predictions. For example, the probabilistic output is used to account for the variability in energy consumption. For example, while energy consumption predictions may be based on a customer's past behavior, they may deviate, for example, by having a large party that was unpredicted. As will be described in further detail below, the predictive models described herein are built taking into account real-world uncertainty. This includes accounting for over-fitting, further details of which will be described in further detail below.

As one example, the probability distribution is reflected in three lines, with different options, such as a min-value prediction, a max prediction, and a median prediction. Those predictions are used as input for smart device planning, which includes predictions, as well as the customer's rate plan, in order to minimize their cost or their carbon footprint, or a mixture of both.

The energy provisioning planning system further includes device control plan optimization engine 122, which is configured to, based on the aforementioned predictions, determine, for each household, a plan for controlling the usage of the household's energy storage device (e.g., when to charge and/or discharge the battery storage, for what amount of time, at what power level, etc.). The device control plan may be optimized for various scenarios. For example, device control plan optimization engine 122 further includes site-level optimization engine 124 and fleet level optimization engine 126. The site-level optimization engine 124 is configured to determine a device control plan that is optimal for a specific site, independent of other sites. Fleet level optimization engine 126 is configured to determine an optimal device control plan in the context of a fleet level dispatch of multiple sites, such as to provide a virtual power plant. In this example, on a periodic basis (e.g., each day), the energy provisioning planning system is configured to generate, for each site, the aforementioned solar power generation forecasts, energy consumption forecasts, and device control plans.

In some embodiments, the solar generation and site consumption predictions, as well as device control plans, are generated for intervals of time, such as 30 minute predictions (predictions for different windows or granularities of time may also be made, as appropriate). In some embodiments, projections are made for a future period of time, such as the next 48 hours. For example, when projecting 48 hours out into the future, 96 half-hour predictions are made. In some embodiments, a prediction run is made each day of forecasts for the next two days. Other intervals of running the predictions may be used. Other time periods for each prediction run may also be used.

In some embodiments, the predictions are rerun when triggered by an event. For example, if a deviation from a prediction exceeds a threshold, then the prediction and planning is rerun. For example, if the energy consumption profile deviates by a threshold amount from the expected energy consumption planner, the planning and modeling of predictions is rerun.

Further details regarding prediction of solar generation and prediction of energy consumption, as well as device planning and control, are described in further detail below.

Forecasting Solar Power Generation

In some embodiments, the solar generation prediction engine 120 is configured to connect with various data sources, ingest data from the connected sources, and normalize such ingested data into a usable format. The formatted data is then evaluated to determine a forecast of the expected solar power generation over a time period such as the next 24 to 48 hours.

In some embodiments, the solar generation prediction engine executes a machine learning algorithm that generates a function or equation that, given an input set of variables, provides as output an amount of solar power/energy generated for a time frame (e.g., a day). The machine learning model is trained on historical information collected on a per-site basis. For example, the amount of solar power generated by the site's PV array is metered and measured over time. This results in the collection of historical information about solar production over time. In addition to the collection of solar production information, metadata corresponding to the time at which solar production measurements were taken is also recorded. Such metadata includes weather information such as UV radiation. In some embodiments, the metadata that is used in the training of the solar production forecast algorithm corresponds to the input parameters that will be used when requesting a solar production prediction to be made. In this way, historical solar production information and corresponding contextual metadata are used as training data to train the machine learning model, wherein the trained machine learning model is used to predict an amount of solar generation at a site for a period of time.

The following are example factors for determining solar power generation:

- solar irradiance
- humidity
- site orientation
- array size
- peak power generation of the solar array (e.g., kilowatt peak)
- coordinates (e.g., latitude/longitude) of the site, or other location data of the site.
- historical measures of power generated by the solar panel array at the site. For example, data collected from metering of the power generated by a PV array is used to generate an inference model for predicting PV power generation.

The prediction of solar generation (and its accuracy) is a function of information regarding the home site. As described above, such information used to perform forecasting includes weather forecasting information, where feeds from weather forecasting engines are used as input (e.g., to obtain information such as solar irradiance, solar flux, humidity, cloud cover, etc.). Historic information is also used, as described above, such as any site-specific information learned from observation of the specific site. For example, solar generation of a system is monitored over time. Patterns in the behavior of the solar generation are determined from the historical solar generation data. One example of a pattern that can be derived from historical solar production data is that typically, the home has a low amount of solar generation at 4 PM because it is shaded (where this may not be true for another home situated similarly).

In some embodiments, to improve the accuracy of the solar generation prediction model, the predictions are continuously compared against measured reality (e.g., the training data is updated with new data as it is collected).

In some embodiments, solar generation predictions are generated even if there is not any site-specific power data. For example, suppose that solar metering is not available for a site of interest (and thus historical solar production is unable to be evaluated). In some embodiments, factors such as site orientation (which may be determined from publicly accessible satellite imagery) are used to generate a solar production forecast. As another example, the solar metering data for another similar site is used as a factor in predicting solar generation for the site of interest.

As another example, suppose that there is no metering on solar panels, but EV charging is to be matched to when there is solar power available. In some embodiments, based on the location of the house, the size of the solar array, the cardinal orientation of the panels, weather forecasts (e.g., ultraviolet radiation forecasts), etc., a curve is generated of the solar power generated by the panels. Matching may then be performed using public or other sources of data.

Such a prediction may also be used to provide a detailed solar generation forecast to a customer before they have even purchased or installed any hardware. For example, based on the geographic region of the home, and a given array size, a day-by-day prediction or trace of solar power generation for a given location is provided.

In some embodiments, the forecast is statistical in nature. For example, rather than predicting a specific amount of power generated by the solar panel array at a point in time, a probability spread or distribution of the amount of solar power production is generated for a future window of time. Statistical measures with respect to the forecast are also determined, such as the $10^{th}$, $90^{th}$, and median ($50^{th}$) percentile solar power generated. In some embodiments, the difference between the $10^{th}$ and $90^{th}$ percentile solar production predictions is determined as a measure of variability or risk in the solar production forecast. For example, the tighter or smaller the spread between the $10^{th}$ and $90^{th}$ percentile predictions, the higher the confidence in the prediction. The wider the spread of the $10^{th}$ and $90^{th}$ percentile predictions, the lower the confidence in the prediction. As device control plans will be determined based on the forecasted solar production, the variability measures are used as a measure of reliability when generating device control plans. As will be described in further detail below, creation of an optimal device control plan also takes into account the amount of variability in the underlying predictions upon which a device control plan relies. This similarly applies for energy consumption forecasts, as will be described in further detail below.

Figure 2A:
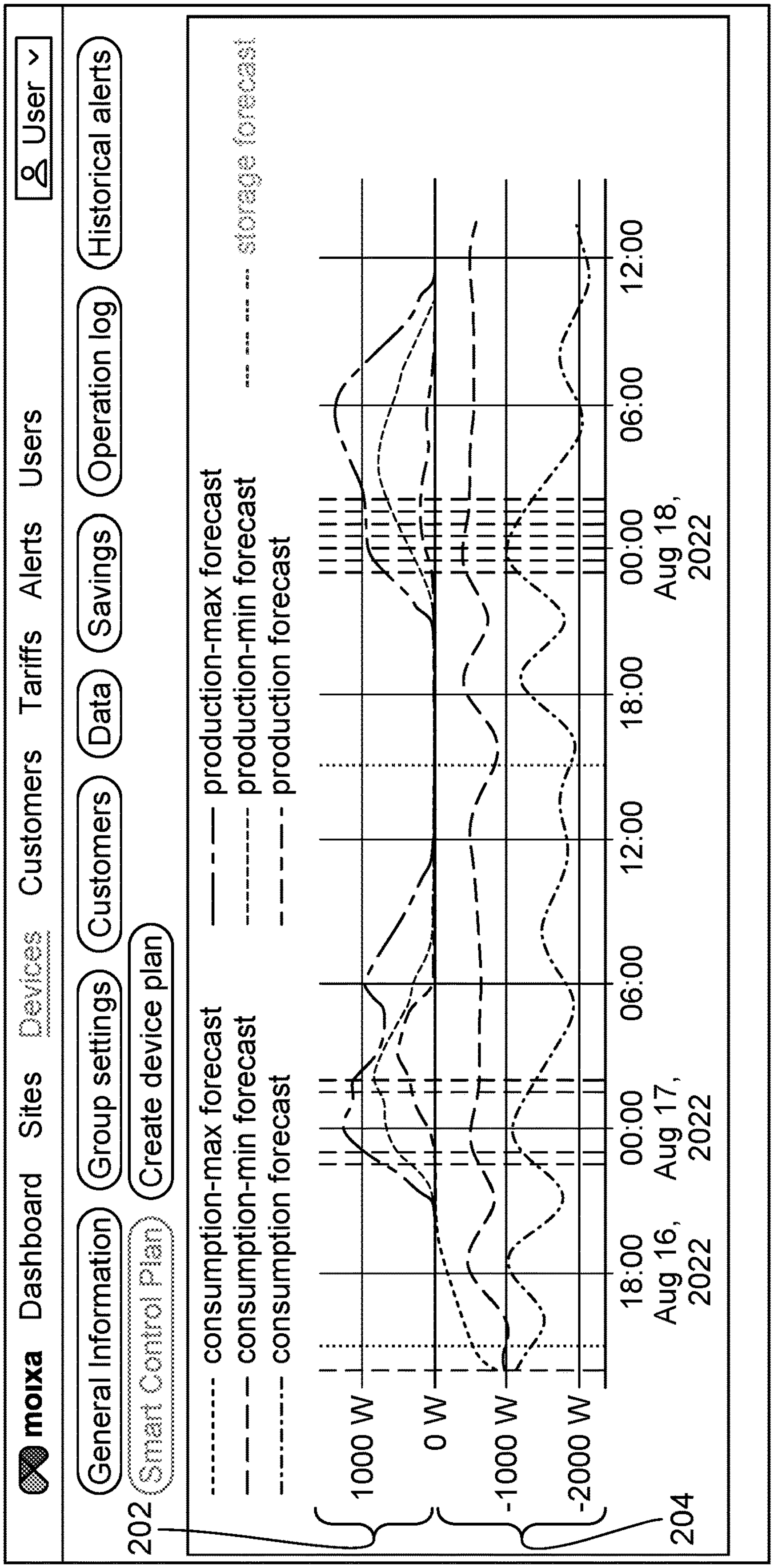
FIG. 2A illustrates an embodiment of forecast traces.

FIG. 2A illustrates an embodiment of forecast traces. Examples of projected solar production traces over time (which show, for example, $10^{th}$, median, and $90^{th}$ percentile PV power production over a 48-hour period) are shown at 202 of FIG. 2A (above the OW line), where the $10^{th}$ percentile corresponds to the production-min forecast, the $90^{th}$ percentile corresponds to the production-max forecast, and the median corresponds to the production forecast.

As shown in this example, over the course of the future 48-hour period, the solar production traces spread out, come together, then spread out again. Consider the time period shown around midnight (00:00) on 8/17. During this time period, there is a larger spread in the solar production traces. This reflects the probability distribution of the predicted solar production forecast, where due to uncertainty or variability, the range in which the true solar generation is likely to fall is larger (and there is less certainty that reality will match the prediction in that time period, so there is a broader range for the prediction). This is in contrast to the period between 12:00-18:00 on 8/17, where in the middle of the night, there is high confidence that there will not be any sun, and no solar generation, and so the actual production is likely to fall within a narrower range of potential production values (smaller difference between the $10^{th}$ and $90^{th}$ percentile predictions). After the nighttime period, the traces spread back out again during the day, reflecting the variability that may occur in solar production (e.g., due to various random outliers). For example, during the day, cloud cover, the UV or solar radiance, etc. may fluctuate. As one example, what may occur in reality is that the weather is sunny at one period, in which the solar panels are generating a certain amount of power, and then clouds roll across the sky for 15 minutes, causing a dip in solar generation, where the generation then increases again when the clouds pass. Thus, actual production is likely to fall in a wider range of values. In some embodiments, to capture these fluctuations that may occur at various parts of the day, predictions are made at a half hour interval. Predictions at larger or smaller intervals of time may also be made.

Forecasting Energy Consumption

In some embodiments, energy consumption prediction engine (118) is configured to generate a forecast of an amount of energy that will be consumed by a site over a period of time.

The following is an example of generating a prediction of energy consumption for a site. In some embodiments, energy consumption data for a historical or previous period of time for a site is obtained. For example, the last two weeks of data for that site is obtained (other periods of data may be utilized). Historical data over all time is not necessarily evaluated, as there may be changes in patterns due to seasons (e.g., historical winter data may not be beneficial in making a prediction for summer energy usage).

Suppose that a prediction is to be made for a given day, for example Tuesday. In this example, a view of the consumption of the past two weeks is obtained and used to build a consumption model, including a bias for recent days. As well as this, patterns of differences in energy usage for different days are also determined (e.g., users may tend to use more energy on Friday than other days of the week, or have different patterns due to different schedules).

In some embodiments, weather patterns are also evaluated. For example, the current weather is evaluated and used to bias what historical data is utilized. Suppose that it is currently rainy and cold. Historical data for the last 14 days is obtained. It is determined what type of weather was experienced on the last 14 days. A comparison of similarity is determined between the weather on those days and the current weather. Suppose that during the two week period it was sunny for 10 days, with the last four days being rainy and cold, similar to today. In this case, rather than averaging the consumption and generation historical data across the last 14 days, the historical data from the last 4 days, where the weather is more similar to today's, is used to generate today's forecast.

Relationships between weather patterns and consumption patterns are also established (e.g., observing that air conditioning loads are higher when the weather is hotter). Such contextual weather information is also used to determine consumption productions. Consumption predictions may also be adjusted based on other contextual information. For example, if a customer indicates that they will be on vacation (e.g., by selecting for the system to enter a "vacation" mode), then the consumption prediction for the corresponding time period is reduced.

The amount of historical data used (e.g., the time period of interest) may be tuned to account for variability such as seasonality. In some embodiments, the historical data is used to predict the likely medians and outliers for future consumption. In some embodiments, a weather reference is added to the consumption prediction/forecasting. For example, if it is known that tomorrow (for which a prediction is being made) will be unseasonably hot, then it is anticipated that there will be an air conditioning load that will increase the consumption tomorrow. That is, when generating a consumption prediction, in addition to historical consumption data, weather information for the day being predicted is used to determine whether to augment the historical consumption data with additional or fewer loads (more or less consumption) based on the weather forecast.

In some embodiments, historical consumption data is determined in various temporal granularities. For example, while predictions for thirty-minute increments or intervals of time are made, the historical consumption data may be gathered at smaller intervals, such as every 30 seconds, every minute, every 5 minutes, etc.

In some embodiments, the historical consumption is a derived value that is derived from the historical behavior of the home energy system, such as the battery state of charge, PV power production, and grid import/export.

Examples of historical data that are collected and used for forecasting future consumption include:

- the amount of battery charging/discharging measured in kilowatts
- The amount of solar power generated in kilowatts. For example, for a site, metering of the power generated from the solar panels is used to generate an inference model.
- The amount of power delivered by the inverter
- The amount of power imported from or exported to the grid The above historical home energy system behavior is collected in various ways, such as via metering of energy sources such as the PV array, battery storage, and grid. As described above, the various measurements that are collected may be at various levels of temporal granularity (e.g., reported at one second, one minute, etc.).

From such historical measurements of power distribution, the amount of energy consumed for a given period of time is derived. For example, if there is 4 kWh of solar being generated, and 2 kWh of consumption, then the 2 kWh of excess solar will either go to charging the battery or be delivered to the grid so that the source power and sinked power net to zero.

In some embodiments, energy consumption predictions at a household/site level are determined. In some embodiments, metering of specific devices or specific circuits (e.g., kitchen, bedroom, etc.) is performed, in which the predictions may be made at those granularities or segments.

In some embodiments, machine learning predictions of when users connect or disconnect (e.g., plug in/out) their EVs are also performed. This improves scheduling of how that EV should be charged in a home site with PV and/or ESS (energy storage systems such as battery storage). As one example, historical EV connection and disconnection events (e.g., collected by metering the EV) are aggregated and used to construct a statistical measure (e.g., probability density function (PDF)) of the probability of disconnecting the EV at a certain time after a duration of being connected. By doing so, predictions may be made when an EV is to be charged, at what rate, and for how long. As the price of electricity may vary, being able to predict when an EV is charged provides another input to the system to determine various approaches to how to optimize energy stored in a battery. For example, if the predicted EV plugin time were late at night during a cheaper energy period, then a different approach to utilizing stored battery charge would be used then if the predicted plugin time were during an expensive period of grid energy. In this way, when an EV is predicted to be charged informs how energy will be consumed, and is used to optimize (e.g., minimize) the amount of usage from the grid at expensive periods of time.

In some embodiments, generating a prediction of energy consumption includes generating power consumption curves. In some embodiments, a power curve indicates an amount of power consumed as a function of time. For example, the power curve indicates the forecasted amount of power consumed as a function of time over a period of 48 hours. The power curve may be queried at a certain temporal granularity. For example, average power consumed for half hour blocks of time are determined. This results in 96 power consumption values over a 48-hour period.

The historical data may be accumulated or aggregated for half hour windows of time (e.g., to determine the average power draw over a half hour period, the average battery state of charge, the average solar generation, etc.). The averaging allows for a smoothing of the data over a period of time (where the actual trace of electricity will be jagged and have spikes every time a device is turned on or off).

In some embodiments, predicting energy consumption at a site includes performing risk profiling to account for variability in energy usage at a site. For example, users of a household may be variable in their energy usage, or use energy in a varied way. For example, a bank manager may have a consistent schedule in when they are home and using energy, while this may not be the case for a freelance journalist who may be in and out of the home in a more arbitrary manner given the nature of their assignments.

This variability (which is site-to-site) influences the manner in which the system generates device control plans (as the device control plans rely on the energy consumption forecasts, similarly to the solar production forecasts). In some embodiments, the variability of the energy consumption is determined using statistical metadata pertaining to the energy consumption forecast. For example, the energy consumption forecast is generated as a probability distribution. In some embodiments, $10^{th}$, $50^{th}$ (median), and $90^{th}$ percentile energy consumption values are determined. As one example, a risk profile measuring the variability of the energy consumption is determined as the difference between the $10^{th}$ and $90^{th}$ percentile energy consumption predictions.

For example, a median ($50^{th}$ percentile) predicted energy consumption is generated. That is, there is a 50% probability that the actual consumed energy will be less than the median value, and there is a 50% probability that the actual consumed energy will be greater than the median value. As another example, $10^{th}$ and $90^{th}$ percentile energy consumption predictions are generated, where there is a 10% likelihood or probability that the amount of energy consumption will be below the $10^{th}$ percentile value, and a 90% probability that the amount of energy consumption will be below the $90^{th}$ percentile value. A larger gap between the $10^{th}$ and $90^{th}$ percentile values indicates larger variability in the historical energy consumption data (i.e., that the actual energy consumption will likely be in a broader range of values, and is unlikely to be in a narrow band of values).

The probability distribution that is generated as output indicates, for a particular time period, the likelihood of having predicted the correct amount of energy consumption within that period. This includes the likelihood that the $10^{th}$ percentile line is lower than reality, or the likelihood that the actual energy consumption is below the 90% line ($90^{th}$ percentile value).

Examples of projected energy consumption traces over time (which show, for example, $10^{th}$, median, and $90^{th}$ percentile PV power production over a 48 hour period) are shown at 204 of FIG. 2A (below the OW line), where the $10^{th}$ percentile corresponds to the consumption-min forecast, the $90^{th}$ percentile corresponds to the consumption-max forecast, and the median corresponds to the consumption forecast.

As illustrated in this example, there is a large amount of variation in the amount of power that is consumed at the site. For example, for the same period of 7 PM-9 PM on the two different days covered by this 48-hour plan, the consumption of power will be different (e.g., different between Thursday and Friday, where on Friday people may go out to eat rather than being at home for dinner on Thursday). Other periods may be relatively the same across different days, such as in the middle of the night. As shown in this example, average or aggregate power predictions are made for half hour time buckets.

Device Control Plan Generation

The solar generation and energy consumption predictions/forecasts described above are used to determine plans for controlling usage of the battery at a site. For example, an optimal plan for controlling a site's battery storage is generated based on the predicted solar generation and energy consumption, as well as any economic factors (e.g., tariffs, net metering, time of use rate plans, etc.), and any desired goals (e.g., grid usage minimization, economic benefit maximization, etc.). Other examples of goals include behind-the-meter optimization for wholesale market pricing so that asset owners can manage their wholesale procurement costs. For example, the variable pricing faced by an energy utility in the wholesale market is evaluated. For example, one model is that a utility leases a battery to their customer. The customer has a flat rate plan, but the utility has the ability to charge and discharge the battery as desired. For example, the homeowners may be on plans in which energy is provided as a service, where rather than paying based on the amount of energy consumed from the utility, they pay for access to a certain capacity. While the charging/discharging of the battery would not affect the end customer bill as they are on a flat rate, the utility company can utilize the energy in end customer's homes in a manner that lowers how much, and when they procure energy from a wholesale market (which may also have variable energy pricing). For example, if the batteries have been charged up off of solar power, then at night, when the wholesale market for energy is expensive, the grid utility can discharge those batteries to supply demand from homeowners, rather than having to procure energy from the wholesale market to meet demand. In this way, the utility does not need to procure as much power on the open market. This results in a cost savings to the utility, and allows the utility to manage the cost of procuring energy. As another example, the battery devices may be controlled to charge or discharge in a manner so that the utility grid can manage the type of energy to be procured from the wholesale market, so as to reduce carbon emissions. For example, the grid can discharge home batteries to meet energy demand when the energy from the wholesale market is provided using more carbon intensive sources (e.g., coal). In this way, the utility grid can reduce the carbon intensity of the energy it is procuring. The utility grid may then prioritize delivering grid power to homes when the energy the utility is procuring from the wholesale market can be delivered via renewable resources (e.g., from solar farms, wind farms, etc.).

As another example, asset health/degradation cost (e.g., impact on life of battery storage) can be taken into account during optimization. For example, a system health cost is assigned when making charging decisions, in order to take into account the long term health effect of a charging decisions. For example, higher charging (or discharging) rates may have a greater impact on degrading or lowering overall capacity of a battery device. In this way, the state of health cost is taken into account when generating a device control plan.

As shown in the above, the optimization process for determining device control is flexible, allowing optimization to be performed according to various different types of objective functions.

In some embodiments, a plan is a control plan for controlling the behavior of the battery. This includes a plan for specifying when the battery is to be idle, when the battery is to be charging from solar, when the battery should be charging from low cost energy, when the battery should be discharging energy into home loads, the time at which battery charging/discharging should be performed taking into account energy tariffs, the different costs of energy at various times of day, the differential cost of solar, potential benefit from exporting energy to the grid, etc.

For example, suppose that a goal is to maximize cost saving during a future period of time for which grid energy will be expensive. Suppose that it is predicted that there will be 7 kWh of consumption in that future period of time. A control plan is generated to ensure that there is at least 7 kWh of energy stored in the battery by the time of that price peak. To do so, a set of actions is taken to facilitate that amount of energy being available in the battery, at that time. The battery's state of charge is the result of actions that are taken and the way that the battery is controlled, rather than events that will simply occur. The state of charge is an output of a view of the future given how the battery device is controlled to achieve various targets or goals.

Using the predictions generated above, plans for controlling usage of the battery (e.g., to charge or discharge the battery) are generated. For example, when the predictions of generation and consumption are generated, they are treated as a reality of the future. For example, a plan for when to charge the battery and by how much over time is determined based on when there is expected to be solar generation, when consumption is to occur, etc. In some embodiments, the solar production and consumption forecasts are run against another algorithm which generates numerous potential series of actions that a home site could take (e.g., charging and/or discharging of batteries at various times for certain durations at certain power levels), and determines an optimal delivered value. For example, the planning algorithm generates a plurality of candidate battery control plans. For each battery control plan, an expected value generated if the plan were executed is determined.

In some embodiments, the device control plan optimization engine is implemented using a linear solver that has an objective function that is to optimize against a goal, such as reducing cost and/or maximizing benefit. The linear solver is provided various inputs, such as the size/capacity of the battery storage on the site (e.g., the kWh the battery can hold), the maximum kilowatt discharge rate of the inverter of that battery, the round trip efficiency of the battery (e.g., if charging up by 100 kW, how much of that can be discharged, which may not be the same due to losses), minimum state of charge of the battery (e.g., battery capacity floor to have a reserve amount of charge left), etc. Other parameters may be included.

The aforementioned parameters are placed into a model, where the model is run to determine, given the consumption and solar predictions for a time period of interest (e.g., tomorrow), the various energy storage device metadata described above, and any rate plans (e.g., tariffs or time of use plans), a variety of candidate battery control plans or scenarios that are each associated with a corresponding cost or value to the customer (e.g., homeowner of the site), etc. The scenarios include different ways in which the battery is controlled, where the cost of a given combination of battery control actions is determined. The risk profile of the site (e.g., amount of variability in the solar production and energy consumption forecasts upon which the battery control plans rely) is also taken into account in the modeling, as will be described in further detail below.

A control plan is then selected, and a state of charge of the battery over the time period of interest is generated. For example, the desired or optimal state of charge over time that solves the objective function in a manner that reduces cost or maximizes value is selected. The battery is then controlled accordingly to effect the start of the charge plan or trace.

The following are further embodiments of control plan optimization, as well as determining which candidate control plan to select.

In some embodiments, machine learning predictions of production and consumption are generated, as described above, which form, for example, probability distributions.

In some embodiments, N random walks are generated within that probability distribution, to create a range of future scenarios of production and consumption in kW over time. (In various embodiments, and as will be described in further detail below, N may be 3, or 11, or any odd number). One example random walk that is taken is used to determine the energy consumption at points or steps in time over a time period, where the amount of energy consumed is based on the probability distribution determined for the energy consumption. Many random walks of the energy consumption may be taken over the same time period to generate different energy consumption traces/curves. Similar random walks are taken based on the probability distribution for solar/energy production.

These production and consumption scenarios are then provided as input to an optimizer, which in one embodiment utilizes linear programming.

In some embodiments, the optimizer is provided an objective function (e.g., to minimize cost over some specified period of time, or minimize carbon, etc.), and constraints (e.g. device criteria such as max kW charge/discharge, kWh of energy capacity, device roundtrip efficiency). In some embodiments, the optimizer is configured to deliver an optimal power trace for the battery inverter in kW over time—that is, whether the battery is charging or discharging at a given point in time, in order to achieve the objective function.

At this point, an optimized battery power trace is determined for each of the production/consumption scenarios that were fed into the optimizer.

In some embodiments, a process referred to herein as "intent generation" is performed. In some embodiments, intents are instructions that are provided to the battery over the course of the day to achieve the optimal result. In some embodiments, the generation of final intents is determined via a voting system that utilizes a range of heuristics (e.g., if/then statements).

In some embodiments, each of the aforementioned optimized power traces that are outputted from the optimizer act as candidates. For each time period (e.g., 30 minutes, one hour, or any granularity as appropriate), the candidate plans are evaluated to determine what would occur over this time period. For example, if across three candidate plans there are two charge actions and one discharge action for that period, the optimal plan will include an instruction to "charge" over that period. Here, the majority of candidate plans call to perform charging during the time period (e.g., 30 minute chunk) under evaluation. If there is a split vote (e.g., one candidate plan is to charge during that period, a second candidate plan is to idle during that period, and a third candidate plan is to discharge during that period) or no clear result, rules are applied to resolve those. For example, odd numbers of candidate plans are generated to avoid split or inconclusive decisions (e.g., to avoid a "2 votes to charge, 2 votes to discharge" situation). The selection engine then aggregates (e.g., adds up) the "winning vote" for each time period, and this constitutes the optimal plan for that day (or any other range of time under consideration, as appropriate).

Figure 2B:
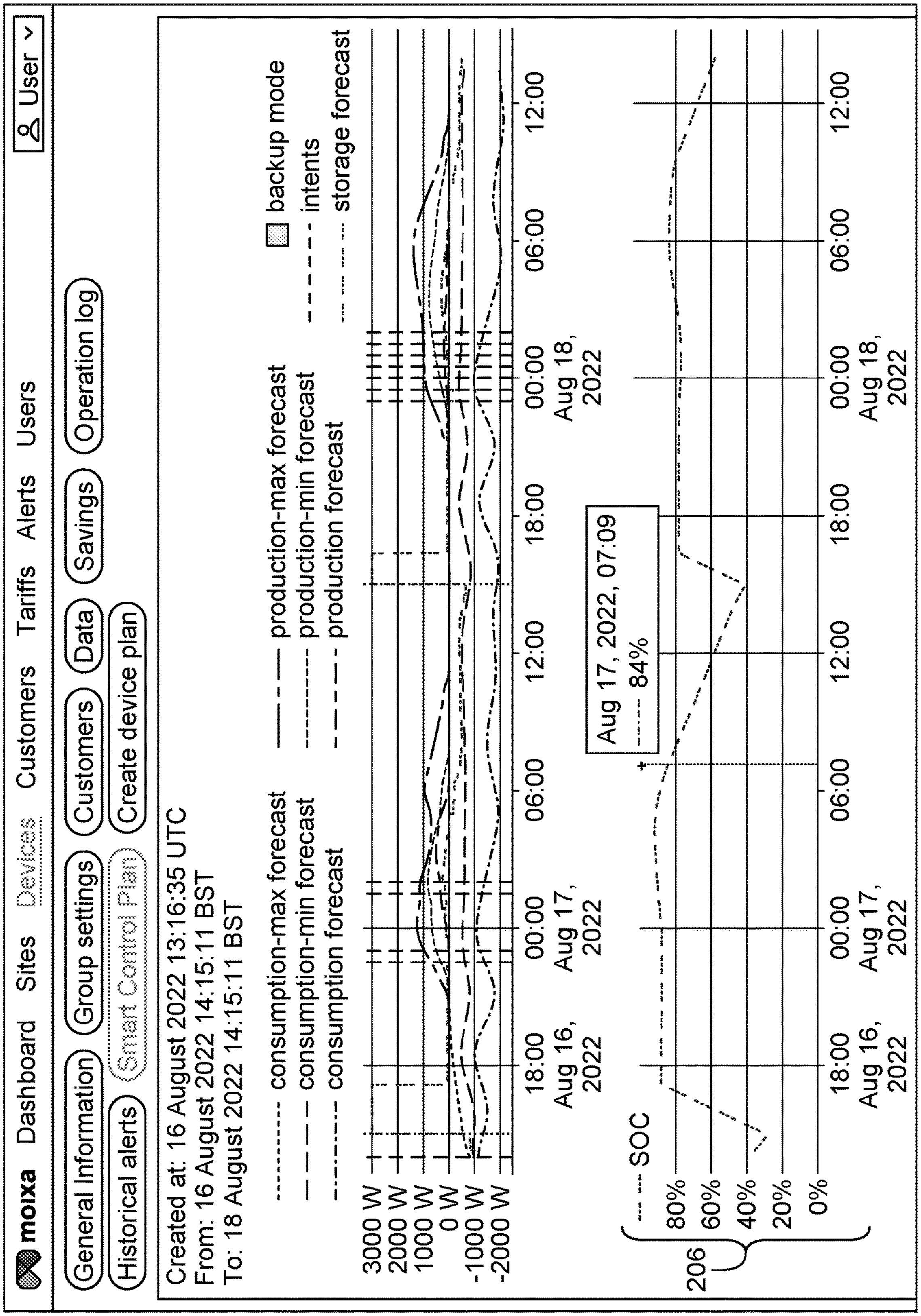
FIG. 2B illustrates an embodiment of a battery storage state of charge according to a battery control plan.

FIG. 2B illustrates an embodiment of a battery storage state of charge according to a battery control plan. In this example, a plot of the state of charge of the battery over a 48-hour period is shown at 206. The control plan is determined based on the statistical forecasts of solar production and energy consumption shown in FIG. 2A (and also provided in the plot above SoC curve 206 in the example of FIG. 2B). In some embodiments, the control plan is also generated based on the cost of importing and/or exporting energy to the grid (e.g., in order to optimize for cost savings as one possible goal). In some embodiments, a graph illustrating the cost of importing and exporting energy to the grid over time may also be presented.

For example, if, for a given period, the household consumption is to be covered, the traces illustrate the expected solar generation and the planned state of charge of the battery. As the battery starts to cover the evening peaking of solar generation, the battery begins to discharge. In some regions, the batteries may be charged from the grid, in addition to solar. As one example, the optimization engine described herein makes a decision, based on a rate plan (which indicates the price of grid power at various times of day), and the predictions of solar consumption and energy consumption, whether there will be sufficient solar power to charge up the battery storage to a sufficient level to cover the expected consumption at the evening peak. For example, suppose that it is predicted that tomorrow, the solar excess is 5 kWh, but that tomorrow, during the expensive period of grid energy, there will be 7 kWh of energy consumption. That is, if left to charging only via the sun, the battery will not have enough energy stored to cover the evening peak. In this case, the battery is charged during a cheaper period (e.g., midnight, according to an example rate plan), where the battery is charged up to 78% in this example (and not fully) where the remaining 22% is to be filled up by the expected or predicted amount of solar power to be generated, so that the battery will have enough energy stored by the time the peak energy consumption occurs to match the 7 kWh expected consumption. As another example, if the energy consumption prediction indicates that for a given 30 minute block of time (e.g., between 4 PM-4:30 PM), that there will be a 1.2 kW increase (e.g., because the user typically turns on the oven at that time on weekdays), a plan is generated that takes that into account.

As shown in this example, the consumption and solar generation prediction are used to guide the optimization for generating a device control plan. For example, the predictions are generated to be used as inputs to generate an optimal control plan for the house. The optimal control plan is determined to optimize against one or more goals, such as avoiding using grid power during a period where it is expensive. In some embodiments, the genetic algorithm is configured to optimize for maximum value delivery against the metric that the algorithm is optimizing against, which may be economic (e.g., benefit of the utility against wholesale energy costs, against the tariff for the customer) and/or environmental (e.g., optimizing against grid carbon).

As described above, device metadata (e.g., minimum SoC), predictions of solar power generation, predictions of energy consumption, rate plans, etc. are provided to a solver, where the objection function of the solver is to minimize cost. The solver generates a variety of candidate scenarios on how to control the battery to minimize that cost. The most optimal option or control plan is selected. For example, the most optimal control plan is selected based on a defined risk parameter or other metrics, which in various embodiments includes factors such as the season, market conditions, or customer preferences. In some embodiments, the plan is converted into what are referred to herein as "intents." In some embodiments, intents are instructions that are provided to the battery to control its action (e.g., provided to a home energy management system 156 of FIG. 1B, which is configured to control cycling of the battery according to the intents). In the example of FIG. 2B, the intents are shown as vertical lines (i.e., the lines correspond to points in time at which the battery will be instructed to charge or discharge according to the specification of the intents). The intents are issued to achieve the desired state of charge profile shown in the bottom SoC graph 206 of FIG. 2B. In various embodiments, the intents include instructions for when to charge and/or discharge the battery, when to keep it idle, the power level at which the battery is charged and/or discharged, the duration of the charge and/or discharge cycle, etc.

Figure 2C:
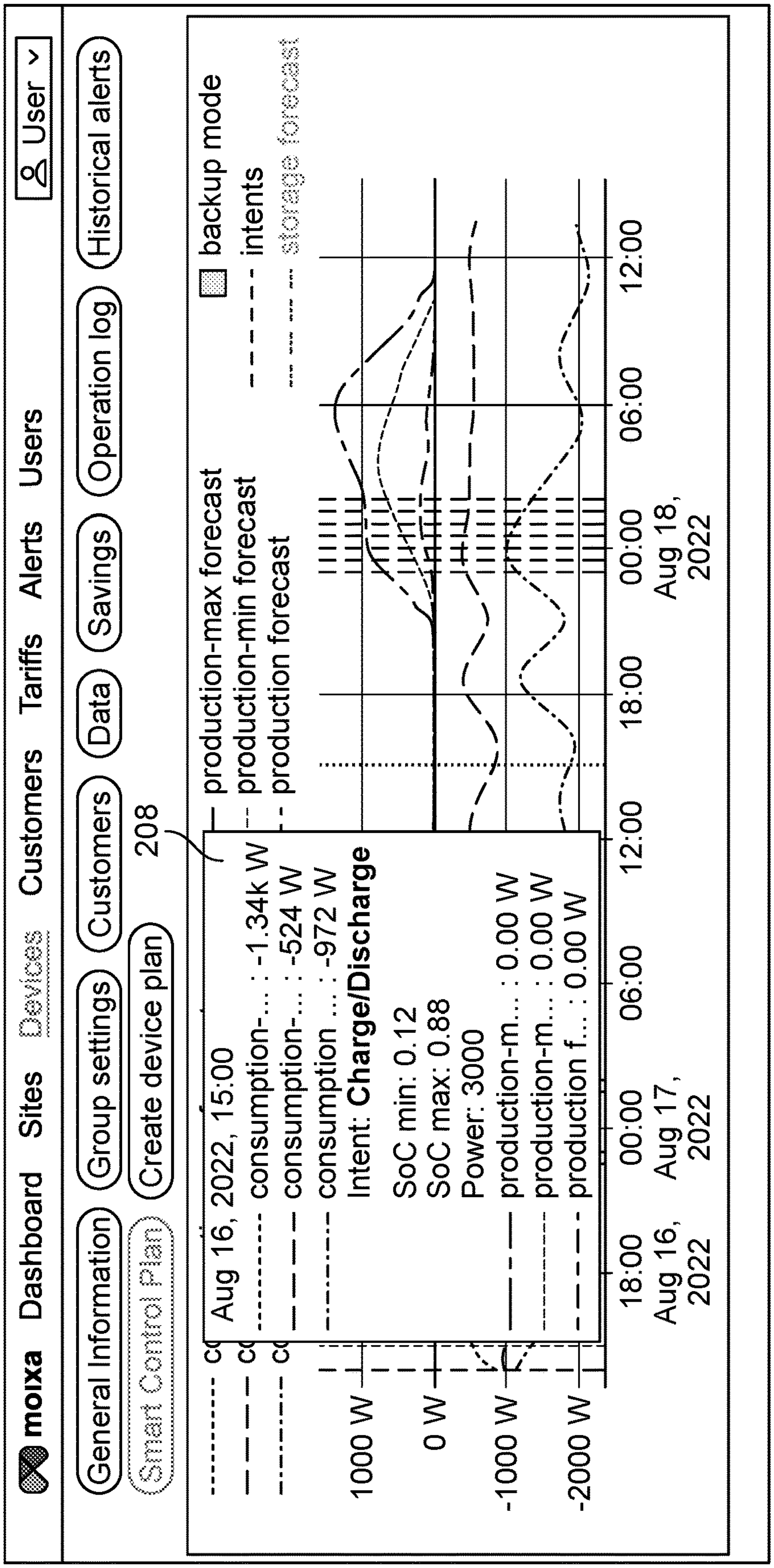
FIG. 2C illustrates an embodiment of an intent.

FIG. 2C illustrates an embodiment of an intent. The intent 208 shown corresponds to one of the vertical intent lines shown in the forecast plots of FIG. 2A. In this example, the intent, at 3 PM, is to charge at a power level of 3 kW, where the minimum state of charge is 12%, and the maximum state of charge is 88%. If the power parameter were negative in value, then this would indicate an intent to discharge. The state of charge values indicate either discharging until the minimum of the intent is reached, or charging until the maximum of the intent is reached. This is an example of an instruction that is sent to the controller of the battery. The set of intents in effect forms an itinerary for the battery for the day.

Figure 2D:
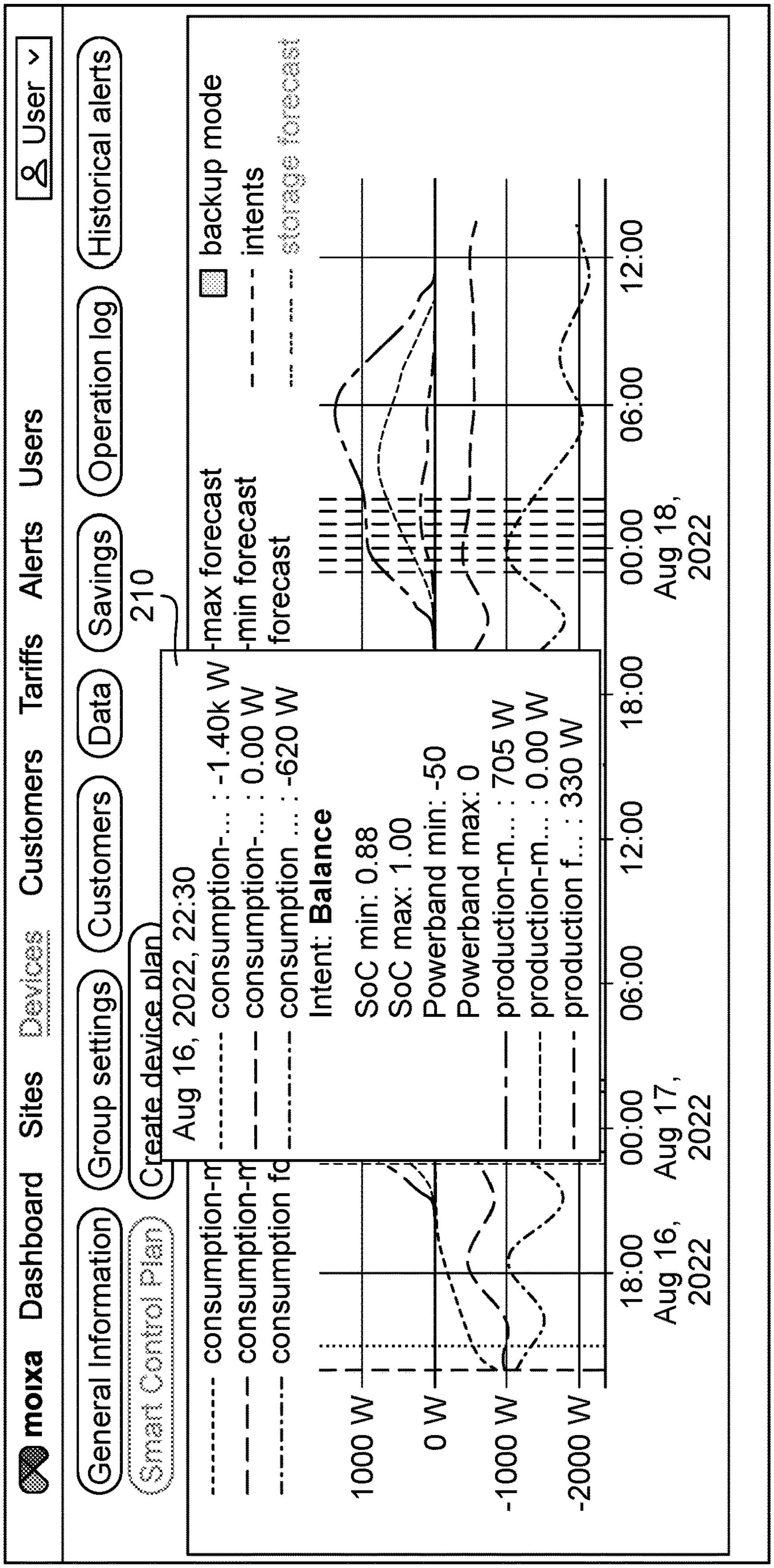
FIG. 2D illustrates an embodiment of an intent.

FIG. 2D illustrates an embodiment of an intent. In this example, a "balance" intent is shown at 210. In this example, "balance" is a mode in which, for this time period, if there is more solar than there is more consumption, then that excess solar is to be used to charge up the battery, where the battery is charged until it reaches the SoC max limit, which is set to 100% in this example.

Figure 2E:
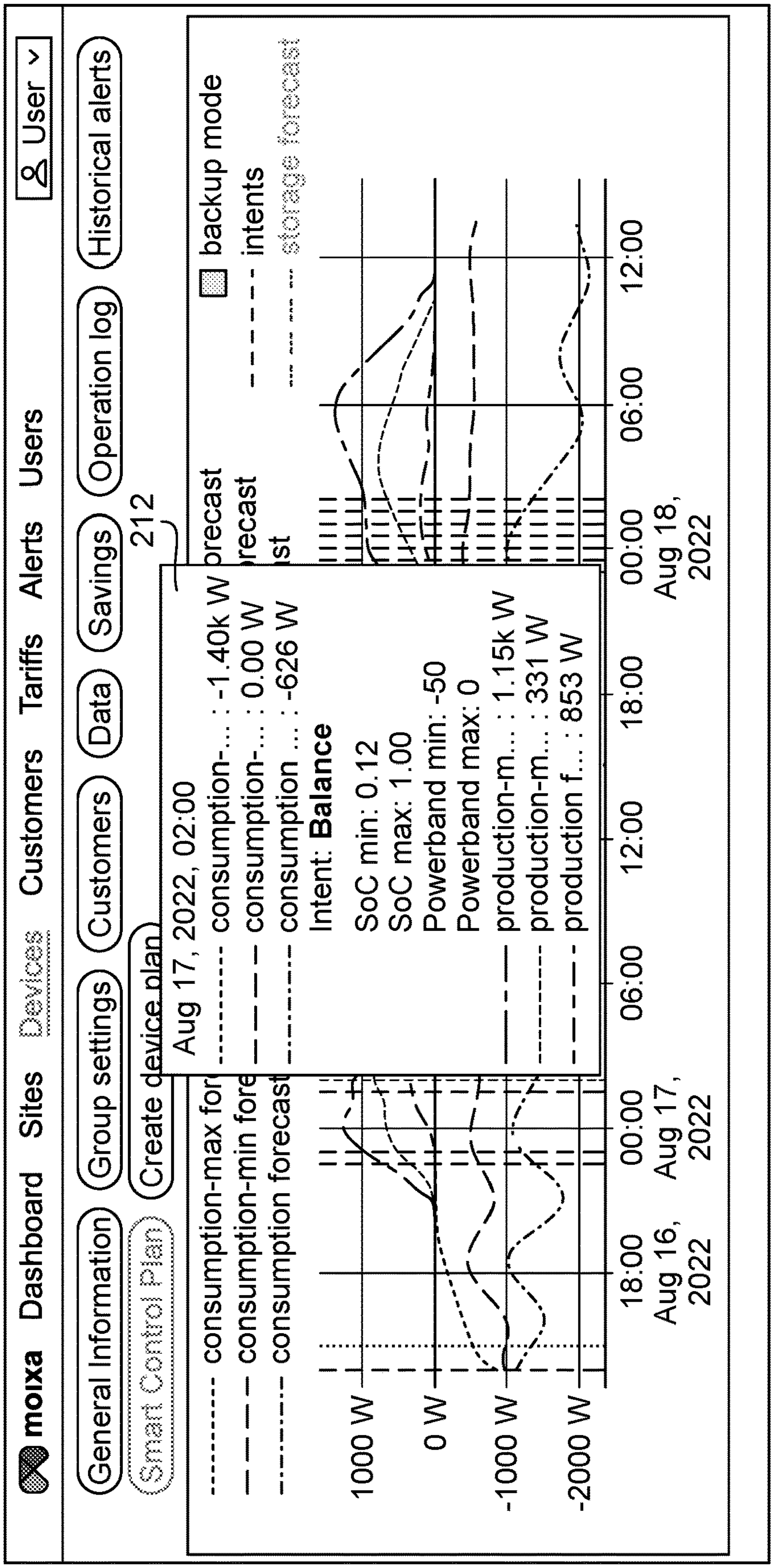
FIG. 2E illustrates an embodiment of an intent.

The opposite of this is reflected in an intent that is sent when a consumption peak is forecasted to occur, where an intent is sent to discharge the battery to meet excess consumption until a particular state of charge (e.g., minimum state of charge). An example of such an intent is shown in the example of FIG. 2E. In this example, the intent 212 is still balanced, but with a minimum state of charge of 12%. In this example, based on this intent, if there is more consumption than there is solar (which is predicted in the evening), the battery is discharged to cover the consumption until it reaches the minimum, at which point it will hold itself. Intents are sent to charge the battery at later times.

In some embodiments, an intent is based on the device being controlled and the local modes it has available (where, for example, "balance" is an example of an available local mode that the battery storage device can be instructed to operate in).

In some embodiments, the intent includes a minimum and/or maximum SoC band. The intent also includes an instruction to either charge or discharge. The instruction to charge or discharge may be specified according to a particular setpoint (e.g., power level). Other examples of parameters specified in intents that are sent to inverters/home sites include minimum/maximum power band, start and end times, etc. In some embodiments, such parameters may be used to smooth the execution of control plans.

In some embodiments, a mode of operation is also included in the intent. The "balance" mode described above is an example of such a mode, in which the battery is controlled according to a mode in which self-consumption is desired (i.e., minimizing usage of the grid), where excess solar power is used to charge the battery, and consumption excess (not covered by solar) is covered by the battery. Other examples of modes in intents include prioritizing charging of the battery via solar, where for any solar power that is being generated, it is provided directly to the battery first (rather than other household loads)—that is, charging of the battery up to 100% via solar is prioritized over providing power for other loads (which may then instead be provided power via the grid). If a mode is specified in the intent, the battery is instructed to operate within that mode. For example, if an intent indicates that the battery is to be in balance mode between 9 AM-12 PM, then the battery is controlled to take any excess solar and use it to charge the battery during that time period. In this mode, if at any point consumption is more than what is being generated by the solar panels, then the battery is discharged to meet that need.

Other examples of modes include half balance modes. For example, in one embodiment of a half balance mode, the battery is charged from excess solar, but the battery is not discharged to supply power if consumption exceeds what can be sourced from the PV panels (and instead grid power is used to supplement the solar panels, rather than the battery). On the opposite side, the battery may be placed in a mode to discharge the battery if there is any excess consumption (consumption not met by solar), but to not fill the battery with excess solar. The different modes may be used to facilitate achieving of different targets.

As described above, in some embodiments, the device control plan optimization engine 122 determines an optimal control plan for a site and transmits the device control plan to a site for execution.

In some embodiments, two days of forecasts and control plans are generated and provided to a device at a time. In the example of FIG. 2B, two days (48 hours) of predictions and control plans are shown. As shown in the examples of FIG. 2C-2E, the intents generated over the span of the 48-hour period are different, reflecting the different predictions of solar generation and energy consumption for those two days (where the predictions for the first 24 hours are not necessarily the same as the predictions for the second 24 hours). For example, one day may have a large amount of sun, while the next day may have little sun. Depending on the amount of sun (and solar production) forecasted for the next day, control plans for the night before may include completely different instructions/intents. In some embodiments, the examples of FIGS. 2A-2E illustrate embodiments of interfaces for providing information pertaining to the state of an energy system at a site. For example, the information may be provided via interfaces presented to homeowners. As another example, the interfaces are a partner-side interface (e.g., provided to installers or operators that monitor the performance of energy system installations). For example, the interfaces may be used to facilitate customer support. For example, if a homeowner requests an explanation as to why their battery is operating in a certain way, a customer support representative can use the interfaces to determine what predictions were being made to generate the battery control plan, and provide an explanation to the homeowner accordingly.

In some embodiments, a 48-hour plan (which includes intents executed over the next 48 hours) is sent to the energy storage device. The battery storage control plan is stored locally at the device. In some embodiments, the 48-hour plans are sent periodically, such as every 24 hours. Other durations of plans may be sent at various other frequencies. For example, rather than planning on a daily or 48-hour period, a longer term optimization may be performed (e.g., over the course of a year). In other embodiments, the intents are sent as instructions that are executed immediately upon receipt (and are not necessarily locally stored for future execution).

The overlap in plan length (48 hours) and frequency (where, for example, a new 48-hour plan is generated and delivered every 24 hours) allows for a rolling window of plans. This has various benefits. For example, with respect to redundancy and reliability, even if a site loses Internet for a day, the device will still have a day of smart planning available. In some embodiments, if after 48 hours, there is still not Internet (and a new plan cannot be sent from the cloud entity to the device), then a default control plan is utilized.

Accounting for Variability in Generating Device Control Plans

As described above, device control plans are generated based on forecasts of solar production and energy consumption. The forecasts themselves are predictions with variability. For example, accurate predictions may be more reliably generated if a customer at a home site has a regular pattern of behavior. However, users may vary and have random spikes in behavior. Similarly, there may be varying amounts of variation in solar production from day to day. If the energy storage control plan is optimized based on inconsistent data, this may result in less optimized usage of resources. In some embodiments, the optimizations described herein (e.g., to generate an optimal battery control plan) are weighted based on how aberrant a household's consumption behavior is.

In some embodiments, to prevent overfitting of device control plans to forecasts, the process of generating device control plans takes into account the statistical variability of the solar production and energy production forecasts when determining the optimal control plan to provide as output.

For example, as described above, in some embodiments, the output of the forecasts is a probability distribution. Statistical measures such as $10^{th}$ percentile, median ($50^{th}$ percentile), and $90^{th}$ percentile values are determined. In some embodiments, the values of the plan generated at the median are evaluated, as well as the difference in value between the $10^{th}$and $90^{th}$ percentile outputs. If there is a large difference in the $10^{th}$ and $90^{th}$ percentile boundaries of the plan, this indicates that there is a higher likelihood of over-fitting.

For example, if there is a large difference between the 10% and 90% bounds, then this feeds back into the decision of how a prediction is used, where a more risk-averse mode is entered, in which more conservative assumptions are made. For example, the control plan optimization algorithm is configured to handle the spread in predictions. In some embodiments, a greater amount of deviation in the prediction is treated as a higher risk when selecting a control plan, where the higher risk is translated as a higher cost. In some embodiments, a wide probability distribution reflects a likelihood of a particular future occurring, and optimization is performed against these scenarios, which is one example location of where the risk is captured. A more aggressive or pessimistic approach may also be taken by adjusting how tightly optimization plans are fitted to a particular exact eventuality occurring.

In some embodiments, the optimization algorithm used to generate the device control plan performs a random walk to create a range of candidate future scenarios within the probability distributions of the solar production and energy consumption forecasts, evaluates the max and min predicted values ($10^{th}$ and $90^{th}$ percentile values), and, given the various forecasts and optimization goals described above, generates a plan for the day that is within the minimum and maximum. Where there is a larger deviation between the min and max (where the risk is reflected in the tightness or closeness of the $10^{th}$, median, and $90^{th}$ percentile traces, and a larger gap or area between the min and max is indicative of larger risk of inaccuracy), the optimization is performed according to a tighter region around the median. If there is a smaller gap, then more variability between the $10^{th}$ and $90^{th}$ percentile predictions is allowed when performing the optimization.

As part of the optimization process, various candidate device control plans are generated. In some embodiments, if large variation is observed for a candidate device control plan (e.g., the difference in savings there would be if the min and max forecasts were what occurred in reality), then that plan is downgraded. In this way, uncertainty is dealt with and overfitting to a predicted reality (that might not take place) is avoided.

The following are further details regarding determining an optimal device control plan. For example, a random walk is taken within the prediction traces to generate a multitude of scenarios. In some embodiments, a scenario corresponds to an SoC curve for the battery (e.g., SoC level at various times during the period over which the plan is constructed). The cost of each scenario is determined. For example, if the scenario involves increasing the battery level by charging using grid power in the middle of the night (where the prediction indicates that there will be no solar), then a rate plan is used to determine the cost of that battery charging using grid energy. The various costs to the homeowner that will be incurred as a result of having the battery charged or discharged to certain levels at certain times are determined (which may in turn affect how energy is sourced to meet predicted consumption). Different scenarios will have different costs. For example, one scenario may involve charging a battery up to 100% overnight, without having solar power to top up the battery. There is a cost to fully charge the battery from the grid overnight. Another scenario may involve no charging overnight, purely relying on solar production. However, based on the predictions of energy consumption and solar generation, this may result in there being insufficient renewable sources of energy to cover the predicted energy consumption at the evening peak, in which case there will be a cost to use the grid to make up the difference in energy to support for the predicted consumption. Yet another example scenario may involve charging the battery to an intermediate amount over night, such as 30%.

The costs of various predicted scenarios are determined. The various candidate predicted scenarios are ranked or prioritized based on cost (e.g., to the homeowner), where lower cost plans are ranked higher. In some embodiments, the candidate scenarios are also ranked according to a risk factor, where the risk factor is a measure that is indicative of the amount of variability in the solar production and/or energy consumption forecasts upon which the optimal control plan is determined.

For example, the greater the spread in the forecasts (e.g., the greater the difference between the min and max forecasts), the higher the risk factor, as the greater variability in the forecasts will translate to greater variability in the predicted costs of the scenarios. For example, consider solar production in the middle of the night. The $10^{th}$ and $90^{th}$ percentile predictions for solar production will be in a tight band around the median (which for example is OW for that period of time in this example). That is, the real solar production is unlikely to deviate much from the median. If the battery is to be charged at this period, then it is almost certain that any charging will be sourced from the grid (and none from solar), and the cost to charge the battery storage during the time frame can be reliably computed as the cost to draw power from the grid, without much if any expected deviation or variability. This provides a level of certainty when generating the optimal control plan for the battery storage (or EV charger, HVAC, or other energy resource).

On the other hand, consider the prediction of daytime solar production. Because of the variability of various factors such as cloud cover, shading, etc., the actual amount of solar production could be in a wide range, as reflected in the forecasted solar production plots of FIG. 2A. The actual amount of solar power generation may deviate substantially from the median, and thus, if a control plan were generated based solely on the median for this period (and relying on the median amount of solar production), then the control plan may not be optimal in reality. For example, if the $10^{th}$ percentile value is significantly lower than the median production value, there is a relatively high likelihood that solar production could be far below the median value, in which case much more grid power would be needed, driving up the cost (as compared to if the median value had been solely relied upon as the basis for device control planning). If the $90^{th}$ percentile value is much greater than the median, then there is a high likelihood that solar production would be far above the median value, in which case much less grid power would actually be needed, and thus there would be a lower actual cost for charging the battery storage (as compared to if the median value were relied upon). For example, suppose a candidate control plan is optimal if the actual solar production and energy consumption track closely with the median forecasted solar production and energy consumption, and is sub-optimal if the reality deviates away from the median values. If the $10^{th}$ and $90^{th}$ percentile bounds of the forecasts are close around the median, then this actual tracking of reality to the median is likely to occur. However, if there is a large gap between the $10^{th}$ and $90^{th}$ percentile values for the forecasts, then this is an indication that it is unlikely that reality will track the median value, and the control plan is unlikely to be optimal in reality/practice.

Based on the ranking based on cost and/or risk profiling, a candidate scenario is selected as an optimal energy storage device control plan for dictating the behavior of a battery storage device at a site. In some embodiments, that plan is converted into a plan executor that takes the desired energy storage SoC curve (e.g., state of charge of the battery storage over time) and generates instructions (e.g., intents described above) to achieve those planned battery SoCs at the planned times of the selected plan. For example, if the SoC is to be increased from X amount to Y amount within a certain period of time (e.g., half an hour), an intent is generated to charge the battery at a certain rate (e.g., power level) for a duration of time, until the maximum specified SoC for that intent (where the power level of the charging is determined based on the amount of time that charging is allowed to occur, and the amount to be charged by, which is determined based on the upper SoC limit).

Thus, as described above, in some embodiments, for a given plan, a value (e.g., saving or lowest cost) for the household is generated. The genetic algorithm generates numerous (e.g., thousands of) plans. Based on the savings and the variability of the candidate plans, an optimal plan for the household or site is selected.

In some embodiments, a list is maintained of sites with more than a threshold amount of variability. For such sites, a structurally more risk-averse approach is taken. In other embodiments, the variability of a site is determined from the probability distributions generated for the site, and a more risk-averse approach is taken when the variability of the site, based on the probability distributions, is greater than a threshold. In some embodiments, the variability of a site is also determined based on a comparison of actual consumption and/or solar generation readings against predictions to determine how closely (or not) reality tracks with the predictions being made. Such information is then used as training to improve the model going forward.

Re-Triggering Control Plan Generation/Optimization

As described above, in some embodiments, on a periodic basis (e.g., every 24 hours) a new control plan is generated (e.g., for the next 48-hour period). In some embodiments, re-planning (e.g., re-generation of a control plan) is triggered in reaction to what is observed in the real world. As described above, based on the predictions of solar generation and consumption, an expected state of charge trace over the course of a day is generated. In some embodiments, the expected state of charge trace over the course of the day is associated with a threshold or performance envelope. In some embodiments, if the threshold around the expected state of charge trace is exceeded (where the actual or real SoC deviates from the expected or planned SoC by more than a threshold amount), then in some embodiments, site-level optimization engine (124) is configured to trigger a re-plan for the site, in which new predictions and a new control plan are generated for that day. For example, retriggering is performed based on SoC deviation (e.g., a threshold number of percentage points above or below an expected SoC percentage). In some embodiments, planning is also retriggered when an EV is plugged in, or when a flex event is triggered. Planning may also be retriggered to perform rebalancing, which in some embodiments occurs when an expected overall power delivery for a grid service is not met, and additional energy devices need to be dispatched in order to meet that overall power import or export requirement.

For example, with new measured data (e.g., additional collected metering data of PV production and site energy consumption), new machine learning predictions of solar generation and energy consumption are made. A new control plan is then made based on the new predictions.

In some embodiments, by default, plans are sent each night at a predetermined time (e.g., 10 PM, or any other time as appropriate). If a deviation (that exceeds a threshold boundary condition) with respect to the planned SoC occurs in the middle of the day, suppose at 2 PM, an ad-hoc re-plan or refresh is triggered, and a new plan is sent. In some embodiments, the ad-hoc plan that is generated is another 48-hour plan, just as with a regularly scheduled plan (e.g., has a same planned period). In some embodiments, the regular default planning is still also performed, where another plan will be generated and sent at the predetermined time (e.g., 10 PM in this example). In some embodiments, the local battery controller (e.g., energy management system 156) is configured to execute, at a given time, the most recently received intent that is available for that moment.

Figure 3:
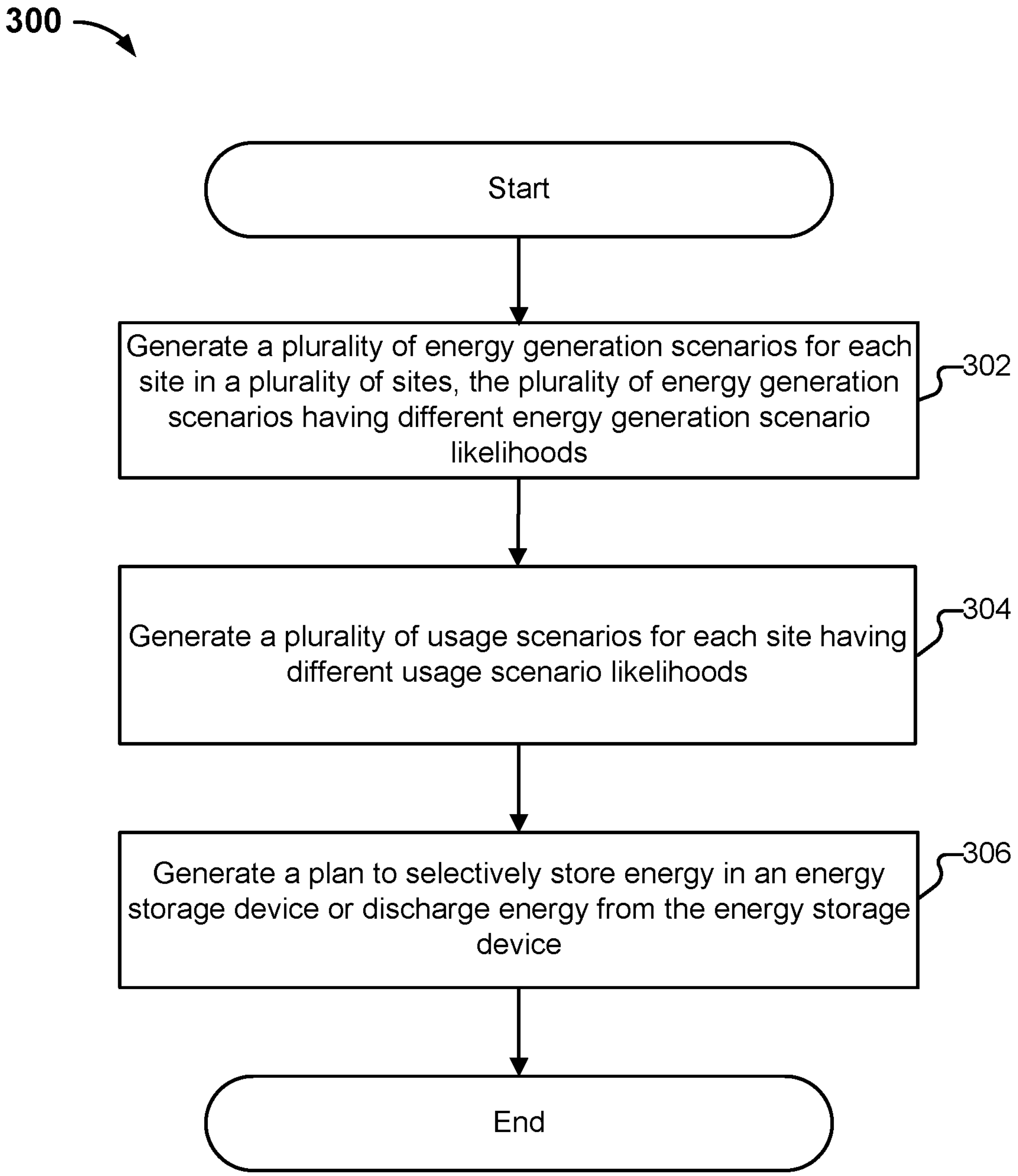
FIG. 3 illustrates an embodiment of a process for generating an energy storage device control plan.

FIG. 3 illustrates an embodiment of a process for generating an energy storage device control plan. In some embodiments, process 300 is executed by device control plan optimization engine 122. In some embodiments, the energy storage device control plan is used to selectively store and discharge energy at a plurality of sites. The process begins at 302, when a plurality of energy (e.g., solar) generation scenarios is generated for each site in a plurality of sites, the plurality of energy generation scenarios having different energy generation scenario likelihoods. At 304, a plurality of usage scenarios is generated for each site having different usage scenario likelihoods. In some embodiments, the energy (e.g., solar) generation and usage scenarios are determined by performing random walks according to probability distributions generated for the solar generation and consumption, further details of which are described above. At 306, a plan to selectively store energy in an energy storage device (e.g., battery or fuel cell) or discharge energy from the energy storage device is generated based at least in part on a plurality of optimization criteria and on the plurality of energy generation scenarios and usage scenarios. In some embodiments, the optimization criteria include residential-side criteria (e.g., behind-the-meter criteria) and grid-side criteria (e.g., front-of-meter criteria, such as those relating to virtual power plants (VPP), further details of which are described below). In other embodiments, the plurality of energy generation scenarios and usage scenarios are used to determine how to control consumption of energy by loads (e.g., EVs, EV chargers, HVAC units, etc.). This includes, for example, temporally shifting usage of such controllable loads, such as controlling when EVs are charged (which may also be based on the predicted time at which they will be connected/disconnected), controlling when HVAC units such as air conditioning units or heaters are turned on (e.g., when there is predicted to be excess solar), etc. In this way, energy devices in a home are optimally controlled in order to achieve various functions or goals, such as cost saving, grid service delivery, etc.

Figure 4:
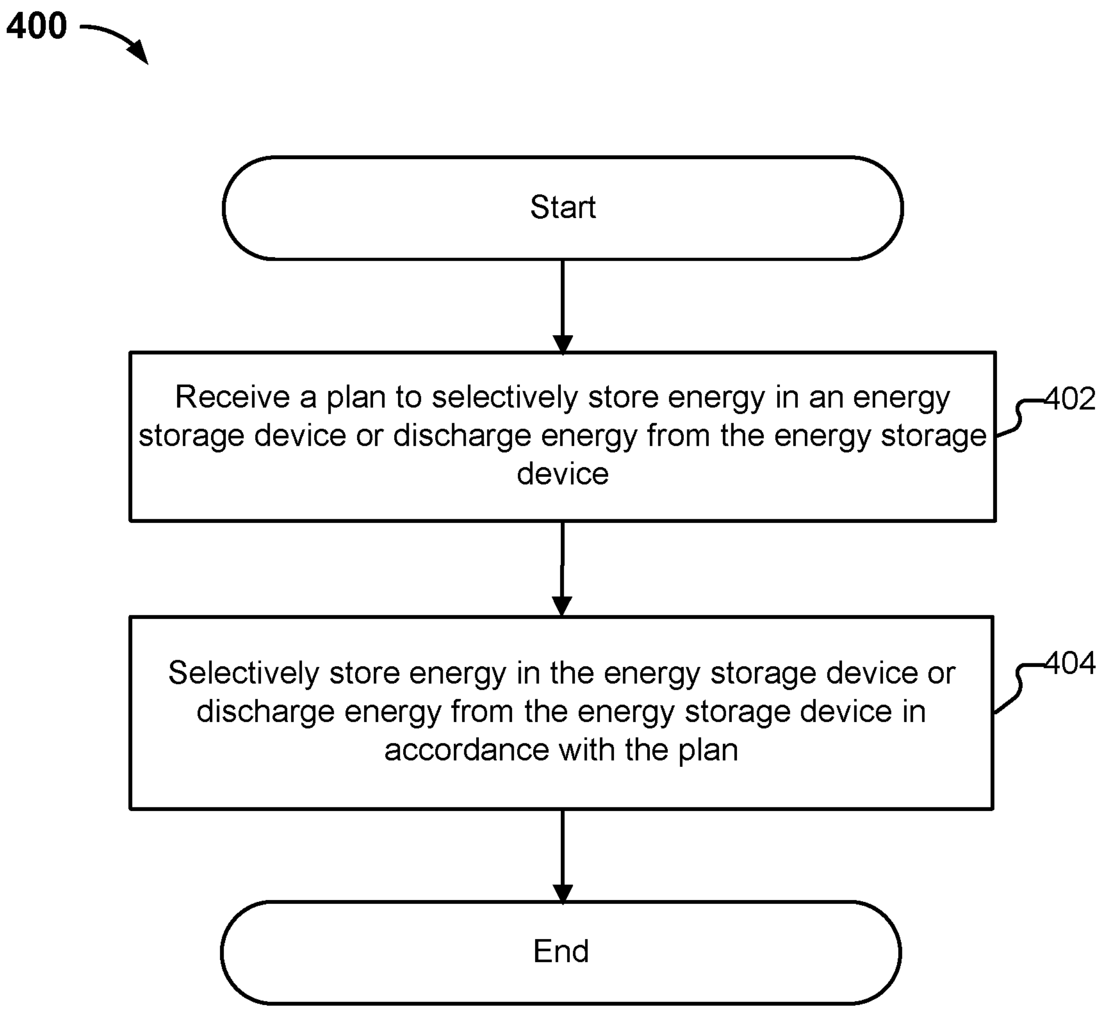
FIG. 4 illustrates an embodiment of a process for executing an energy storage device control plan.

FIG. 4 illustrates an embodiment of a process for executing an energy storage device control plan. In some embodiments, process 400 is executed by an energy management system such as energy management system 156. The process begins at 402 when a plan to selectively store energy in an energy storage device or discharge energy from the energy storage device is received. In some embodiments, the plan is generated using process 300 of FIG. 3. In some embodiments, the plan is received from a remote entity (e.g., planning system 106) configured to generate the plan. In some embodiments, the plan is received at a controller configured to control behavior of the battery. At 404, energy is selectively stored in the energy storage device or discharged from the energy storage device according to the received plan. For example, the energy storage device is cycled according to the intents in the received control plan.

EV Optimization

The number of electric vehicles (EVs) is increasing. EVs typically have large batteries, and significant amounts of power may be needed to charge up the energy storage of an EV, as compared to other loads in a household.

In some embodiments, as part of predicting consumption by evaluating historical customer behavior over time, the energy provisioning planning system performs a machine learning prediction to predict when an EV at a site will be charged (e.g., plugged or unplugged). This EV-related information is also included in training data used to train the machine learning model to determine the energy consumption forecast that is in turn used to determine an optimal control plan for controlling the home's energy storage device. For example, optimization between the energy storage system (ESS) and the EV and the household loads is performed to prevent competing for solar power generated by PV panels.

In some embodiments, EV connection and disconnection events are modeled independently and are then used to sample different scenarios for the planner to optimize within a min-max fashion. For example, optimization is performed in such a way that the worst case scenario has the minimal cost possible.

For example, goals may be set to reduce grid import during expensive periods, but also keep the battery full, all while needing to fulfill charging of the EV (which may be a significant amount of energy consumption to be covered). As one example, a control plan is selected that is optimal in terms of minimizing cost to the homeowner while achieving the desired goals. As described above, the selected control plan will be a function of the predicted amount of solar generation over time, a rate plan, etc., where an optimal control plan that most efficiently utilizes the "free" solar energy and minimizes any grid charging while fulfilling consumption needs is met. In this way, management of charging of the battery and of the EV is optimized in a manner that minimizes cost.

As one example, consider a determination of an optimal time/manner in which to charge an electric vehicle (EV). In this example, using embodiments of the techniques described herein, the planning system is configured to determine what the sun will be doing throughout the day. The system also determines a predicted non-EV consumption. A user may indicate (e.g., via a user interface such as a mobile app, further embodiments of which are described below) that they need a certain amount of range (e.g., 80 miles) by a certain time (e.g., 2 PM, because they are picking up their children from school). In some embodiments, the EV usage is predicted based on analysis of historical consumption. The various goals and predictions are taken into account in order to generate an optimal plan for utilizing the battery storage device, EV, or HVAC (where there may also be a higher-level optimization goal of making the most amount of money given a tariff or metering plan, or to minimize the amount of grid usage for environmental reasons).

While in this example, the site-level optimization (to reduce the overall cost to the customer or owner of the house) is configured to take into account a load such as an EV, other types of load devices (which may be controllable) may also be taken into account when performing site-level optimization, such as heat pumps, and their effects (e.g., on heating and cooling, which may affect the consumption and usage of heaters and air conditioning units).

Front/Behind the Meter Optimization

In the above examples, the energy provisioning planning system makes predictions and control plans on a per-site basis. In some embodiments, the individual site-level predictions and energy storage device control plans are aggregated to determine aggregate predictions and control plans for optimization against goals at a multi-site level. In some embodiments, the multi-site level optimization is run along with the individual-site level optimization to determine device control plans that are optimal at both an individual site level, as well as a multi-site level (where such characterization is also referred to herein as "co-optimization"). For example, the impact of the multi-site level optimization on the individual-site level optimization is considered, and vice versa.

For example, consider virtual power plants, which are a collection of home energy storage devices (e.g., batteries and EVs) that are controlled in aggregate to perform one or more actions (e.g., to supply power, effectively becoming a power plant). As described above, using the techniques described herein, behind-the-meter optimizations are performed, where the states of individual devices (energy storage) at various points in time are accurately predicted on a per-site basis. This provides a bottom-up sum of all of the various devices that may be used as a fleet in a virtual power plant context. Using these individual device-level predictions, the energy provisioning planning system is able to accurately determine, for example, at 2:30 PM tomorrow, the predicted amount of energy available across the fleet of devices. Having such a granular level of prediction (on a site-level basis) provides more accurate dispatch of such energy. In this way, the larger scale (multi-site level) prediction is based on the aggregation of many smaller predictions (individual site level). This also allows various errors to cancel out, providing a high-quality result.

As described above, based on tariffs or rate plans, using the site-level energy optimization techniques described above, the device control plan optimization engine determines a behind-the-meter optimization for a specific site, where based on a variety of factors and goals—such as known expensive periods of using grid energy, which are to be avoided, as well as predictions of how much solar will be generated and the amount of consumption for a site, and a prediction of the state of charge of a battery at that time—an optimal control plan for deploying the charge in the battery at a site is determined. For example, the battery control plan is generated so that if it were battery power being consumed by the household, then importing energy from the grid is avoided, yielding a cost savings.

However, suppose there is an issue with a substation. In this case, there may be a benefit to discharging the battery (as well as the batteries of other residential sites) back to the grid during such an event. In some embodiments, the energy provisioning planning system performs an optimization of whether the device should be controlled in a manner to facilitate discharging to the grid (an example of a front-of-meter optimization). In some embodiments, with respect to the control of the battery, the energy provisioning planning system compares the benefit of discharging the battery to the home loads (for self-consumption) against the benefit of discharging the battery to the grid to determine how to optimize control of the site's battery. In this example, behind-the-meter and front-of-meter goals are being optimized concurrently, resulting in a form of co-optimization. Using the co-optimization techniques described herein, site-level optimizations may be balanced against fleet-level optimizations to determine an overall optimal plan for controlling a household's storage device. In this way, optimization is performed based on both "behind the meter" (site level) criteria and "front of meter" (fleet/grid level) criteria.

Consider the following example in the context of a virtual power plant, in which a group of individual energy storage devices at various sites (e.g., homes) are aggregated into a collective or fleet of storage devices. Suppose that it is known that a certain amount of megawatts is needed to be delivered over a time period. Each of the sites that have energy storage devices that are enrolled in such a virtual power plant service or program are evaluated against an algorithm.

For example, each site is queried to determine an energy-cost curve that indicates the amount of energy the site's battery storage can provide, and at what price. This results in each site having a corresponding range of options for how much energy it can provide, and the cost for delivering the various amounts of energy. The energy-cost curves across a group of sites are aggregated to determine a plan for providing an aggregate amount of power at the lowest cost to meet the power delivery requirement by utilizing the various individual sites. For example, based on the aggregate analysis for satisfying the delivery requirement, it is determined that the energy storage devices at four sites should be utilized, but not two other ones, due to their power being expensive. An aggregate delivery plan (e.g., control plan instructions for discharging the energy storage devices at the selected participant sites) for a given virtual power plant contract is then generated.

In the above, the lowest cost is not necessarily the cost to the grid for purchasing the power from the sites. In some embodiments, the cost is the opportunity cost to the sites for deviating from the site-specific control plan determined for them. The following are examples of determining an opportunity cost for each of the participants in the delivery plan. For example, as described above, for each site, a site-level "behind the meter" control plan is determined that optimizes for goals such as saving costs.

When a site is involved in a VPP delivery control plan, their energy storage device is being requested to operate in a manner that deviates from the optimal site-level "behind the meter" control plan. Because the homeowner is deviating from their site level control plan (which has been calculated to be the optimal plan from, for example, a cost saving perspective), the homeowner's cost will increase, because, for example, they will not have as much energy stored in their battery in the evening to help them save on their bill.

In some embodiments, the opportunity cost for a site is determined as the difference between the amount of money that would be saved if the site-level optimal control plan had been utilized, versus the amount that would be saved if the energy storage device were discharged as part of the VPP service. For example, suppose that the behind-the-meter control plan saves the customer $3 on that particular day. Because the customer was dispatched for the VPP service, they now have one kWh less in energy in the storage device. In this case, suppose that the savings is now $2.50. In this case, the cost of them providing that kWh is 50 cents. In this example, the opportunity cost is the estimated lost savings from performing the VPP service, where the cost is a decrease in the amount saved.

How much a user is paid is dependent on a business model. In some embodiments, the opportunity cost is not directly used to determine a control strategy, but it may be generated as a potential input to an optimization algorithm.

The opportunity cost can facilitate up front "cost to deliver" estimates of a long term contract, or for short term trading. The opportunity cost may also be ignored or unused altogether, for example because the customer does not own the asset (e.g., battery storage), or has an arrangement with their energy company/provider, etc.

In some embodiments, the selected participants in the delivery control plan are determined as those that have the lowest summed opportunity costs. Here, in embodiments of the co-optimization techniques described herein, the site-level opportunity cost to participating in the front-of-meter control plan is determined (where the opportunity cost is determined as the deviation relative to the savings that would be realized if the site utilized the behind-the-meter control plan). Using the techniques described herein, the energy provisioning planning system determines an optimal plan for providing, in aggregate, a requested amount of front-of-meter energy, at the lowest opportunity cost to those customers. An assessment is made in terms of how to combine slivers of provisioning of value and opportunity cost to the customer behind-the-meter to determine the total cost for delivery of the VPP service.

In this example, co-optimization is performed, as there are two optimizations occurring, where both goals (VPP goal and behind-the-meter site specific savings goal) are treated as objective functions to meet the power requirement at the lowest cost. Using the co-optimization techniques described herein, the cost of delivery of the VPP request is a function of the opportunity cost to the site customer. The opportunity cost is based on the site-level behind-the-meter control plan that is generated based on the solar generation and consumption predictions/forecasts described above. The opportunity cost is then weighed against when performing the optimization to satisfy VPP power delivery with the goal of lowest opportunity cost for site customers. That is, the optimization of VPP power delivery is based on the site level impacts, which are in turn based on site-level predictions of solar power and consumption, as well as site-level control plans that maximize benefits such as savings to homeowners.

Using the site-level control plans determined based on the site-level forecasts of solar power generation and energy consumption, the planning system 106 is able to determine the state of the fleet of energy storage devices in an accurate manner. Having site-specific state of charge information for individual devices allows for granular generation of control plans for satisfying VPP power delivery requests. For example, without visibility into the SoC of sites, guesses as to the state of charge of devices are made (e.g., an average SoC for each device is made). In order to account for buffer, more devices than may actually be needed are dispatched to participate in a VPP power delivery event. However, with the more accurate view of each site, as described herein, fewer devices can be dispatched, which brings down the cost of the service to both the purchaser of the power, as well as to site customers.

That is, in some embodiments, using the techniques described herein, the energy provisioning planning system determines, for each storage device in a fleet of storage devices, the SoC at any given point in time (using the behind-the-meter predictions described above). To satisfy a VPP power delivery request, an amount of aggregate power to be delivered is specified. Each energy storage device is queried to determine how much energy it can provide and at what cost. A range of options is provided for each site. The various options for the site are used to determine what the SoC of the device will be at the time of the VPP power delivery event. The opportunity cost for each site is determined. An optimization is performed to determine which subset of devices should be chosen and dispatched together to provide the requested amount of VPP power. When the individual devices are dispatched, the decision to dispatch the devices is based on the cost for a site's customer (e.g., savings lost) to deviate from their behind-the-meter control plan, as compared to what the customer gains from participating in the VPP dispatch (e.g., what the customer will be compensated for participating in the VPP power delivery). Using the techniques described herein, a comparison is made between the behind-the-meter cost and the front-of-meter benefit.

The co-optimization may be performed dynamically. For example, the co-optimization may be performed every half hour, or any other time-driven basis as desired. The co-optimization may also be triggered whenever there is demand for VPP power delivery.

In some embodiments, front of meter optimization also:

considers device efficiency in allocation control plans to devices within a fleet, for example so that a device discharges at a higher kW for a shorter period of time and is then seamlessly followed by other devices in the fleet in a "sprint relay" fashion. This is more efficient than all the devices discharging simultaneously at a lower kW. For example, suppose that there is a demand for 10 kilowatt-hours of energy. Suppose that 10 devices are dispatched to provide the requested 10 kilowatt-hours. One way to do so would be to have each device contribute equally, where the devices operate in parallel, providing the same contribution of energy. For example, each device discharges at the same rate of 1 kW for 1 hour. However, discharging at 1 kW may not be the most efficient discharge rate. For example, it may be more efficient to discharge a battery at a higher power. In some embodiments, rather than having each device be controlled in the same way, the dispatched devices are controlled to discharge in a relay or rolling manner, where a first subset or group of devices (one or more devices) is discharged at a higher power for a shorter period of time. After this, a next group of devices is controlled to perform discharging for a next period of time. The net effect of this is that power is extracted more efficiently from the dispatched devices, while also meeting the aggregate demand for power. In this way, the virtual power plant optimization considers not only the opportunity cost for owners of the devices, but also optimizes for the operational efficiency of the devices.

will continuously assess performance during an event, and if delivery drops beneath a given threshold against an expected delivery, reinforcement devices are provisioned in order to return to the expected delivery curve. For example, suppose that a certain amount of power is to be delivered, however a group of devices disappear and are no longer providing power (e.g., they have gone offline (e.g., lost communications) for some reason, reducing the number of devices providing power). In some embodiments, the amount of power being delivered by devices is continuously monitored. If there is a deviation from an expected power delivery due to a device going offline or otherwise becoming unavailable, then the system performs rebalancing of the overall delivery, for example, by bringing online reinforcement devices to fill in the gap in power delivery.

Figure 5:
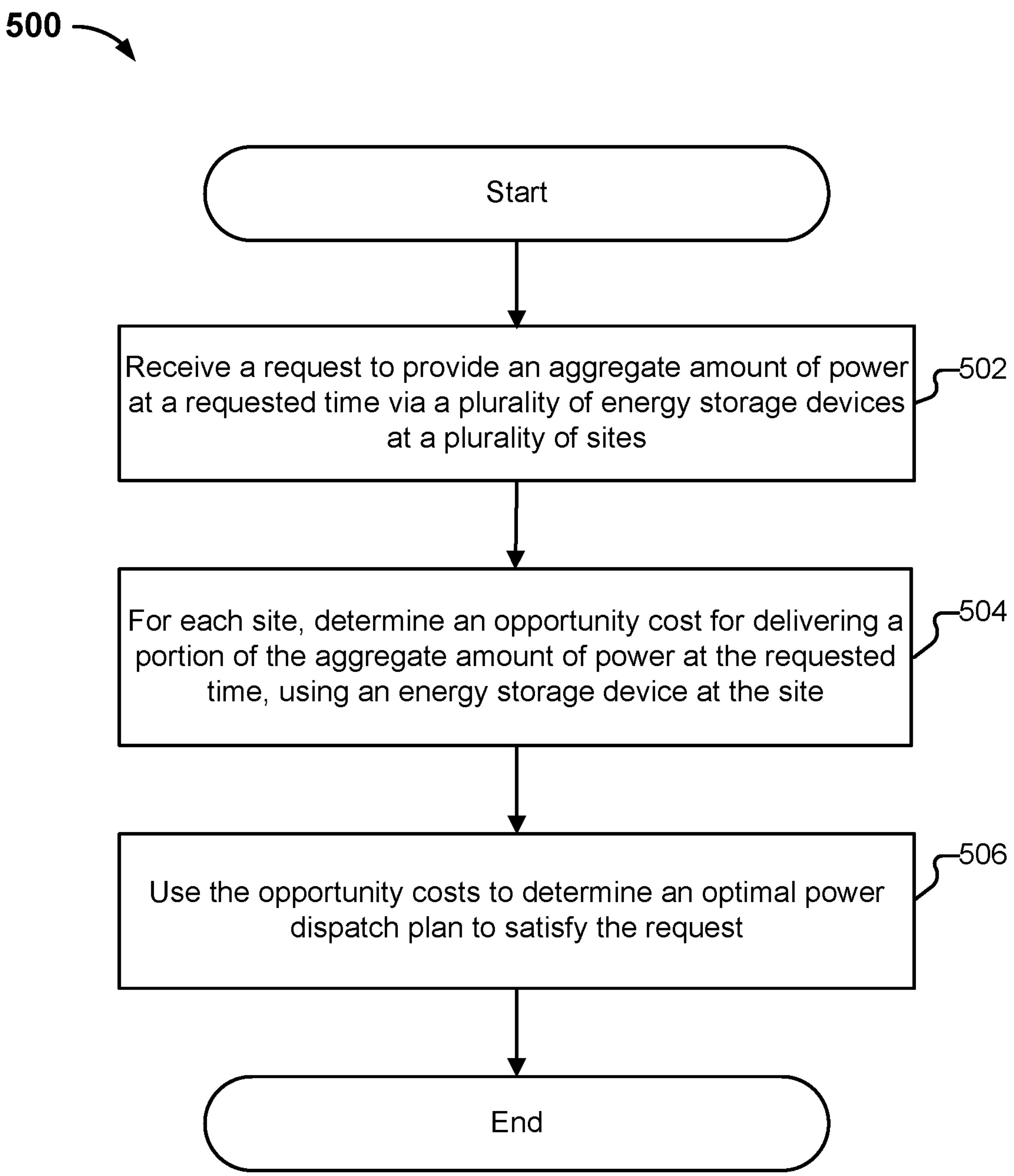
FIG. 5 is a flow diagram illustrating an embodiment of a process for co-optimization.

FIG. 5 is a flow diagram illustrating an embodiment of a process for co-optimization. In some embodiments, process 500 is executed by device control plan optimization engine 122. The process begins at 502 when a request to provide an aggregate amount of power at a requested time via a plurality of energy storage devices at a plurality of sites is received.

At 504, for each site in the plurality of sites, an opportunity cost for delivering a portion of the aggregate amount of power at the requested time, using an energy storage device at the site, is determined. In some embodiments, the opportunity cost is determined based at least in part on a deviation from an energy device control plan generated based at least in part on at least one of a forecasted solar production or a forecasted energy consumption associated with the site.

At 506, opportunity costs for the plurality of sites are used (e.g., aggregated) to determine an optimal power dispatch plan including at least a subset of the plurality of sites. Different sites in the subset of the plurality of sites are instructed to provide varying amounts of power to satisfy the request to provide the aggregate amount of power at the requested time. In some embodiments, determining the dispatch plan includes providing each site in the subset of sites a plan based on the opportunity cost determined for the site. Such opportunity costs and the request for aggregate power are examples of grid-side (front-of-meter) and residential-side (behind-the-meter) criteria that are evaluated to determine a device control plan. In some embodiments, a device control plan provided to a site is executed by an energy management system (such as energy management system 156) using a process such as process 400 of FIG. 4. In some embodiments, process 500 is an embodiment of process 300 in which both front-of-meter (grid-side) and behind-the-meter (residential-side) criteria are evaluated to determine how to control charging or discharging of energy storage devices at individual sites.

Providing Home Energy System Performance Information and Forecasts

As described above, forecasts of solar production and energy consumption at a site such as a home are used to generate an energy storage control plan. The energy storage control plan is then sent to the site, where it is then used to control the state of an energy storage such as a battery. It would be beneficial if a user, such as a homeowner of the site, were able to view information about the state of their home energy system, such as both historical and also future projected performance information of their home energy system.

In some embodiments, a user such as a homeowner uses a mobile app or application (e.g., installed on their mobile device, such as mobile device 110 or 112 of FIG. 1A), or a web-based interface (e.g., browser-based interface when using their device such as laptop 114) to access information and control their power system (e.g., solar panels, battery, etc.). As one example, via the app, visual representations of various aspects of the system may be shown (e.g., via graphs, infographics, etc.).

For example, as described above, solar generation forecasts and energy consumption forecasts for a site are generated. The predictions are then used to generate a plan for control of an energy storage device at the site. In some embodiments, the predictions and control plan are downloaded from the energy provisioning planning system and stored locally at the mobile device. The predictions may also be pushed to the device periodically (e.g., where a new 48-hour plan is pushed on a daily basis). The mobile app may also pull the predictions and plan from the remote planning system whenever the app is opened.

In some embodiments, the customer app is configured to depict those predictions and forecasts through a graphical format that communicates what is occurring at the site with respect to where power is coming from, and where it is going to at a net level. As described above, in some embodiments, solar generation forecasts, consumption predictions, and energy storage curves are provided to the mobile app from the energy provisioning planning system.

Figure 6:
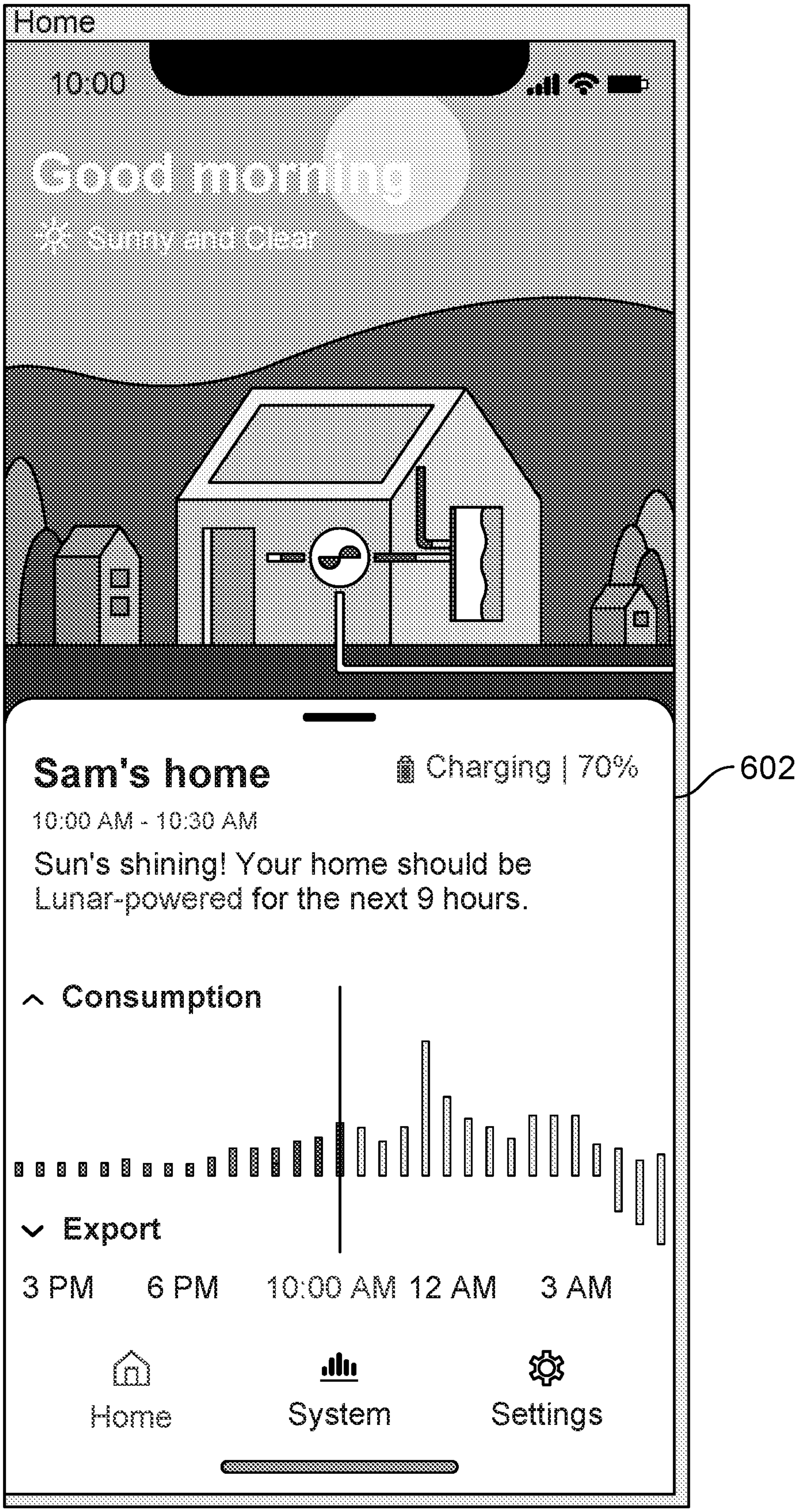
FIG. 6 illustrates an embodiment of a landing page.

FIG. 6 illustrates an embodiment of a landing page. In this example, when the user opens their app, they are provided an immediate natural language description of what is occurring. For example, as shown at 602, based on the predictions generated above for a site such as a home, an estimate is made of how long the home will be supported by solar and/or battery (without grid). That is, the estimate is a measure of how long the predicted consumption of the home will be fed by solar and/or the battery storage (without grid). In this example, the home is predicted to be consuming only battery and/or solar for the next 9 hours. That is, for the next 9 hours, the household consumption will be fully provided by the inverter (which converts DC power from the battery and/or the PV array to AC power usable by loads in the home). The following is an example of determining projected self-consumption. For example, for a given half hour time period, the predicted consumption is determined using the received consumption forecast. If the power being discharged from the battery storage device (per the control plan), in combination with the predicted power being generated by the PV array, is determined to be sufficient to satisfy the predicted consumption during a half hour time period, then the system determines that the household will be self-sufficient during that half hour time period. The number of consecutive half-hour time periods that are projected to be self-sufficient are added together to determine an amount of time that the site is projected to be self-consuming.

Other types of insights may be provided based on the predictions and control plans, such as if the system is not self-sufficient currently, when the next period will be that the system is predicted to be self-sufficient. For example, the app can display that it is currently cloudy, but that the home should be self-sufficient again at 4 PM (in the future), or that the battery should be full by 4 PM. In some embodiments, the language is generated programmatically, based on a series of conditions being met (e.g., using a logic tree that considers the weather, the predicted amount of charge by a certain time, etc.) using machine learning. In some embodiments, presented text (which may also be audio) is based on the predicted activity of the house (e.g., energy consumption forecasts). Natural language tips and descriptions may be provided to the customer.

Figures 7A, 7B, 7C:
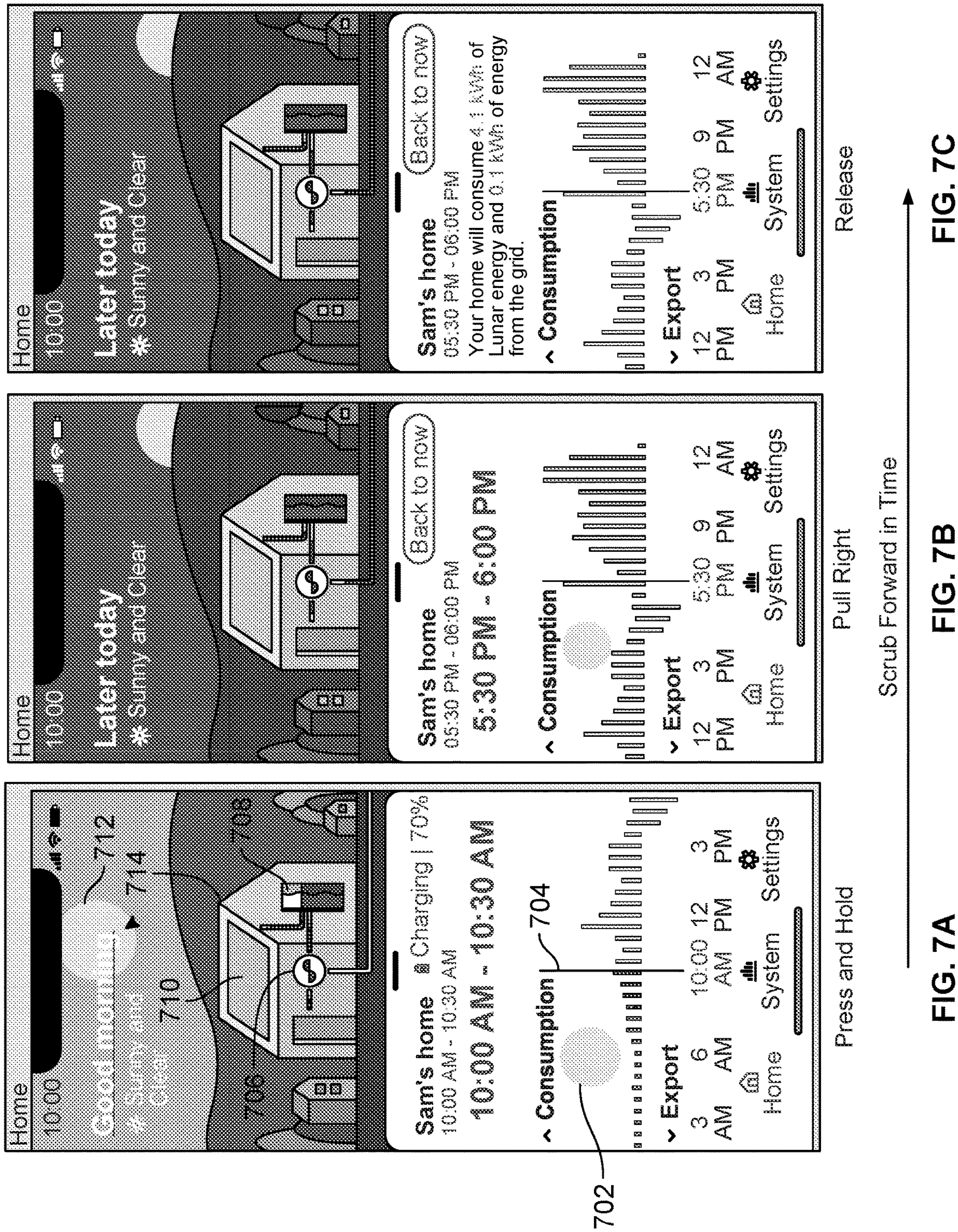
FIGS. 7A-7C illustrate embodiments of user interfaces for viewing historical and future information pertaining to a state of a home energy system.

FIGS. 7A-7C illustrate embodiments of user interfaces for viewing historical and future information pertaining to a state of a home energy system. FIG. 7A illustrates an embodiment of a scrubber visualization. In this example, using the scrubber graph shown at 702, a user may view the performance of their home energy system both backwards and forwards through time. The scrubber graph is an example of a user interface element that is a scrollable timeline that the user can scroll through. In this example, a consumption visualization is shown, along with an indication of the source(s) of the power being consumed. As shown in this example, between 3 AM and 6 AM, there is a low level of consumption in the house. In some embodiments, how the consumption is being fed is indicated, for example, via different colors. For example, one color may be used if the consumption is being met with power from the grid, with another color used if the consumption is being met using renewable sources such as battery and/or solar.

In this example, the line at (704) illustrates a time period of interest selected by the user. In this example, suppose that the line corresponds to the current time (e.g., 30 minute time period that the current time falls into). To the left of the line is the past. To the right of the line is the future. As the future has not occurred yet, what is shown to the right of the line is a predicted consumption, where the predicted consumption is forecasted using the techniques described above (e.g., using energy consumption prediction engine 118 of FIG. 1A). Here, the prediction of consumption for the rest of the day is shown. In this example, consumption is shown at half hour increments. For each half hour increment or period, a bar is shown, where the height of the bar corresponds to the amount of energy consumed. The color of the bar indicates the source of the power being consumed. The bar may include multiple sections with different colors indicating that power from multiple different sources is being consumed for that time period. The size of the portion of the bar that is of a certain color represents the proportion of the power consumed that is from the source corresponding to the color.

In some embodiments, if a consumption bar is below zero, such as roughly between 3 PM-6 PM in this example, then the negative consumption reflects exporting of energy to the grid.

In this example, the user may scroll through the scrubber graph, both backwards and forwards in time. For example, the user may use their thumb to scroll through the scrubber graph. As one example, the user presses and holds on the timeline/scrubber, and pulls to the right. In this example, the user scrolls or scrubs forward in time, resulting in the interface shown at FIG. 7B. Here, the user has scrolled to the future half hour time period of 5:30 PM-6:00 PM. As shown in this example, it is expected that the demand for power will be met by consuming power from multiple sources. Later in the evening, the battery is not used to provide power, and grid power is consumed by the household instead.

In this example, when the user releases their thumb, information about the half hour time period the user has stopped on is shown. For example, when the user releases their thumb, the interface of FIG. 7C is shown. Information about the state of the home energy system at the selected future time is shown, such as a textual explanation of what is being displayed in the bar corresponding to the selected time. In this example, a summary is provided indicating that 4.1 kWh of energy will be consumed from the PV array and/or batteries, and that 0.1 kWh of energy will be consumed from the grid.

As shown in this example, when scrubbing forward in time, a visualization of the movement of the sun 712 across the sky is also shown across the interfaces of FIGS. 7A-7C (e.g., to show the transition from day to night). Further, the battery 708 is shown to be charging up. In this example, the lines shown coming into and out of the representation of the house site 714 indicate the flows of power into and out of the house. For example, the circle 706 represents the home energy controller or management system, which is configured to provision power to meet the demand of the loads in the house. As shown in this example, the home energy management system is configured to interface with the AC output of an inverter (that is configured to convert the DC power from the battery 708 and/or PV array 710 to AC power), as well as the grid. Power may be shown to be flowing through the lines/pipes, with directionality of the power flow also shown to indicate where the power is flowing to and from.

When the user scrolls forward in time, say to the 5:30 PM-6:00 PM time bucket, as shown in the example interface of FIG. 7B, and lands on it, a predicted flow of what is occurring at that point in time is shown. In this example, as described above, text is presented indicating that during this time bucket, the home will consume 4.1 kWh of energy from the battery and/or solar, and 0.1 kWh from the grid. As shown in this example, the app uses the predictions to visually represent how much energy is forecasted to be consumed over a given half hour period, and where the power being consumed is coming from (i.e., the source(s) of power being consumed).

In the above example of FIGS. 7A-7C, the user is able to scroll forward through time to view the projected or predicted state of their home energy system in the future. The user may also scroll backward through time, where actual measured, metered data (rather than predictions) is used to determine the energy consumption bars at past times.

Figure 7D:
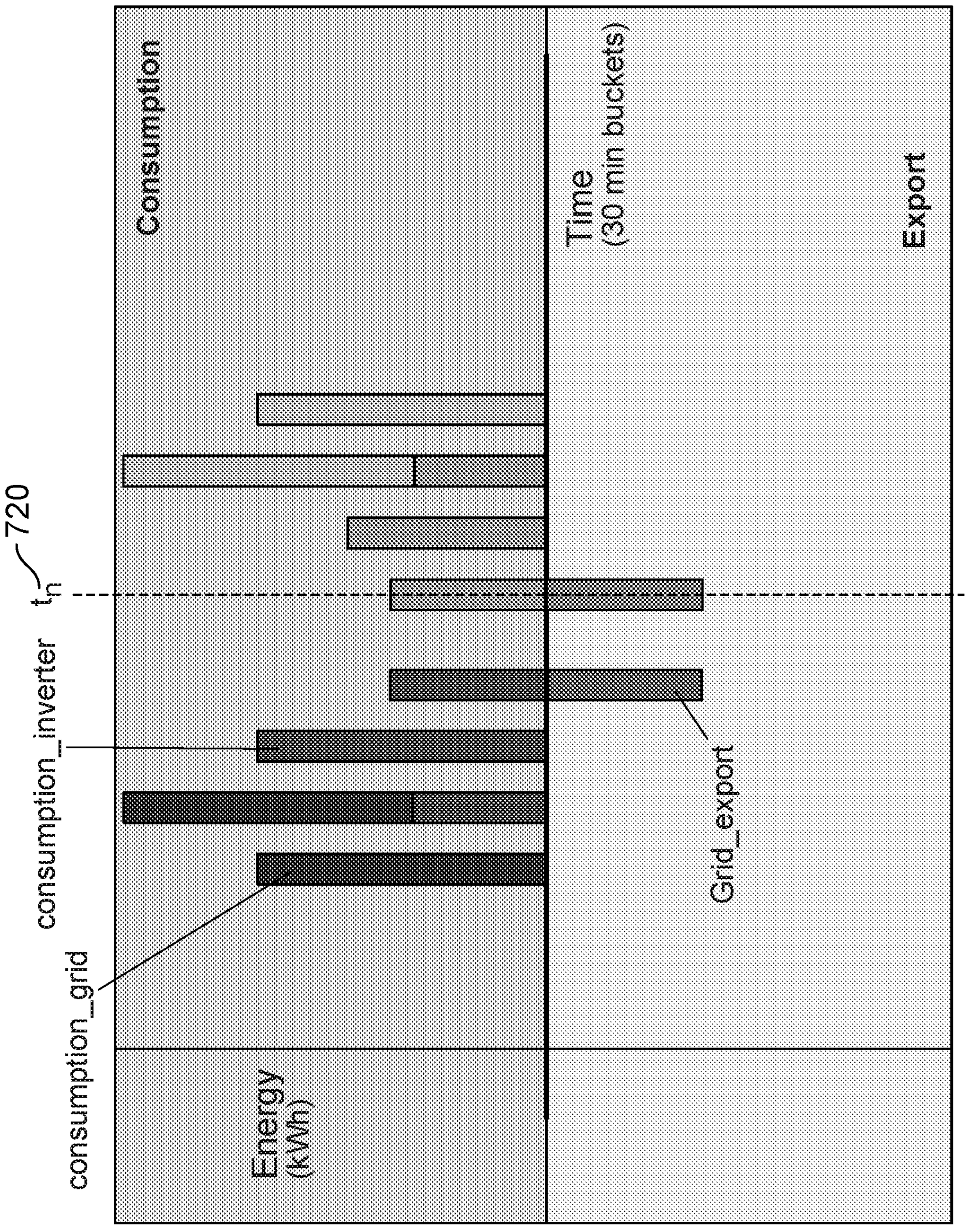
FIG. 7D illustrates an embodiment of a portion of a scrubber graph.

The following is an embodiment of determining a composition of a bar in a scrubber graph (e.g., bars in the scrubber graphs of FIGS. 7A-7C). FIG. 7D illustrates an embodiment of a portion of a scrubber graph. In some embodiments, the composition of the bars is determined based on the solar production and energy consumption forecasts described herein.

In this example, for illustrative purposes, bars are 30 minute buckets starting on the hour or on the half hour. In this example, the current bar is $t_n$ (720)

- As one example, a historic bar range is specified as 24 hours into the past=$t_{n-48}-t_{n-1}$
- As one example, a future bar range is specified as 24 hours into the future=$t_{n+1}-t_{n+48}$ In the example of FIG. 7D, the graph is split into consumption_grid (above the x-axis), consumption_lunar, and grid_export (below the x-axis)

In this example, consumption_grid is the proportion of consumption met by energy coming from the grid In this example, consumption_lunar is the proportion of consumption met by energy coming from the inverter In this example, grid_export is the energy being sent to the grid. In some embodiments, this is measured by Grid_power<0 kW Power

- Grid_power, kW=AC power reading from grid meter. In some embodiments, positive readings are import, negative readings are export
- Lunar_inverter_power, kW=AC power reading from hybrid inverter discharging solar generation and battery to the home
- Consumption_power, kW=Power being used by the home. In some embodiments, consumption power is determined as Lunar_inverter_power+Grid_power Deriving Energy from Power The following are embodiments of deriving energy from power. As one example, energy is calculated by averaging the power datapoints within the 30 minute bucket and dividing by 2 for 30 minutes buckets

- Historic_power, kW=5 min average power (other temporal granularities may be used). In some embodiments, within each $t_n$ there are 6 Historic_power points. Other numbers of historic power points may be utilized, as appropriate.
  - Historic energy30m, kWh=Sum within $t_n$(Historic_power)/(6×2)
- Future_power, kW=15m average power (other temporal granularities may be used). In some embodiments, within each $t_n$ there are 2 Future_power points. Other numbers of future power points may be utilized, as appropriate.
  - Future energy30m, kWh=Sum within $t_n$(Future_power)/(2×2)
- In some embodiments, once energy is computed, historic and future are treated the same, so the below terms can be both historic and future:
  - Grid_energy, kWh
  - Lunar_inverter_energy, kWh
  - Consumption energy, kWh Deriving Consumption Bars

- In some embodiments, if grid_energy>=0 kWh (import)
  - Consumption_grid=grid_energy
  - Consumption_Lunar=Lunar_inverter_energy
- In some embodiments, if grid_energy<0 kWh (export)
  - Consumption_grid=0
  - Consumption_Lunar=Lunar_inverter_energy+grid_energy Deriving Export Bars

- In some embodiments, if grid_energy>=0 kWh (import)
  - Grid_export=0
- In some embodiments, if grid_energy<0 kWh (export)
  - Grid_export=grid_energy The predictions described above are used to power or support or drive other types of interfaces, such as interfaces providing information with respect to the PV array and grid activity.

Figure 8:
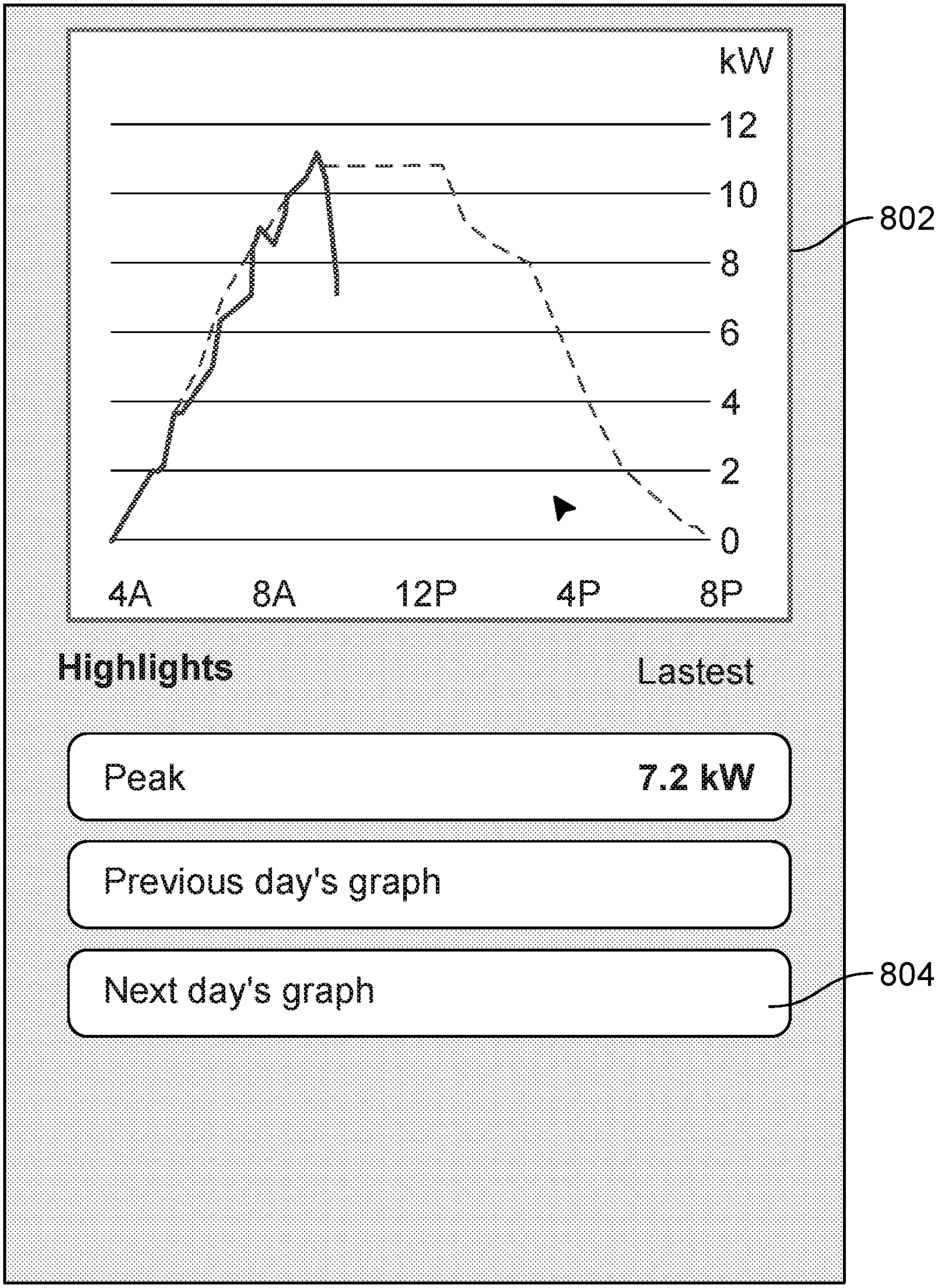
FIG. 8 illustrates an embodiment of an interface for display a predicted power curve.

FIG. 8 illustrates an embodiment of an interface for displaying a predicted power curve. In this example, a forecast of solar power generation or production over the course of the day is shown at 802. The user can also click at 804 to view a graph of the next day's power curve (i.e., view a projected power curve for a future time). A predicted solar generation curve for any other future time period may be viewed. The user may also view a previous day's production graph.

Figure 9:
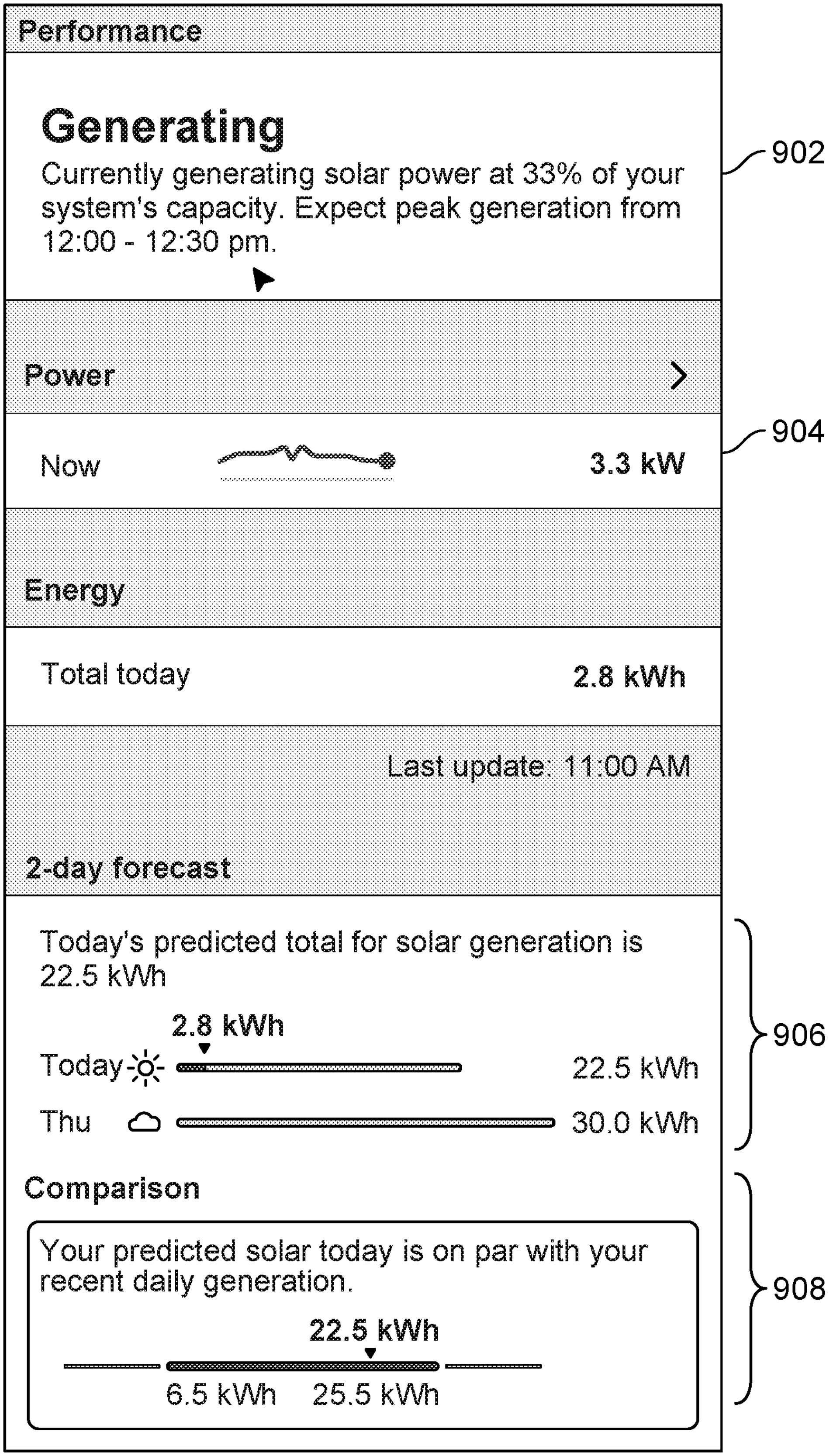
FIG. 9 illustrates an embodiment of an interface for providing information pertaining to solar power generation performance.

FIG. 9 illustrates an embodiment of an interface for providing information pertaining to solar power generation performance. In this example, the current amount of power being generated is shown at 902 (in this example as a percentage of the overall system's capacity in the text at 902, and in kW at 904). A time window or period (e.g., half-hour period or block) when peak solar generation is expected is also shown in the text at 902. In some embodiments, the time period of expected peak solar generation is determined based on the solar generation predictions described above (e.g., the median value of the forecasted solar production trace for that time period is used). Also shown in this interface at 906 is a two-day forecast of overall solar generation for today and tomorrow. This is a prediction of the amount of solar that the PV array is expected to generate, according to the solar generation forecasts described above. At 908, a comparison is also provided indicating today's predicted solar versus recent daily generation (e.g., recent historical generation over a comparable time frame).

Figure 10:
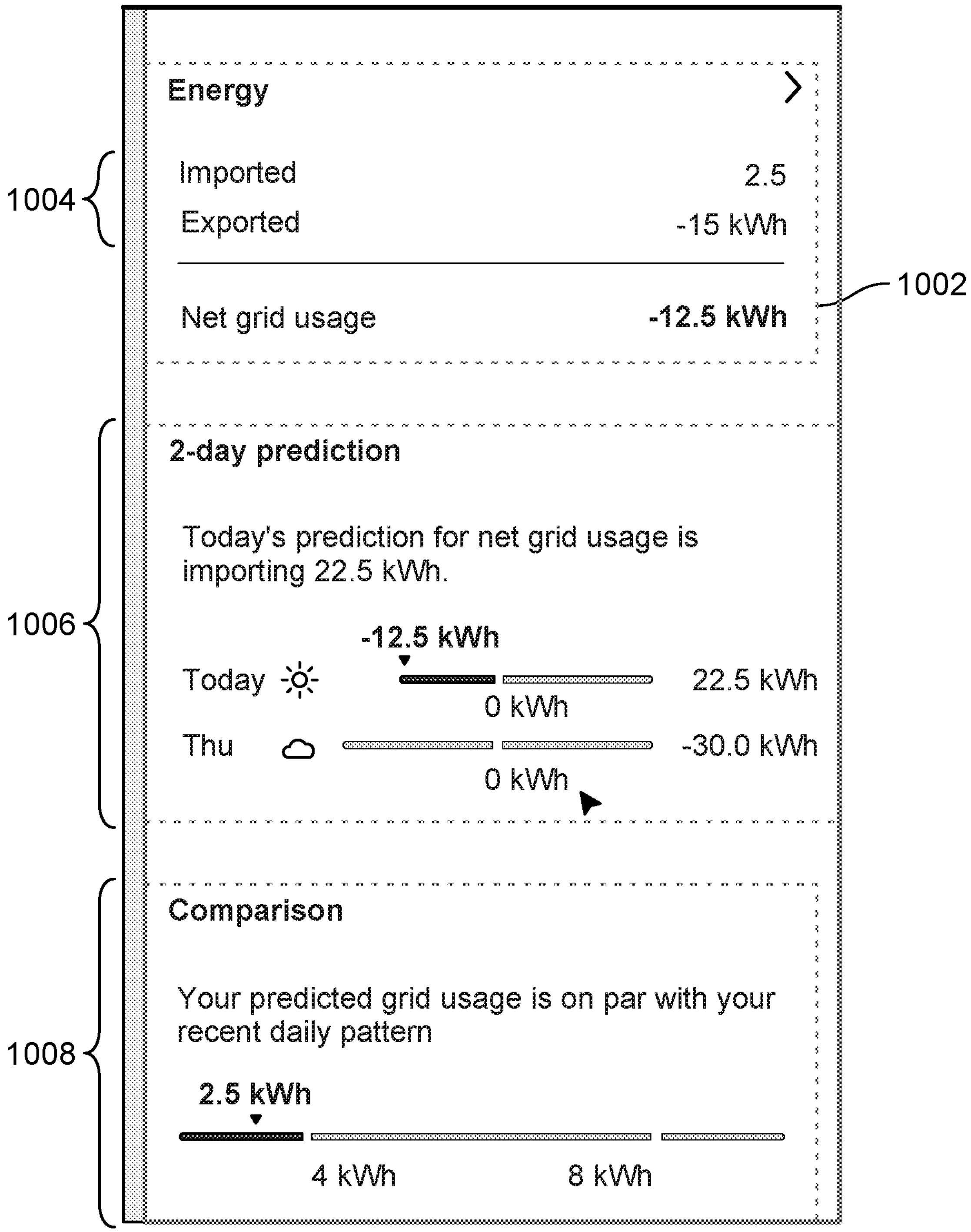
FIG. 10 illustrates an embodiment of grid-related information.

FIG. 10 illustrates an embodiment of grid-related information. Shown in this example at 1002 is a prediction of net grid usage (over a two-day period in this example). An amount of energy imported and exported is also shown at 1004. A two-day prediction of net grid usage is also shown at 1006. Such predicted usage information is determined using the energy consumption forecasts described above. At 1008, a comparison of predicted grid usage against recent daily patterns of grid usage is shown.

Figure 11:
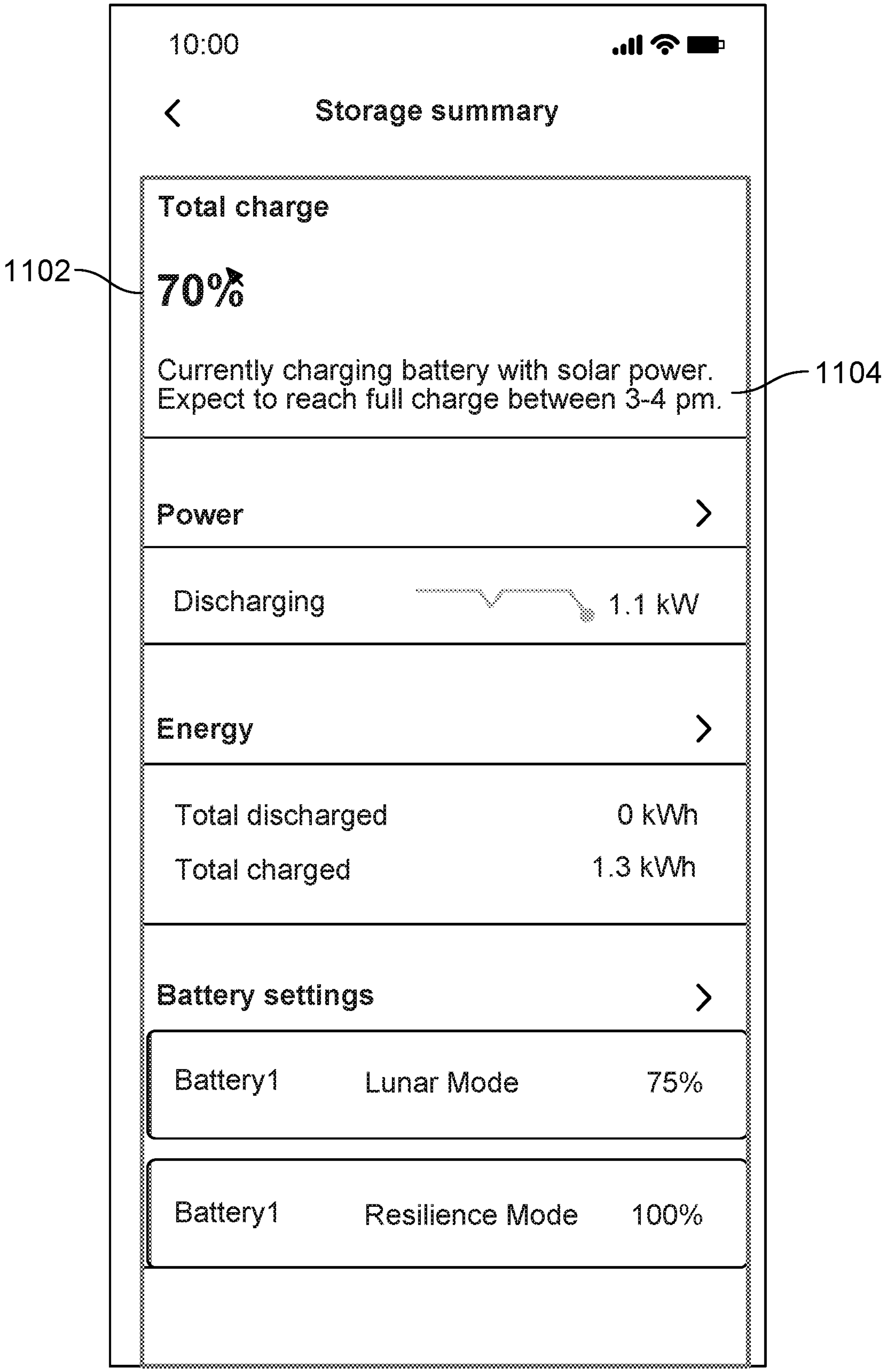
FIG. 11 illustrates an embodiment of energy storage information.

FIG. 11 illustrates an embodiment of energy storage information. In this example, summary information regarding a battery storage system is shown. A current state of charge of the battery is shown at 1102. A forecasted time of when full battery charge is expected to be reached is shown at 1104 (e.g., between 3 PM-4 PM in this example). This is based on the forecasts described above and the control plan generated for the site for that period.

Figure 12:
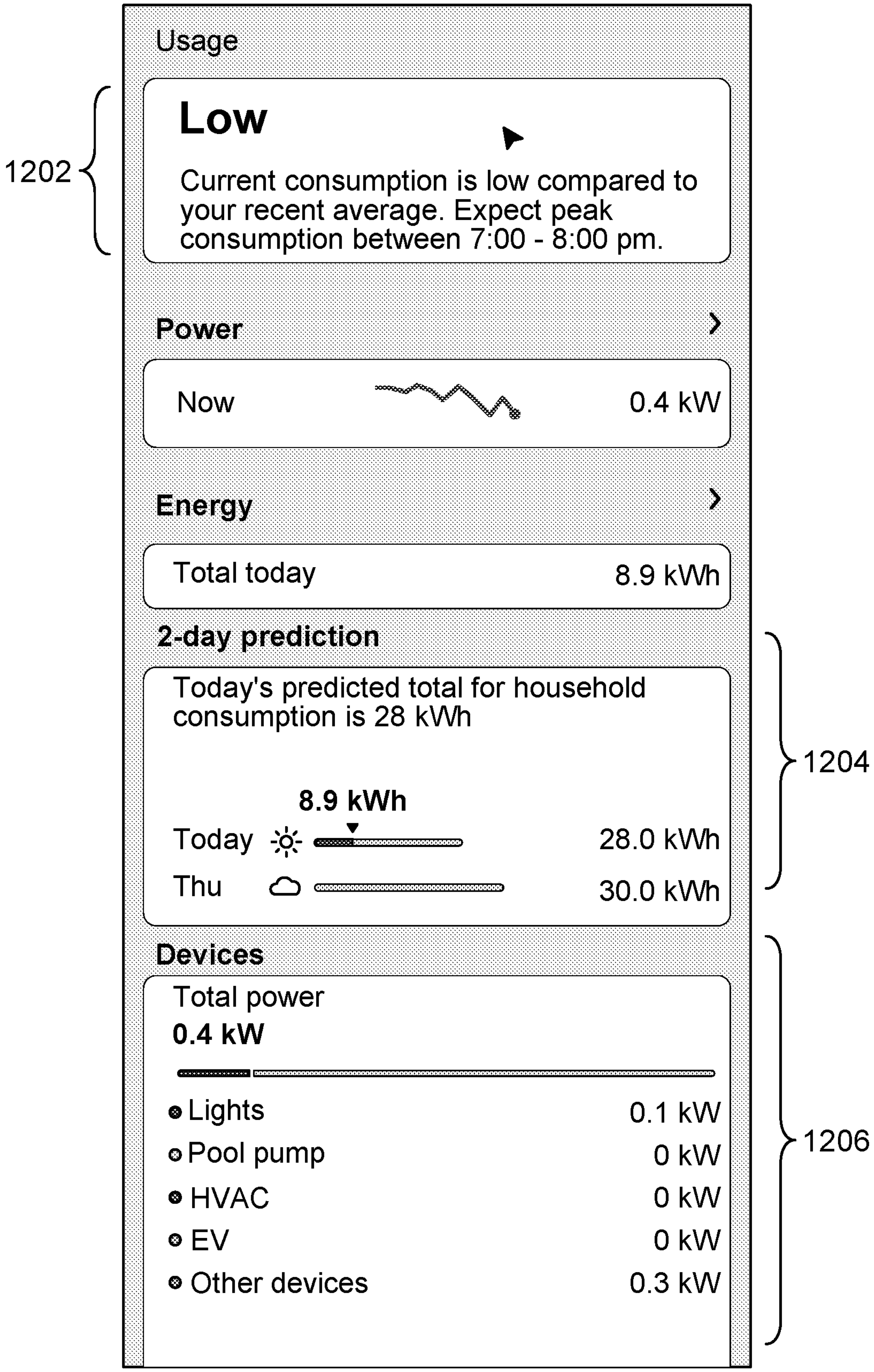
FIG. 12 illustrates an embodiment of consumption-related information.

FIG. 12 illustrates an embodiment of consumption-related information. A summary of usage information is presented at 1202. An indication of current consumption relative to recent average consumption is shown (e.g., "Low" in this example). Also shown in the summary at 1202 is a time of day at which peak consumption is expected. In some embodiments, this predicted time at which peak consumption is expected is determined based on the energy usage predictions described above. A two-day prediction of total household consumption is also displayed in this interface, at 1204. This prediction is also based on the consumption forecasts described above. At 1206, a breakout of power consumed by various devices or loads in the home is shown.

As shown above, the predictions and optimal control plan generated above are used to power and drive various information in various interfaces with respect to solar generation, battery storage, grid usage, and consumption, such as when the battery will be full, when peak consumption will be, etc. Some measures are derived from the predictions. For example, the amount of energy imported from and/or exported to the grid is determined based on the predicted consumption and predicted solar generation, as well as the planned state of charge of the battery storage.

As shown in the various embodiments of interfaces, some information is provided in the unit of energy (e.g., kWh). In some embodiments, the predictions and forecasts are provided in units of power. In some embodiments, energy measures are determined by integrating predicted power (generation and/or consumption) over time to determine energy measurements. For example, for a half hour chunk, the predicted amount of solar energy generated during the half-hour period is determined by integrating the predicted solar power production over the half hour block. Similarly, the predicted amount of energy consumed is determined by integrating the predicted power consumed over the half hour block. To determine a longer period of energy consumption, the energy for multiple half hour blocks is accumulated.

Using the predicted amount of energy generated by the PV panels, the forecasted consumption, and the control plan indicating whether the battery will be charging or discharging for that period of time (and at what power level), the amount of grid power needed to satisfy any remaining consumption can be derived or calculated (or if the battery and PV energy exceed the forecasted consumed energy, then the amount of excess energy exported to the grid is computed). Such forecasts and computations are then used in various portions of the interface to provide information regarding the state of the home energy system. For example, the aforementioned forecasts and derived information are used to determine the composition of the bars shown in the scrubber graph portions of FIGS. 7A-7C.

The following are further embodiments of interfaces for providing information pertaining to the state of a site energy system.

Figure 13:
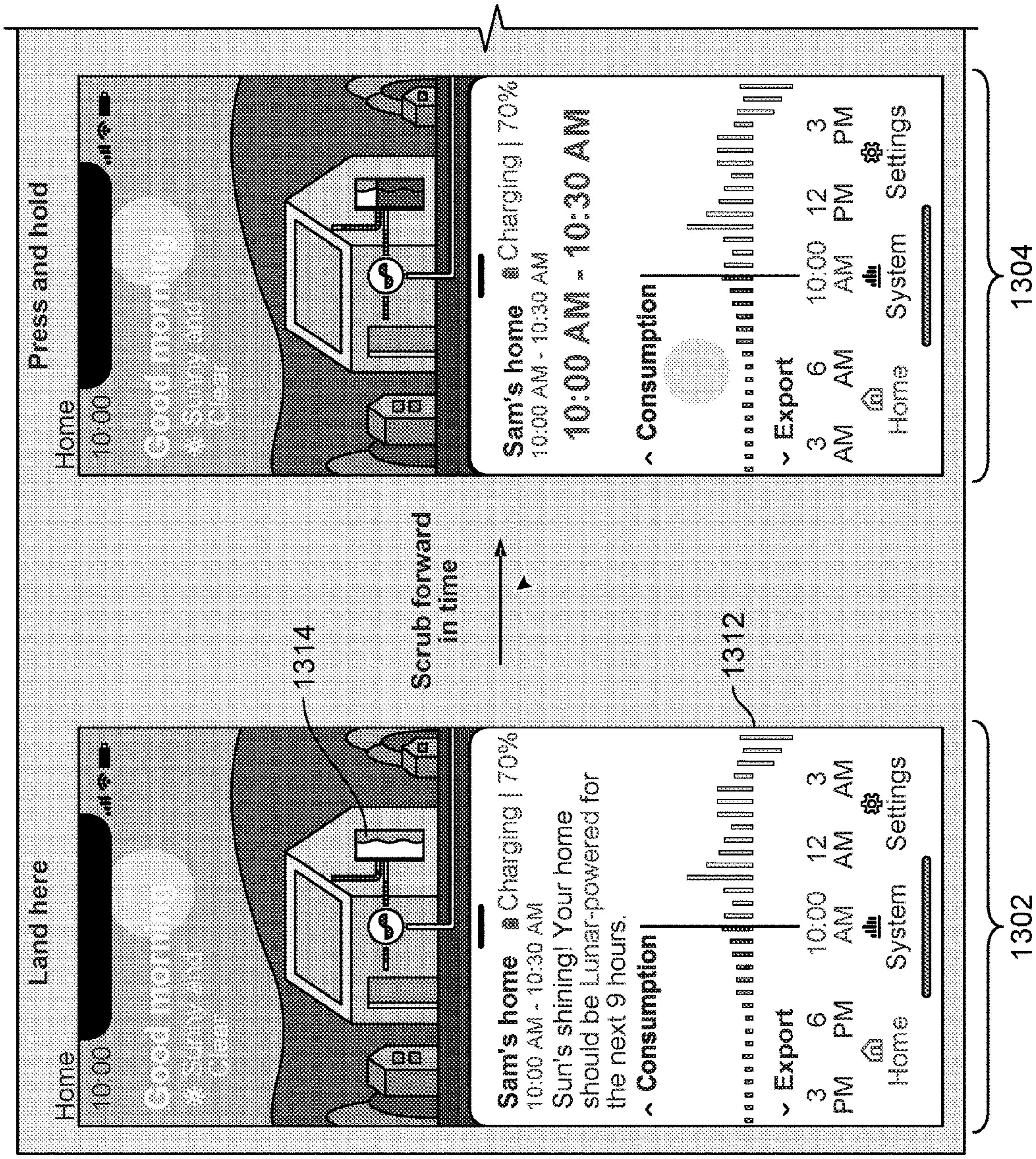
FIG. 13 illustrates an embodiment of scrolling through a scrubber.
Figure 13:
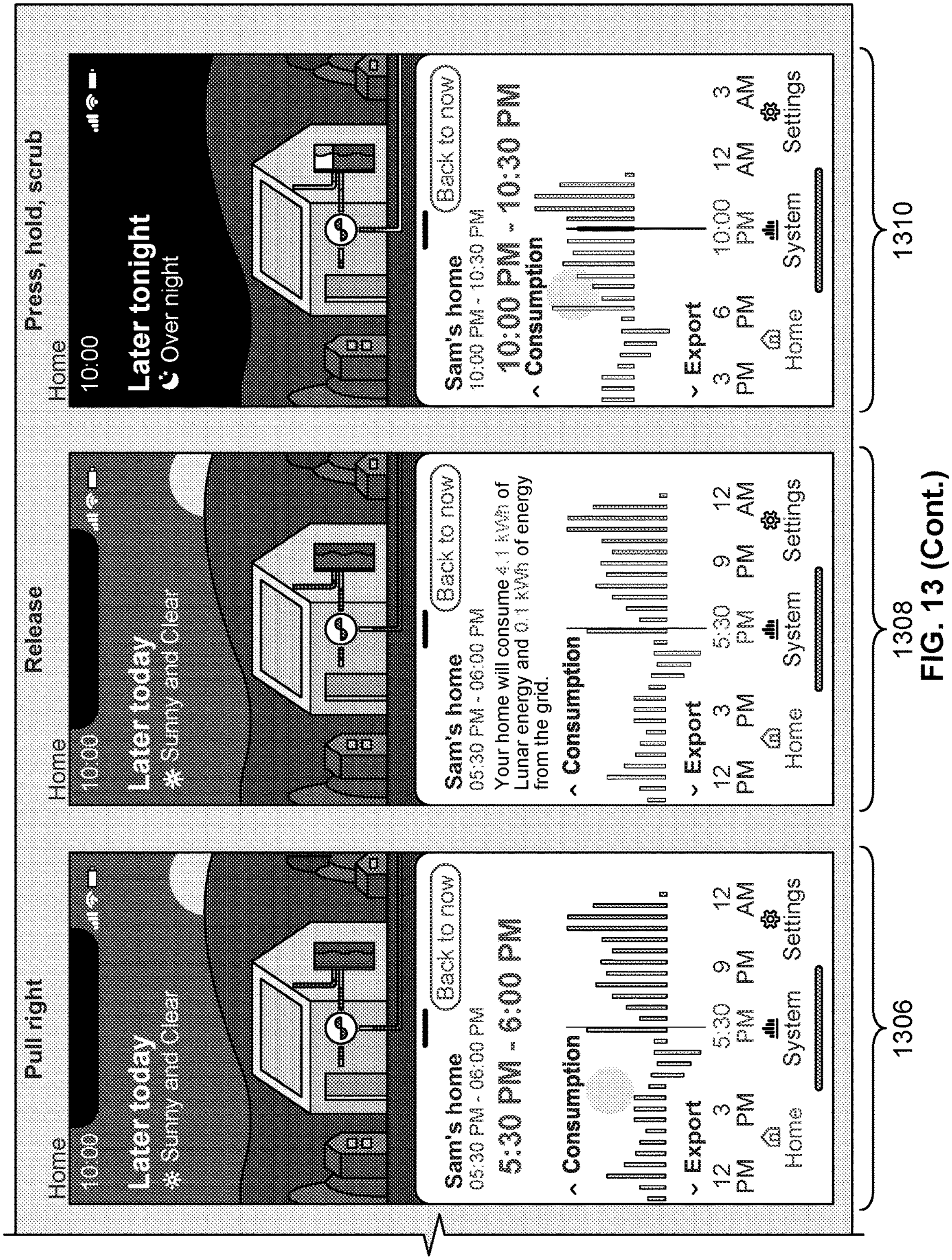

FIG. 13 illustrates an embodiment of scrolling through a scrubber. Via this example interface, a customer is displayed the various energy flows throughout their home over the course of a time period such as the next 24 hours, based on the machine learning predictions (generated as described above) for their particular house on that particular day.

Shown at 1302 is an example of a landing page when a user first opens their mobile app. As shown in this example, as the user scrubs forward through time (e.g., by interacting with the scrubber graph portion 1312, as described above), the changing SoC of the battery 1314 is also graphically indicated, where, as more energy is stored in the battery, the more it is filled in, and the lower the energy stored in the battery, the less the battery is filled in. For example, as the user scrubs through the future, the interface changes from 1304 to 1306, and the battery is shown to fill up towards the evening (via solar energy during the day). In this example, at 1306, the user releases their finger from the scrubber graph (indicating that they are interested in the half hour window that they have landed on, which is from 5:30 PM-6:00 PM), and a summary interface for that half period is displayed at 1308, which provides information regarding the projected amount of consumption and where the energy to satisfy the consumption of the energy consumer (e.g., home loads) will be sourced from (e.g., through PV and battery energy, and/or grid power). As the user continues to scrub forward into the future, toward the evening, the interface transitions from 1308 to 1310, and the battery is shown to drain at night when it is projected to be used to supply power to be consumed by loads in the house. As this is forecasted for the future, the visualizations are based on a predicted battery SoC (which is determined according to the control plan determined based on the predicted solar generation and consumption, as described above).

Further, as shown in the examples of FIG. 13, as the user scrolls through the future, the pipes connecting the house to the various sources of power (panels, battery, and grid) are graphically and dynamically updated to show the flows of power from the various sources into the home, or among the power sources. This may change over time, which is also reflected in the graphic of the home and energy sources as the user scrubs through time. For example, the importing and exporting of power from and to the grid is graphically illustrated by the direction of the flows rendered in the pipe between the home and the grid. In some embodiments, the flows in the various pipes reflect the net energy situation at the time. In some embodiments, the flow of energy shown in the pipes for a period of time (e.g., half hour chunk) is a visual representation of the composition of the corresponding consumption bar (and the ratio of energy provided by the different available sources) shown for that time period.

In some embodiments, a net position is shown. Suppose there is a situation where for a given half-hour chunk, there are bars above and below the line in the scrubber graph. Here, both power from the PV array and/or battery are not only providing power to meet the consumption needs of the home, but there is energy that is being produced that is being exported to the grid (e.g., from excess solar). In this case, the pipe leading from the inverter (which in this example provides AC power by inverting the DC power from the solar panels and batteries) into the home would have a flow of energy towards the house, while energy would also be shown from the AC junction node (where the inverter or power system controller controls AC energy to/from the grid, and the energy to/from the solar panels and/or battery) down into the ground (indicating energy being sent to the grid). In the middle of the night, if the battery is drained (and there is no solar at night), then any consumed energy would be sourced from the grid, and the flow of energy would be from the ground into the home. In the examples described herein, for illustrative purposes, a hybrid inverter converts the DC power from both solar panels and batteries into AC power. In other embodiments, DC solar generation is converted to AC via a string inverter and fed into the house, from where the ESS can charge from AC power. The optimization and planning techniques described herein may be variously adapted to accommodate such architectures (as well as others).

As shown in the above, using the scrubber graph described herein, the user can move forwards through time to investigate what the energy situation is in the home (e.g., how the power system is supporting the house) at a given point in time in the future.

Using the scrubber graph UI (user interface) element described herein, the user can also scrub backwards in time to see how much energy they have consumed, and then move forward to the middle of the night, where the app determines and presents the forecasted energy that will be consumed, and where that energy will be sourced from, such as the battery or the grid. Via the scrubber, by scrubbing forward, the app presents a forecasted or projected amount of energy that will be consumed or exported at a given point in time, and the source of that energy (e.g., grid, solar, and/or battery storage).

In this example, the information and visualizations generated by the app are rendered based on the forecasts described above. When scrubbing backwards in time, actual metering measurements may be used. Forecasts for those past periods may also be used to determine what is graphically rendered in the app.

Figure 14:
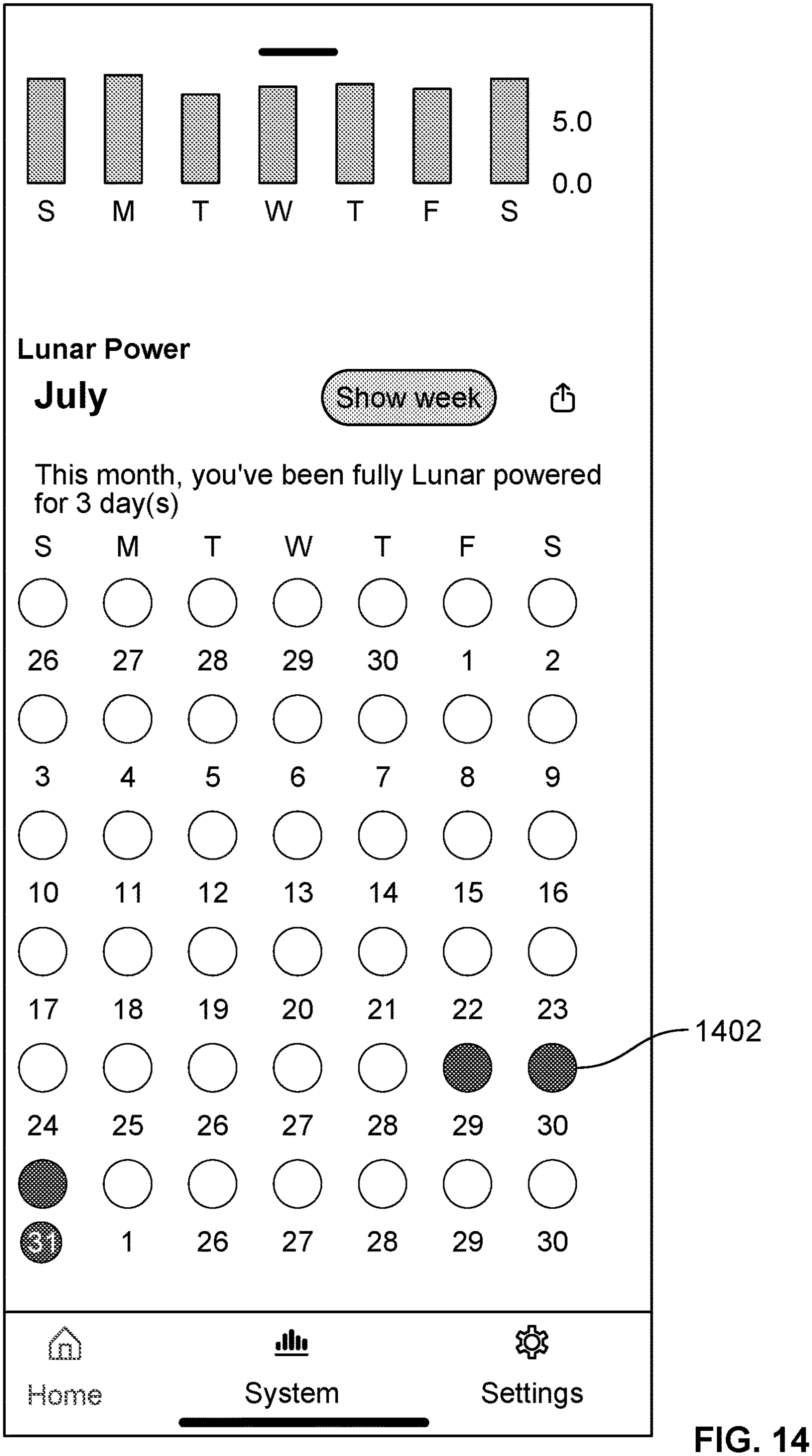
FIG. 14 illustrates an embodiment of a summarization of self-consumption.

FIG. 14 illustrates an embodiment of a summarization of self-consumption. In this example, a summarization of self-consumption over a longer-term period, such as a month, is shown. In this example, self-consumption refers to the energy that is consumed being sourced from the PV array and/or the battery (without energy being supplied by the grid to power loads). In this example, each "moon" (such as the moon on July 30$^{th}$ (1402)) represents a day of a month. The amount of the moon that is filled in is a representation of how much of the energy consumed that day was supported by the inverter (e.g., PV and/or battery storage). If that day was fully supported by renewable sources, then a full moon is shown. If a day is half supported by PV and/or battery (and the other half by grid), then the moon is half-filled. A projected percentage of self-consumption may also be shown for the next 48 hours.

The following are further embodiments of interfaces for visualizing or otherwise presenting information pertaining to a site energy system.

An app such as that described herein allows a customer to understand the connection between their energy storage device, the environment (e.g., solar generation), as well as their own behavior (e.g., energy consumption). Embodiments of the app described herein use various visualizations to make concrete this connection, such as by illustrating the movement of the sun, showing the battery filling up or discharging, etc.

Further, the app allows the customer to view not only what has happened historically (which is what typical, existing applications are limited to), but also provides insight into what will happen in the future, such as what will occur later in the day with respect to solar generation, their usage (the patterns of which the customer might not be aware of), and how the battery will charge/discharge.

As one example, using the predictions, the app may notify a user in the morning that their battery is predicted to be full by 2 pm, providing them a measure of certainty and more information than they would receive using existing applications. For example, by having a forecast of when their battery will be full, a user's uncertainty is reduced with respect to how they should use their loads (e.g., when to dry their clothes, when to charge their electric vehicle, etc.), and they need not make unguided guesses on how to use the energy of their system.

Figure 15:
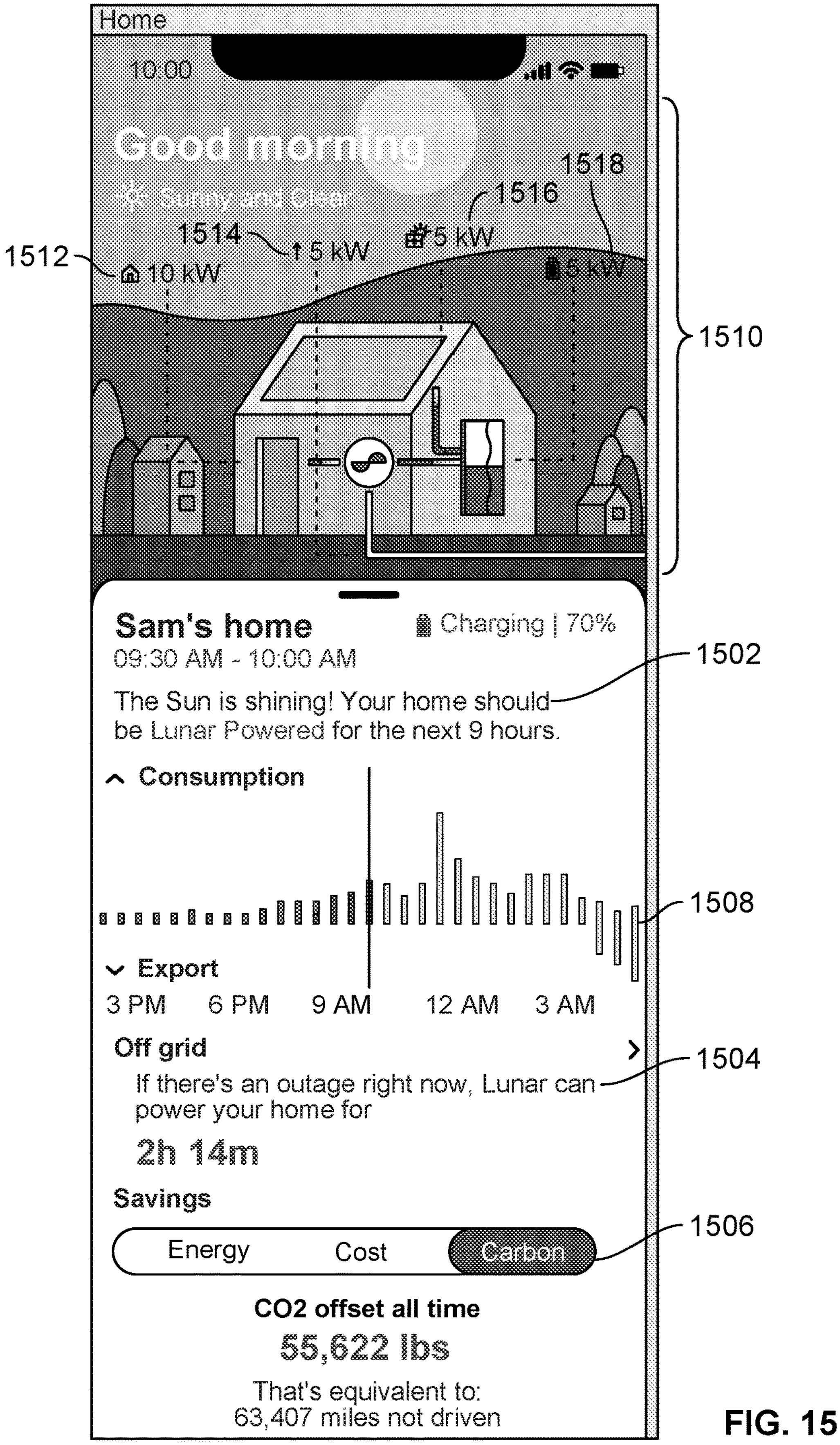
FIG. 15 illustrates an embodiment of a home energy management interface.

As described above, combining forecasts of solar power generated by solar panels, predictions of expected usage (consumption) of energy at the site, and intelligent control of devices allows a view of not only how a site will be operating in terms of solar production and energy consumption over the course of a day, but also when the battery storage will be full, over what hours the home will be self-sufficient, etc. FIG. 15 illustrates an embodiment of a home energy management interface. In this example, a landing page is shown that is, for example, presented when the user opens their app. In this example, at 1502, the app indicates that the home will be self-sufficient ("Lunar Powered" by the PV array and/or battery) for the next 9 hours.

This prediction of self-sufficiency is supported by the forecasts described above, where the energy provisioning planning system and/or mobile app determines the self-sufficiency of the site based on a determination of the various flows of energy in the home over time (e.g., consumption profile), as well as estimates of how long the amount of battery storage and solar power will be able to offset that consumption.

As shown in this example, at 1504, an estimate of an amount of time that the home can be supported by the PV array and/or battery were a power outage to occur (and the home becomes off-grid) is also shown. In some embodiments, the estimated amount of time that the home can be powered while off-grid is also determined based on the forecasts of solar production and energy consumption described above. For example, a current state of charge of the battery is determined. Based on the forecasted consumption and the forecasted solar production (which may be used to power loads and/or charge the battery, which may then be used to support consumption for longer), the expected amount of time that PV and/or battery could supply energy consumption demands is determined.

In the example of FIG. 15, an amount of savings from using the PV array/battery (versus using the grid) is shown at 1506. The savings may be displayed in terms of various measures, such as energy, cost, and carbon offset. The carbon offset may further be represented according to various units, such as miles not driven.

As described above, in some embodiments, a scrubber graph user interface element (e.g., element 1508) is provided that allows a user to view the state of their home energy system throughout time. The scrubber graph is a UI element that allows the user to scroll back and forth (e.g., with their thumb), where, as the user scrolls back and forth, which corresponds to moving backwards and forwards in time, various graphics are changed in response. For example, the sun or the moon moves through the sky (analogous to fast forwarding or rewinding). Further details regarding the scrubber graph are described herein.

At 1510, a representation of the home site is graphically displayed. This includes rendering of the flow and direction of energy among the home and various components of the energy system (e.g., solar panels and battery), and the grid. In this example, the power being consumed by, sourced from, and/or generated by the various elements of the site are shown. For example, the power consumed by the home (1512), the power being imported/exported to the grid (1514), the power generated by the PV array (1516), and the power being charged to/discharged from the battery (1518) are displayed. In some embodiments, such information is shown for a time corresponding to a selection made via the scrubber. In this example, the time selected of interest is the 9:30a-10a block of time. Such state information may be shown for the current time, a selected time in the past (e.g., via historical metering measurements), as well as a selected time in the future (where the selected time of interest is selected via manipulation of the scrubber or scroller user interface element 1508).

Figure 16:
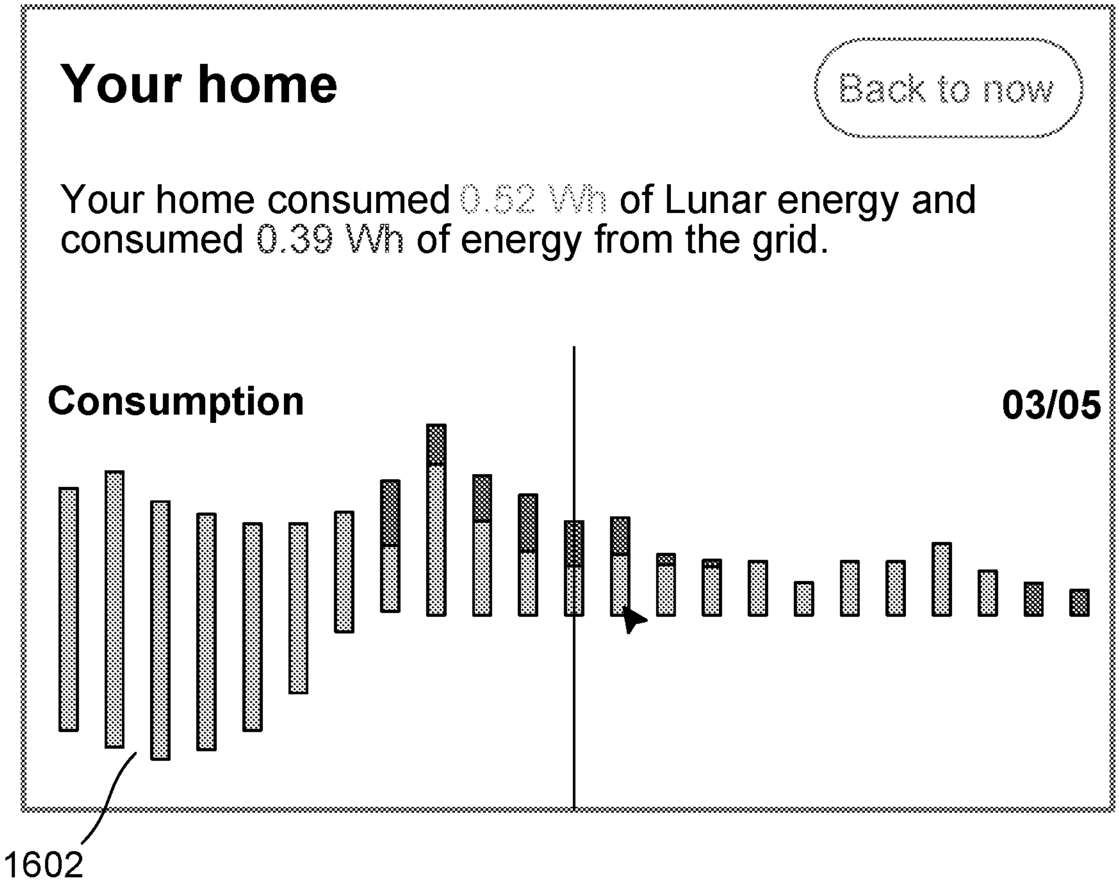
FIG. 16 illustrates an embodiment of a temporal scroller.

FIG. 16 illustrates an embodiment of a temporal scroller. As shown in this example, via the app, a graph ("scrubber" graph) 1602 is presented that allows a user to see forward in time (e.g., in half hour buckets in this example). Via the graph, the user can view (for half hour windows of time in this example) how much of their power will come from the energy storage system/PV panels, how much is coming from the grid, as well as how much energy is being exported to the grid (e.g., excess solar). As described above, the composition or makeup of where energy is being sourced from/delivered to may be visually or graphically represented via the bars of the scrubber graph and their makeup.

Figure 17A:
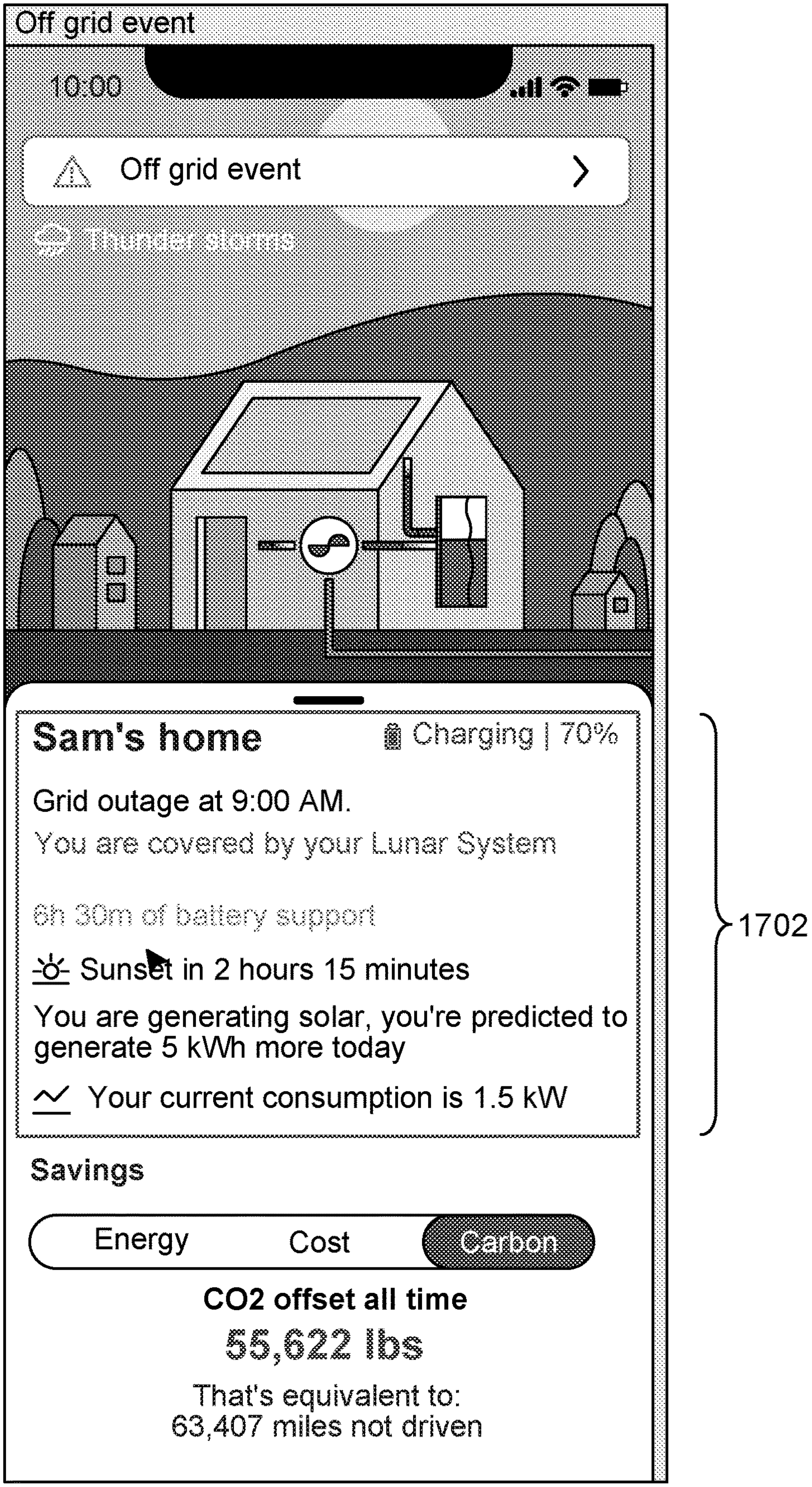
FIGS. 17A-17E illustrate embodiments of grid-outage information.
Figure 17B:
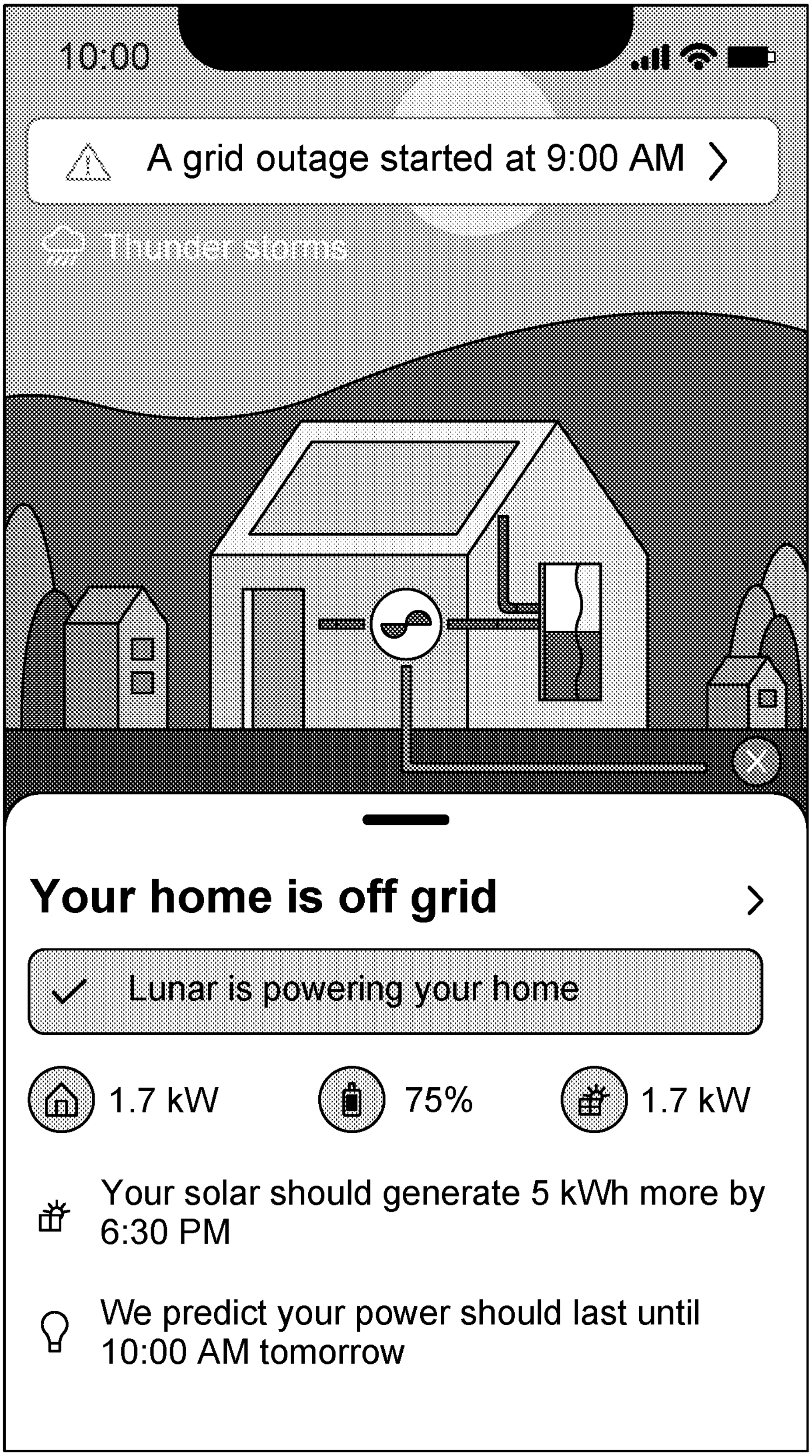
Figure 17C:
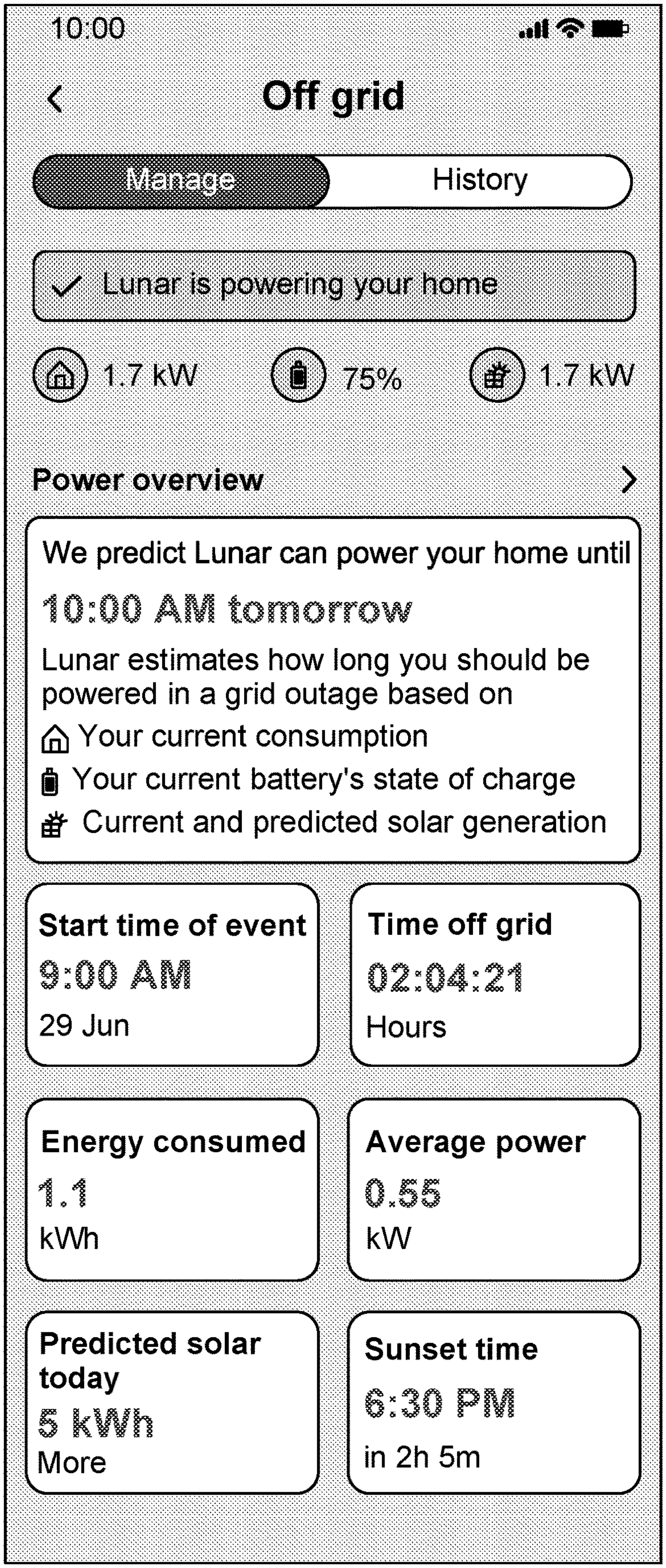
Figure 17D:
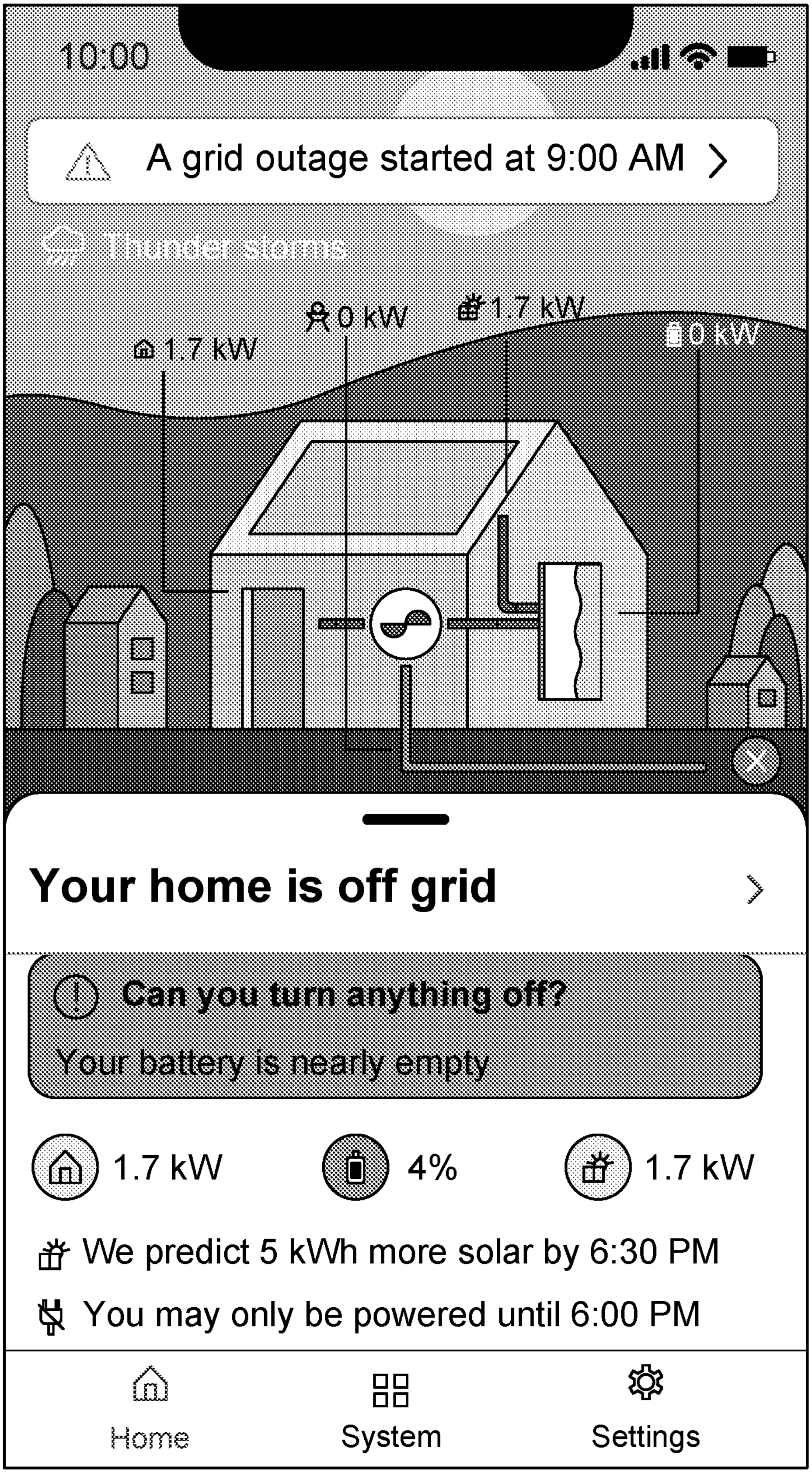
Figure 17E:
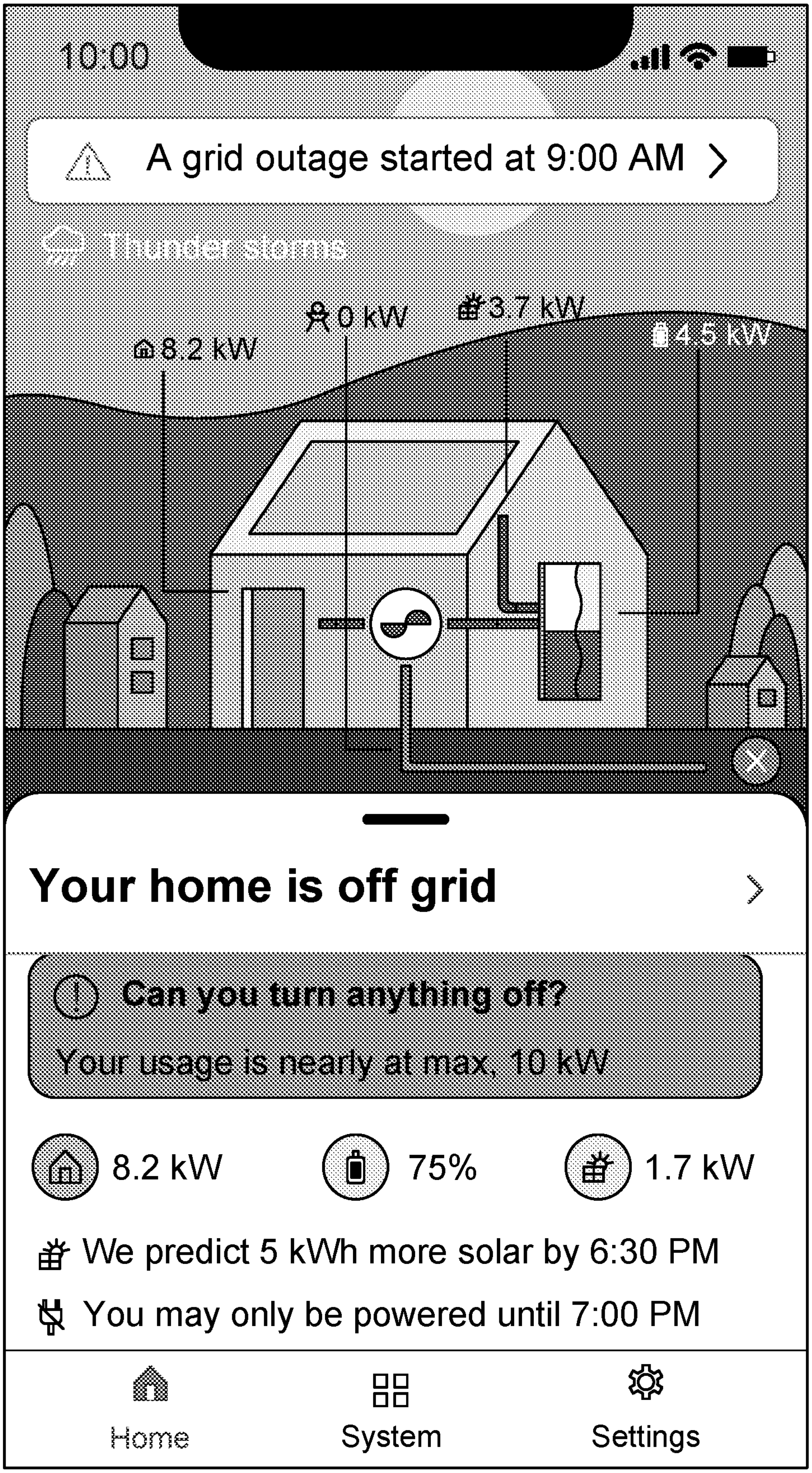

Off-grid information may also be provided via the app. FIG. 17A illustrates an embodiment of grid-outage information. As shown in this example, if a grid outage occurs, the app displays an alert indicating the occurrence of the grid outage. Various information about the state of the home energy system with respect to the outage is shown at 1702. For example, the app determines, based on the predicted forward consumption, the amount of time that the battery will last during the outage or off-grid event (where the solar production forecast may also influence this prediction, as solar power may be used to charge the battery as well, increasing its available stored energy). In the example interface of FIG. 17A, a prediction is made that there is six and a half hours of battery support remaining. A predicted time for sunset is also shown. An amount of energy that is predicted to be further generated by the PV array for the remainder of the day is also shown. In some embodiments, the predicted amount of solar production for the remainder of the day is determined by integrating the forecasted solar power curve over the remaining time in the day.

FIGS. 17B-17E illustrate further embodiments of grid-outage related information. In some embodiments, during an off grid-event, the predictive energy provisioning system predicts how many more kWh of solar the customer will generate on a given day (as well as the next day).

In some embodiments, using a combination of the predicted solar generation, the customer's rate of consumption (e.g., current rate of consumption, not necessarily predicted), and remaining battery kWh capacity, a prediction is generated of how long the house will have backup power for. For example, a prediction may be made that the battery will become close to empty by 8 am tomorrow, but then solar generation is predicted to pick up and charge the device to full again, allowing the house to last another day, etc.

In some embodiments, tips are provided to customers to help them manage their energy consumption during an off grid event, in order to try to make their battery last as long as possible.

Providing the user insight, during an off-grid event, of how much support their battery storage can provide (measured as an amount of time remaining) allows the user visibility into their system so that they can plan accordingly. The amount of remaining support may be dynamically updated as their consumption changes (and is measured by the home energy system, which can determine the amount of power being delivered, for example, by the inverter over time).

Figure 18:
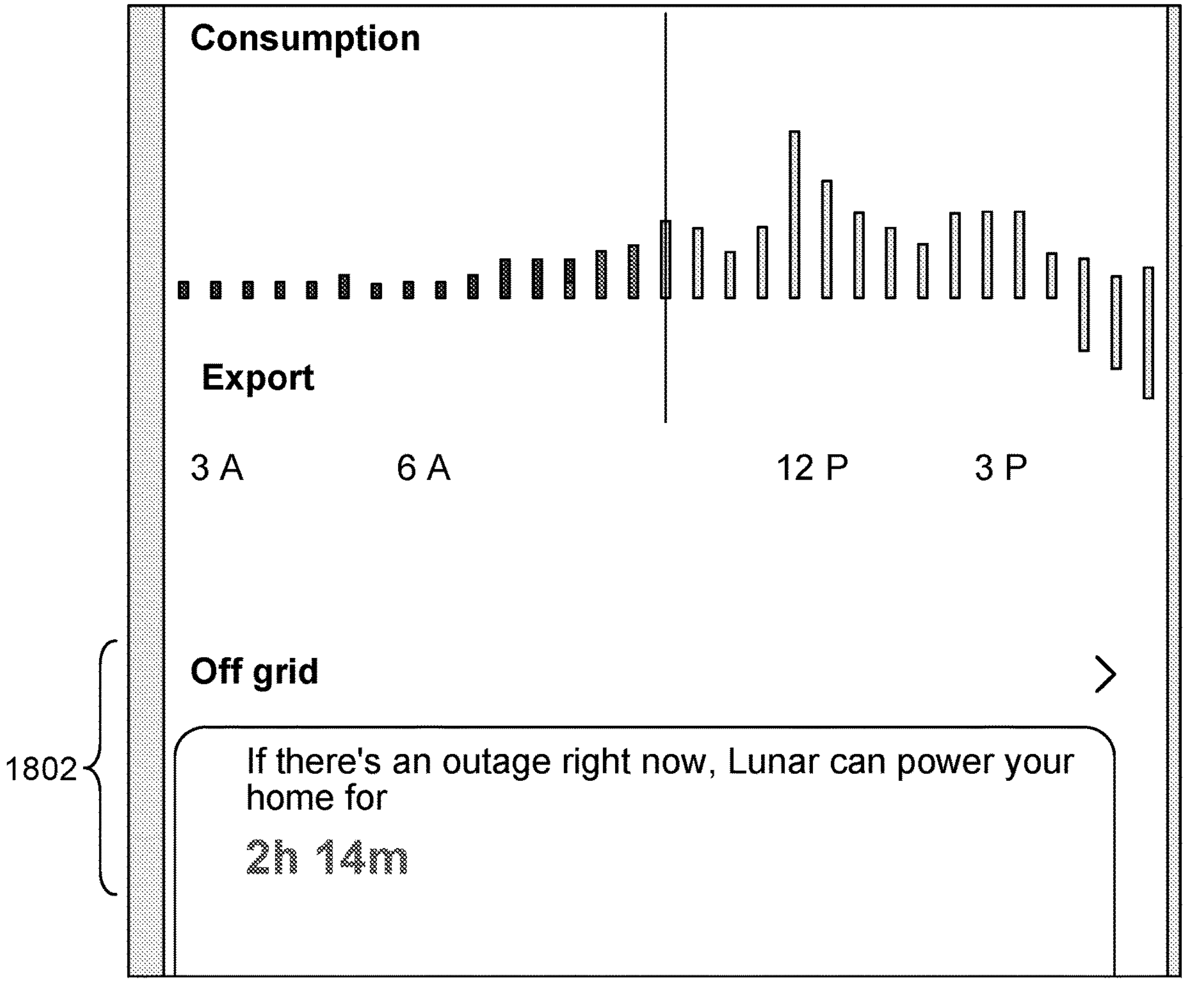
FIG. 18 illustrates an embodiment of outage related energy system information.

FIG. 18 illustrates an embodiment of outage related energy system information. In this example, the user interface indicates at 1802 that, were an outage to occur, the amount of time that a home could be supported in backup mode (e.g., based on forecasted solar production, current battery SoC, device control plan, and forecasted consumption).

Figure 19:
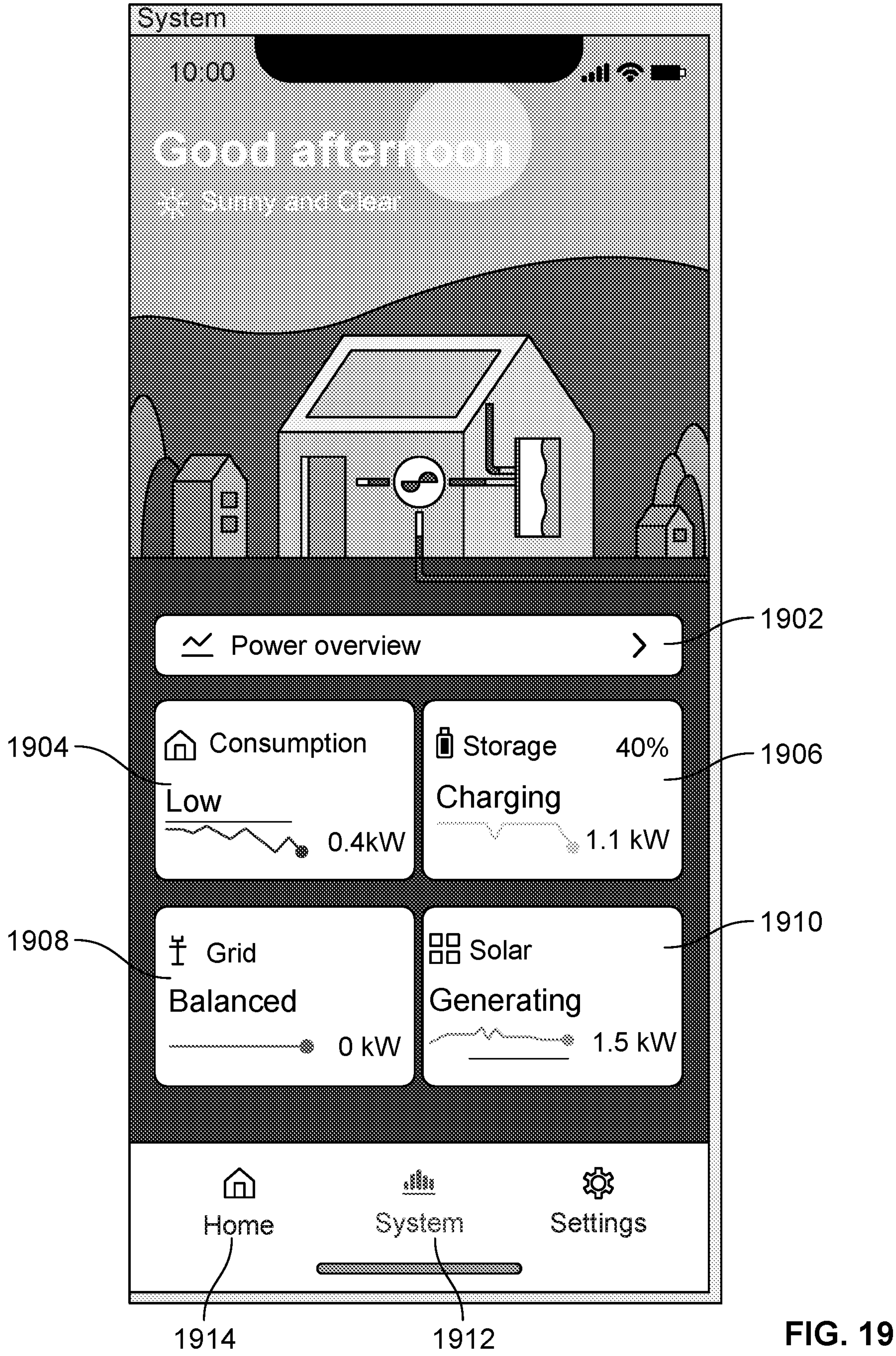
FIG. 19 illustrates an embodiment of a system user interface.

FIG. 19 illustrates an embodiment of a system user interface. In this example, a system page showing a more detailed view of various aspects of the power system is shown. As one example, a user arrives at this page by clicking on a UI element presented in the app (e.g., at 1912) to view further details regarding their home energy system. In this example, the user may return to a home page (e.g., the landing page of FIG. 15) by selecting "home" icon 1914. As shown in this example, a summary of different elements of the home energy system are shown. The user may then click on an element to view further detailed information regarding that component over their home energy system. In this example, a power overview may be accessed by selecting element 1902.

A consumption widget or UI element 1904 displays summarization information regarding consumption. For example, a low, medium, or high amount of consumption may be shown, as well as the numerical amount of consumption. The consumption element 1904 may be clicked on to view further detailed information regarding energy consumption.

A storage widget or UI element 1906 displays summarization information regarding the site's energy storage device. The energy storage device element 1906 may be clicked on to view further detailed information regarding the state of the energy storage device. Summary information regarding the battery storage is also shown via the widget, such as whether it is charging or discharging (and the amount of power it is being cycled at) or idle, as well as the current SoC.

A grid UI element 1908 displays summarization information regarding the grid (e.g., information pertaining to grid import/export). The grid element 1908 may be clicked on to view further detailed information regarding grid usage. A summary of the amount of energy being imported from/exported to the grid is displayed in this example.

A solar UI element 1910 displays summarization information regarding solar production. In this example, the state of the PV array, such as whether power is being generated by the PV array, is shown. If the PV array is generating power, then the amount of power being generated is also shown in this widget. The solar generation element 1910 may be clicked on to view further detailed information regarding solar production.

Figure 20:
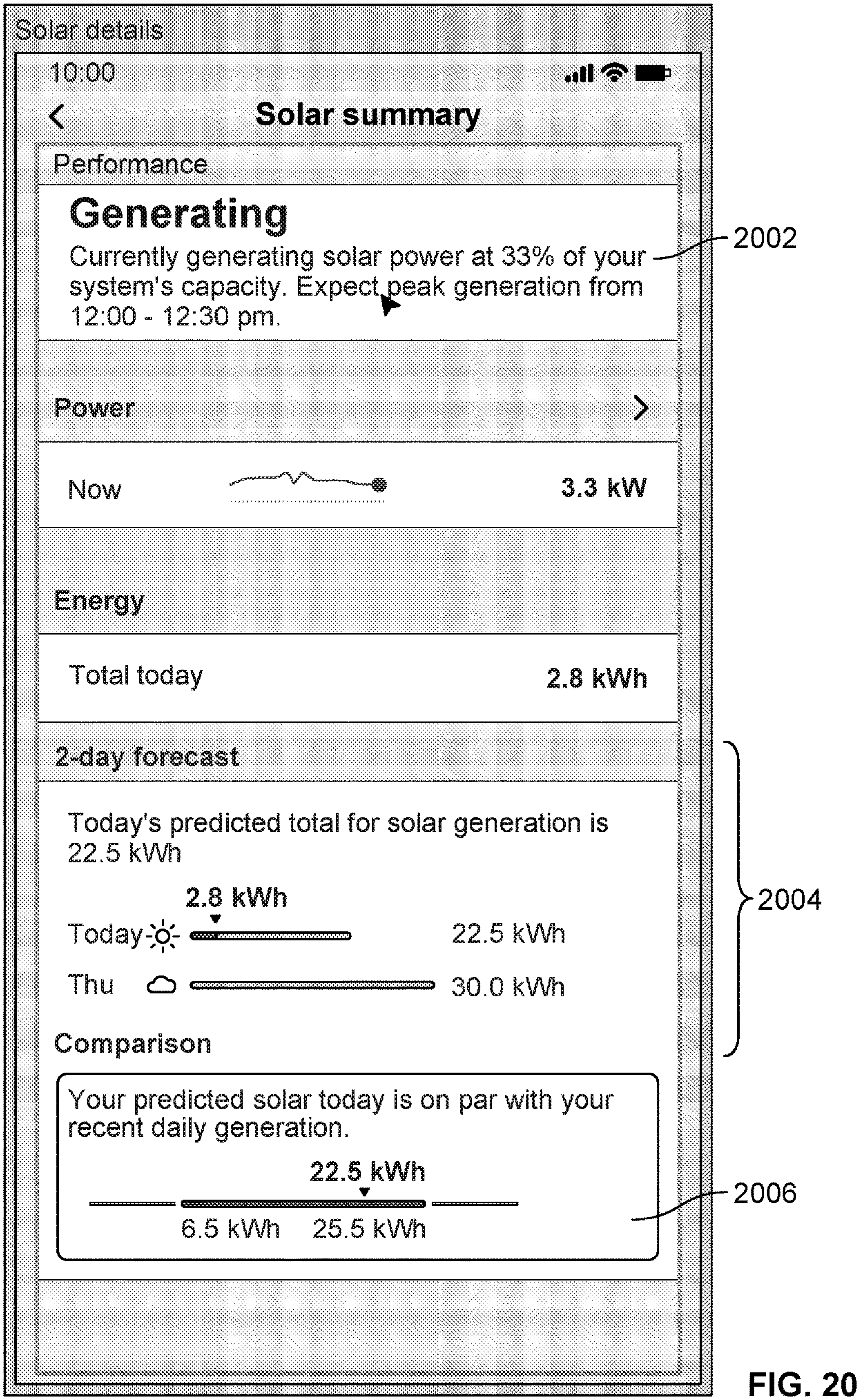
FIG. 20 illustrates an embodiment of an interface for presenting information pertaining to solar production.

In this example, if the user clicks on the solar UI widget 1910, they are then taken to the interface shown in FIG. 20. FIG. 20 illustrates an embodiment of an interface for presenting information pertaining to solar production. As one example, based on the solar generation predictions described above, the app displays a time period (e.g., half hour window) in which peak solar generation is expected (e.g., at (2002)). This is but one example of an informational notice that may be provided based on the predictions and forecasts described above. As another example, the app also displays a forecast of expected solar production for different time periods. In this example, at (2004), a two-day forecast of predicted total solar generation for today and tomorrow (i.e., future time period) is shown. As one example, the two-day forecast of solar production is determined by integrating the solar power production over time (a 24 hour period in this example). A comparison with a rolling average of daily solar generation is also shown at 2006. This provides insight into how the PV system is performing compared to recent history.

Figure 21:
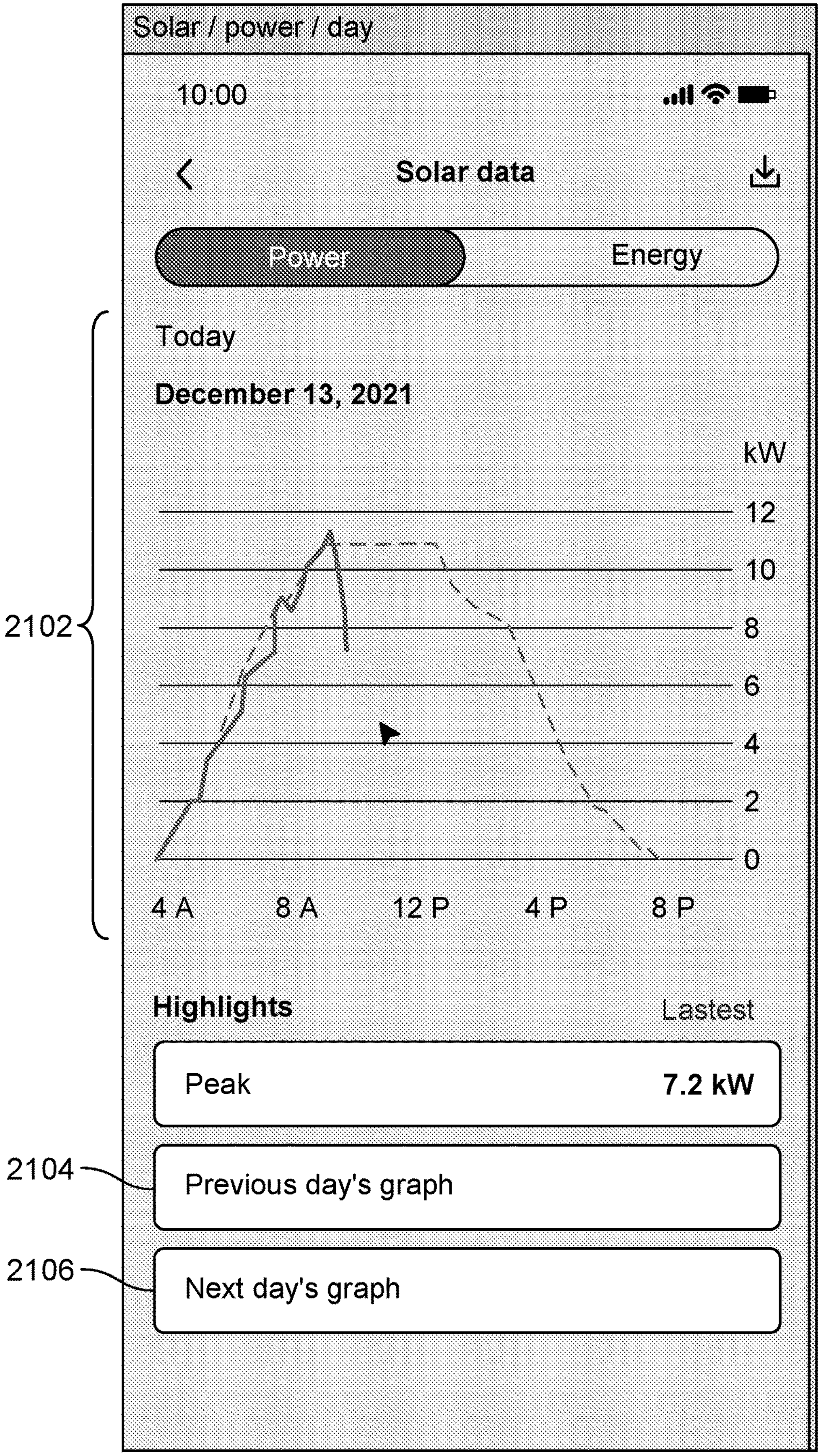
FIG. 21 illustrates an embodiment of an interface for providing information pertaining to a PV array.

From the solar page of FIG. 20, the user may view further detailed information regarding their PV power system via the interface shown in FIG. 21. FIG. 21 illustrates an embodiment of an interface for providing information pertaining to a PV array. In this example, as shown at 2102, a predicted solar trace (of the amount of power delivered by the PV panels) over the course of the day is shown in a graph. The predicted trace is determined using the forecasting described above. For time that has already elapsed, measurements from metering of the PV array are overlaid on top of the prediction. For the future, the user may view the predicted trace to have an understanding of expected solar generation for the remainder of the day. Such predicted traces are determined and displayed for other nodes in the system as well.

Curves for other periods of time may be displayed. For example, the previous day's solar production graph may be viewed by selecting UI element 2104. The curve for the previous period may be generated using historical metering data for the last day collected for the PV array. The actual solar production data may be overlaid on top of the predicted trace for the previous day.

The next day's predicted solar production trace may be viewed by selecting user interface element 2106. Selecting of this element causes the app to refresh the user interface to display a predicted solar production over the course of the next day. Peak power generation predicted for the next day may also be displayed. The ability to display such predictions is based on, as described above, the ingestion or derivation of various detailed information about the household, such as forecasted energy consumption, expected grid consumption, forecasted solar generation, battery usage, etc., where the ingested information is placed in a data lake (e.g., at planning system 106) to generate machine learning predictions as described above for a particular customer and a particular home. The various predictions may then be used to power various UI interfaces such as those described herein.

Figure 22:
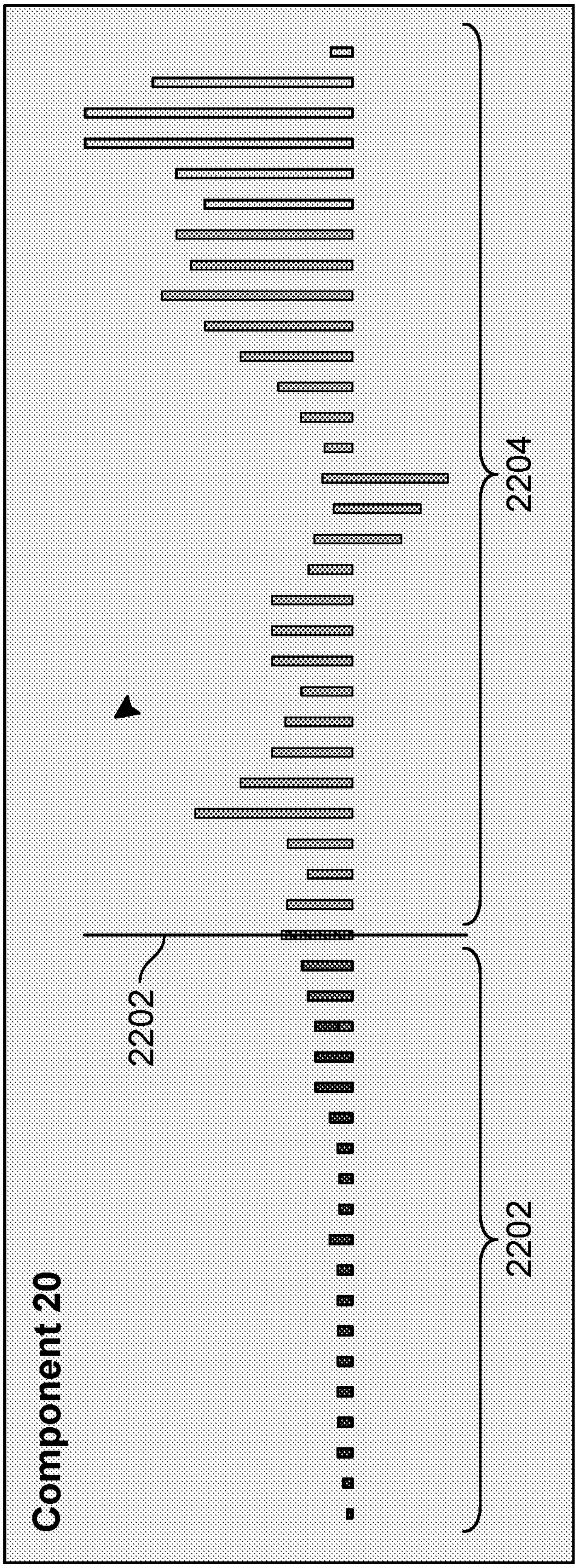
FIG. 22 illustrates an embodiment of a scrubber graph.

FIG. 22 illustrates an embodiment of a scrubber graph. In this example, a line 2202 at a selected time is shown. The selected time may be the current time, or a time in the future or past, as selected by the user (e.g., via manipulation of the scrubber graph). The past, relative to the selected time (which may still have not occurred), will be to the left of the line in some embodiments. Predicted solar generation, energy consumption, and battery state of charge forward in time relative to the selected time are shown to the right of the line in some embodiments. In this example, the current time has been selected, and the bars to the left of the line show household consumption that has occurred in the past. The bars to the right are forecasted consumption in the future. The user may scroll along the timeline, both backwards and forwards in time, to understand the behavior of their system over time. In some embodiments, the graph is divided into units or buckets of time, such as 30 minute intervals. For each interval or bucket of time, a bar is shown. Other intervals of time may be used. The bar may be segmented into different sections, which may be indicated via different colors. Each section may correspond to one of the three energy sources, solar power, grid power, and battery power, where the relative heights and composition of the overall bar illustrate the amount of power/energy drawn from each source. Grid export/import is also shown, as well as battery charging/discharging. In this way, when scrolling into the future, an infographic is displayed that conveys the predictions that have been made. By doing so, a user is able to visualize where power will be delivered from, exported to, consumed by, etc. In this example, bars corresponding to time periods that have already occurred are represented by having more solid shading, while bars corresponding to time periods that have not yet occurred (i.e., are in the future) are represented by having lighter shading/greater transparency. Other types of visualizations for differentiating between historical and future information may be used, as appropriate. For example, bars corresponding to the past are shown at 2202. Bars in the future generated based on forecasts are shown at 2204. In some embodiments, the bar corresponding to the interval of time in which the current time is included is designated graphically, for example, via a corresponding type of pattern fill indicating the current time. Other types of visual indications may be used, as appropriate.

Figure 23:
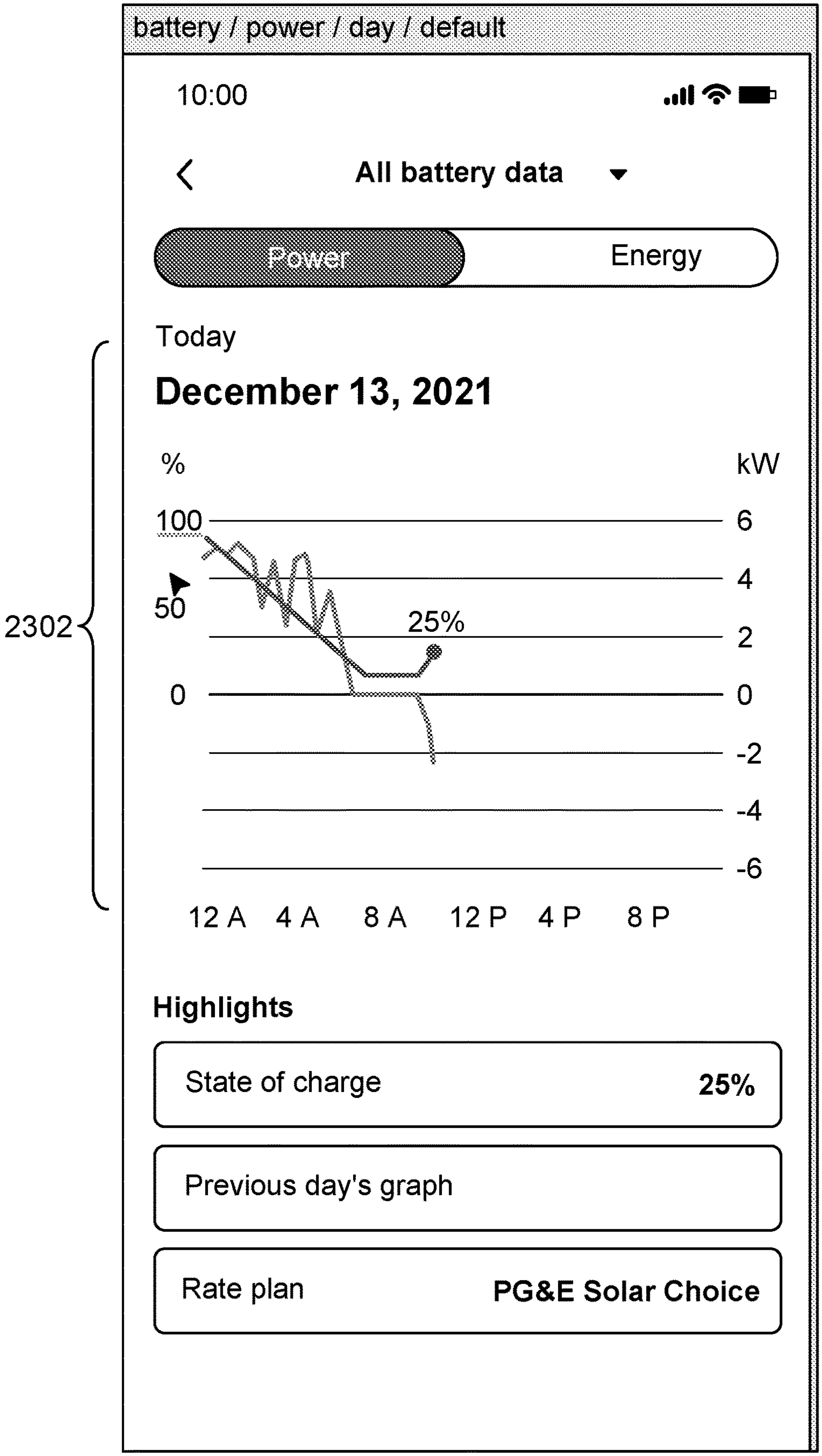
FIG. 23 illustrates an embodiment of energy storage device data.

FIG. 23 illustrates an embodiment of energy storage device data. In this example, a quick view or summary view of the state of charge of a battery is shown. Using the predictions shown (and the battery utilization plan generated based on those predictions, as described above), an expected state of charge curve for the battery over time over the course of a day is shown at 2302. Collected actual metering data (measurements of actual SoC over time) may be overlaid on top of the forecasted or planned SoC curve (e.g., to see the difference between projected and actual SoC).

As shown in the various embodiments of interfaces described above, based on the consumption predictions, solar power generation predictions, and storage utilization plans generated as described above, a forward view of various power curves over time is provided.

Figure 24:
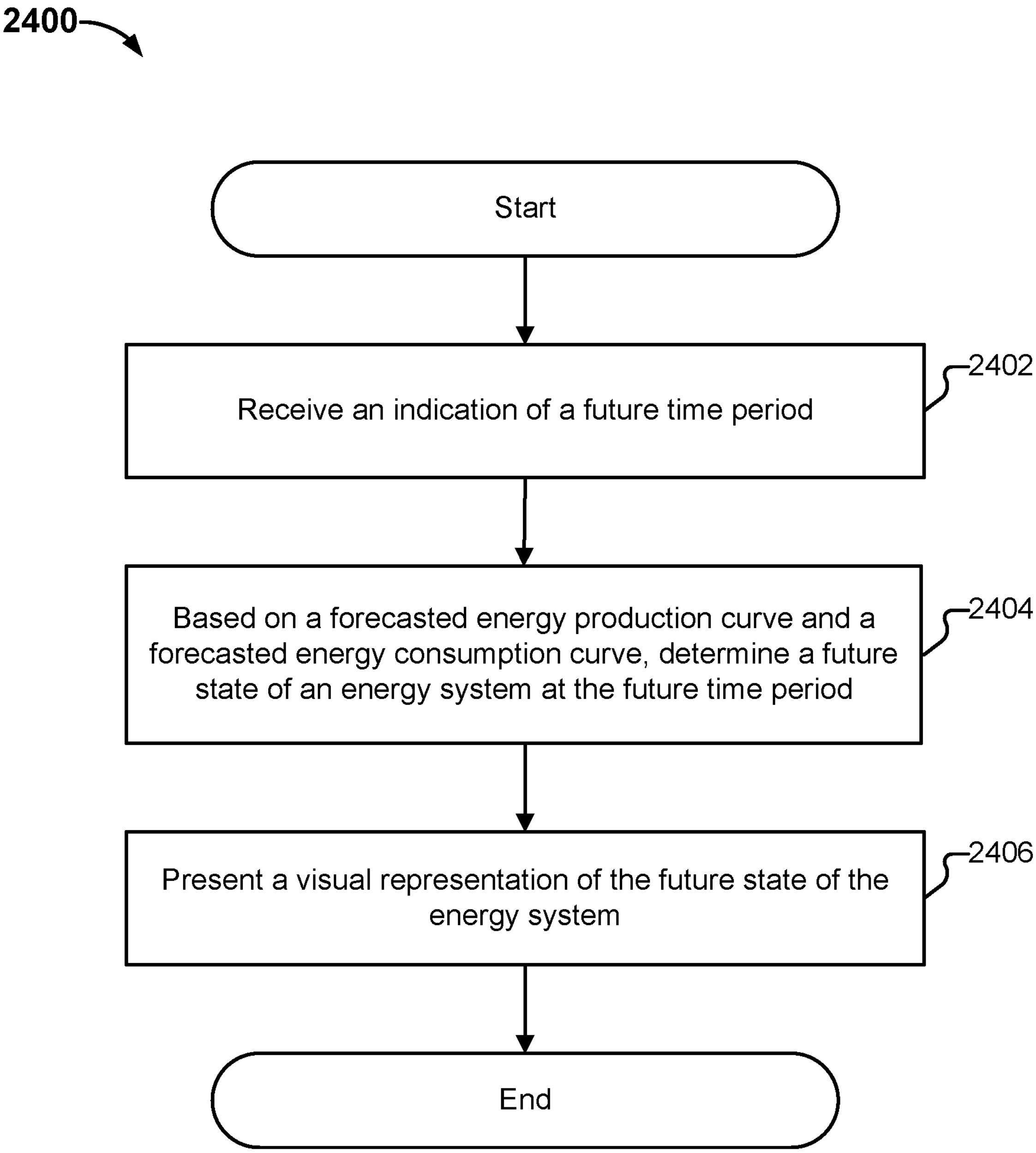
FIG. 24 is a flow diagram illustrating an embodiment of a process for visualizing a future state of an energy system.

FIG. 24 is a flow diagram illustrating an embodiment of a process for visualizing a future state of an energy system. In some embodiments, process 2400 is executed by a device such as devices 110, 112, or 114. In other embodiments, portions of process 2400 are executed by planning system 106 (e.g., where a frontend of the system is configured to communicate with devices 110, 112, or 114 and receive user requests and provide data in return to be displayed). The process begins at 2402, when an indication of a future time (e.g., future time period or future point in time is) received. For example, a time period or point in time is selected by a user via manipulation of a user interface element such as the scrubber graph described herein.

At 2404, based on a forecasted energy (e.g., solar) production curve and a forecasted energy consumption curve for an energy system at a site, a future state of the energy system is determined. In some embodiments, the forecasts of solar production and energy consumption are generated using process 300 of FIG. 3. The forecasts may be received from a remote entity such as the energy provisioning planning system described herein. For example, a predicted amount of energy consumed at the site at the future time period is determined. As another example, a predicted amount of energy provided by a PV array and/or battery storage at the future time period/point in time is determined. As another example, a predicted amount of energy imported from or exported to the grid is determined.

At 2406, a visual representation of the future state of the energy system is presented. For example, the state of the energy system is represented via bars in the scrubber graph described herein. Text summarizations of the information may also be displayed. A graphical representation of the flows of energy among the various components of the energy system and a consumer of the energy (e.g., home site) may also be rendered, as described above. Other examples of visualizations are described above.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:

receiving, via a user interface, a user selection of a future time;

based on a forecasted energy production curve and a forecasted energy consumption curve, determining a future state of an energy system at the selected future time;

presenting a visual representation of the future state of the energy system; and displaying a predicted time at which an energy storage device is expected to be fully charged, wherein the predicted time is based on the forecasted energy production curve, the forecasted energy consumption curve, and an energy storage device control plan that controls charging or discharging of the energy storage device, and wherein:

the energy storage device control plan is generated based on an evaluation of residential-side criteria and grid-side criteria, the grid-side criteria associated with participation of the energy storage device in a virtual power plant comprising a plurality of energy storage devices across a plurality of sites; and the energy storage device is cycled according to a set of intents determined based on the energy storage device control plan, wherein an intent comprises a set of instructions that are provided to the energy storage device, and wherein the intent specifies when to cycle the energy storage device, a rate at which the energy storage device is cycled, and a duration of the cycling.

2. The method of claim 1, wherein the user selection of the future time is based on user manipulation of a scrollable user interface element.

3. The method of claim 2, wherein responsive to the user manipulation of the scrollable user interface element, representations of energy flows among an energy consumer, a local generation system, the energy storage device, and a utility grid are updated.

4. The method of claim 1, wherein presenting the visual representation of the future state of the energy system comprises displaying an indication of projected consumption, at the selected future time, of energy provided by at least one of a local generation system or the energy storage device.

5. The method of claim 1, wherein presenting the visual representation of the future state of the energy system comprises displaying an indication of projected consumption, at the selected future time, of energy from a utility grid.

6. The method of claim 1, further comprising displaying a projected period of self-consumption.

7. The method of claim 1, further comprising displaying a predicted total solar production for a period of time.

8. A system, comprising:

a memory; and one or more processors coupled to the memory and configured to:

receive, via a user interface, a user selection of a future time;

based on a forecasted energy production curve and a forecasted energy consumption curve, determine a future state of an energy system at the selected future time;

present a visual representation of the future state of the energy system; and display a predicted time at which an energy storage device is expected to be fully charged, wherein the predicted time is based on the forecasted energy production curve, the forecasted energy consumption curve, and an energy storage device control plan that controls charging or discharging of the energy storage device, and wherein:

the energy storage device control plan is generated based on an evaluation of residential-side and grid-side criteria, the grid-side criteria associated with participation of the energy storage device in a virtual power plant comprising a plurality of energy storage devices across a plurality of sites; and the energy storage device is cycled according to a set of intents determined based on the energy storage device control plan, wherein an intent comprises a set of instructions that are provided to the energy storage device, and wherein the intent specifies when to cycle the energy storage device, a rate at which the energy storage device is cycled, and a duration of the cycling.

9. The system of claim 8, wherein the user selection of the future time is based on user manipulation of a scrollable user interface element.

10. The system of claim 9, wherein responsive to the user manipulation of the scrollable user interface element, representations of energy flows among an energy consumer, a local generation system, the energy storage device, and a utility grid are updated.

11. The system of claim 8, wherein presenting the visual representation of the future state of the energy system comprises displaying an indication of projected consumption, at the selected future time, of energy provided by at least one of a local generation system or the energy storage device.

12. The system of claim 8, wherein presenting the visual representation of the future state of the energy system comprises displaying an indication of projected consumption, at the selected future time, of energy from a utility grid.

13. The system of claim 8, wherein the one or more processors are further configured to display a projected period of self-consumption.

14. The system of claim 8, wherein the one or more processors are further configured to display a predicted total solar production for a period of time.

15. The method of claim 1, wherein re-generation of the energy storage device control plan is triggered in response to deviation of an actual state of charge of the energy storage device from a planned state of charge of the energy storage device exceeding a threshold.

16. The system of claim 8, wherein re-generation of the energy storage device control plan is triggered in response to deviation of an actual state of charge of the energy storage device from a planned state of charge of the energy storage device exceeding a threshold.

* * * * *